(12) United States Patent
Tweet et al.

(10) Patent No.: US 7,854,460 B2
(45) Date of Patent: Dec. 21, 2010

(54) MATING RECEIVER RACK FOR PERSONAL RECREATIONAL VEHICLES

(75) Inventors: Ole E. Tweet, Thief River Falls, MN (US); Kenneth Q. Kalsnes, Thief River Falls, MN (US); Ryan Hughes, Thief River Falls, MN (US); Douglas Wolter, Thief River Falls, MN (US); Tim Michalke, Thief River Falls, MN (US); Ronald G. Solberg, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 1193 days.

(21) Appl. No.: 11/112,980

(22) Filed: Apr. 22, 2005

(65) Prior Publication Data

US 2006/0237502 A1    Oct. 26, 2006

Related U.S. Application Data

(63) Continuation-in-part of application No. 10/172,531, filed on Jun. 13, 2002, now Pat. No. 7,044,526.

(51) Int. Cl.
*B60N 2/02* (2006.01)

(52) U.S. Cl. .................. 296/65.03; 296/37.1; 296/3; 297/195.13; 224/401; 224/539; 280/769; 180/908

(58) Field of Classification Search .............. 296/3, 296/37.1, 65.03, 65.13, 37.6; 224/401, 485, 224/524, 42.32, 564, 547, 539; 297/215.13, 297/195.13; 280/769; 180/908
See application file for complete search history.

(56) References Cited

U.S. PATENT DOCUMENTS

| 4,563,038 | A | * | 1/1986 | Hirose ................. 297/243 |
| 4,614,252 | A |   | 9/1986 | Tarner |
| 5,662,451 | A | * | 9/1997 | Muzzi et al. ............ 414/540 |
| 5,876,147 | A |   | 3/1999 | Longo |
| 6,378,748 | B1 | * | 4/2002 | Cox ..................... 224/511 |
| 6,461,095 | B1 |   | 10/2002 | Puska |
| 6,502,728 | B2 | * | 1/2003 | Savant ................. 224/401 |
| 6,626,748 | B2 |   | 9/2003 | Homer, Sr. |
| 6,793,108 | B2 |   | 9/2004 | Williams, Jr. |
| 7,165,702 | B1 | * | 1/2007 | Billberg ................ 224/401 |
| 7,377,570 | B2 | * | 5/2008 | Rondeau et al. ....... 296/65.03 |
| 2003/0230607 | A1 | * | 12/2003 | Tweet et al. ............ 224/401 |

FOREIGN PATENT DOCUMENTS

| EP | 1371520 | 12/2003 |
| GB | 2339414 | 1/2000 |
| WO | 9620865 | 7/1996 |

\* cited by examiner

*Primary Examiner*—Joseph D Pape
(74) *Attorney, Agent, or Firm*—Black Lowe & Graham PLLC

(57) ABSTRACT

A receiver rack includes a main framework piece that is attached to a mounting surface of the personal recreational vehicle. The main framework may be flat and may be fashioned generally in the image of a cargo rack. The main framework may have mounting flanges for facilitating its connection to the recreational vehicle. The main framework includes at least one coupler mounted thereon. The coupler enables the main framework to be joined to one or more auxiliary frame pieces that contain at least one coupling member that mates with the coupler of the main framework. The coupler may also be used for joining a variety of seating and cargo units to the main framework.

12 Claims, 44 Drawing Sheets

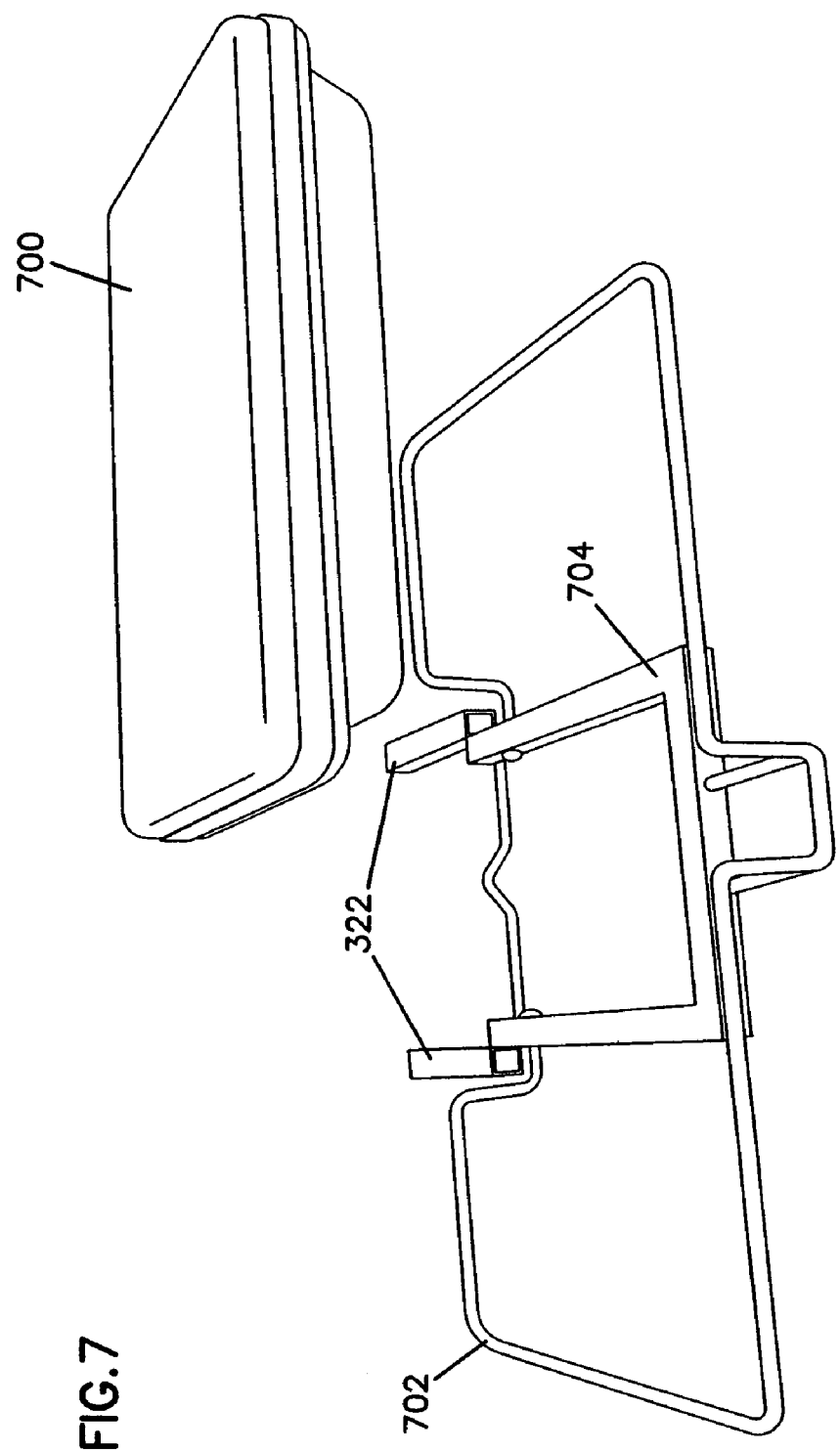

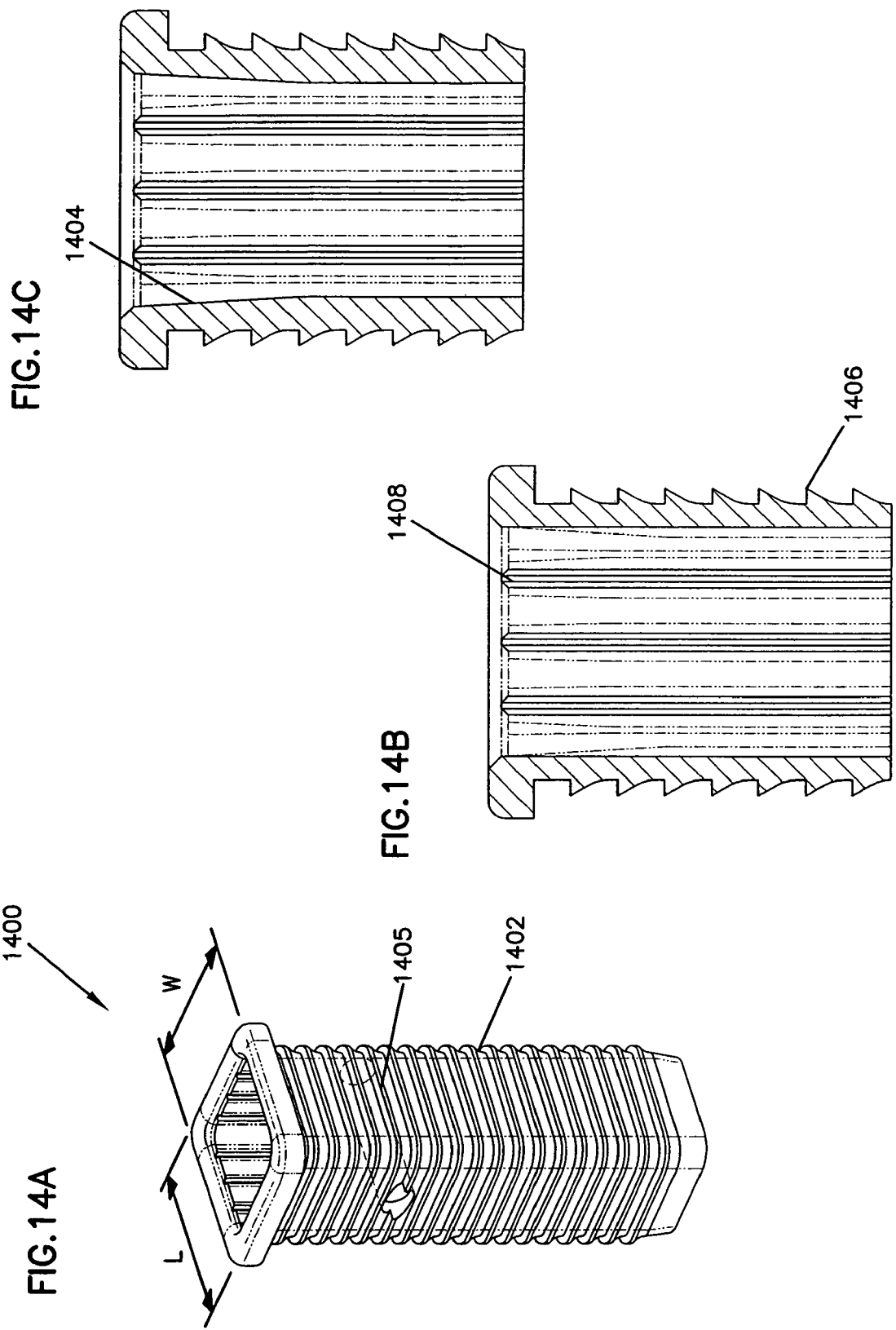

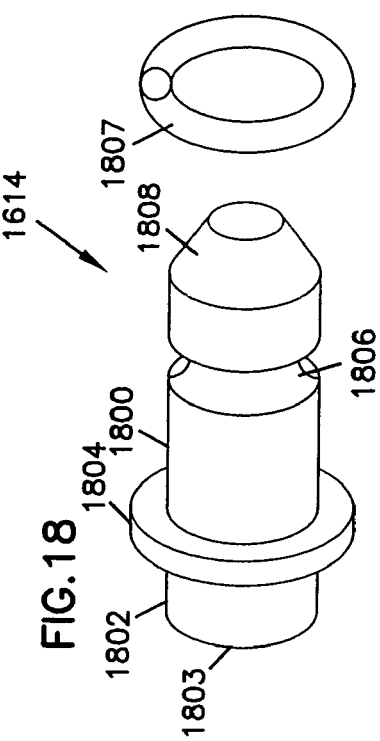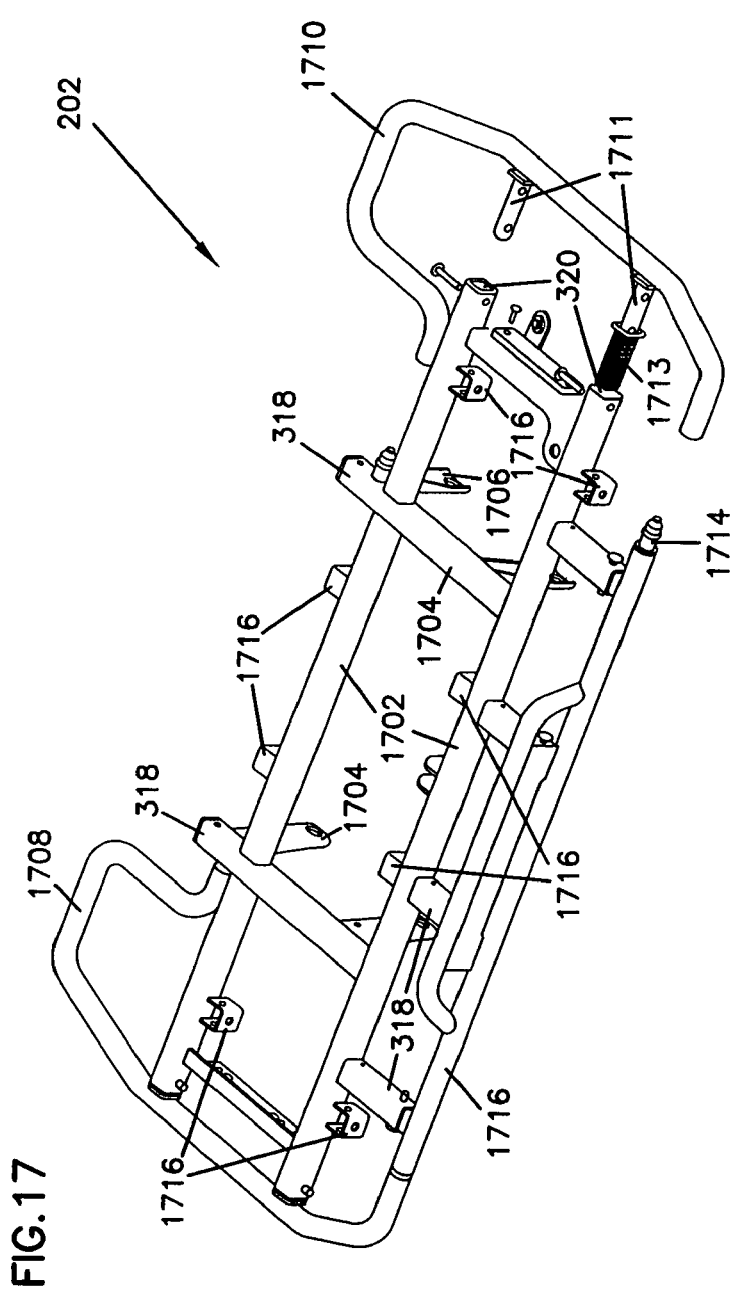

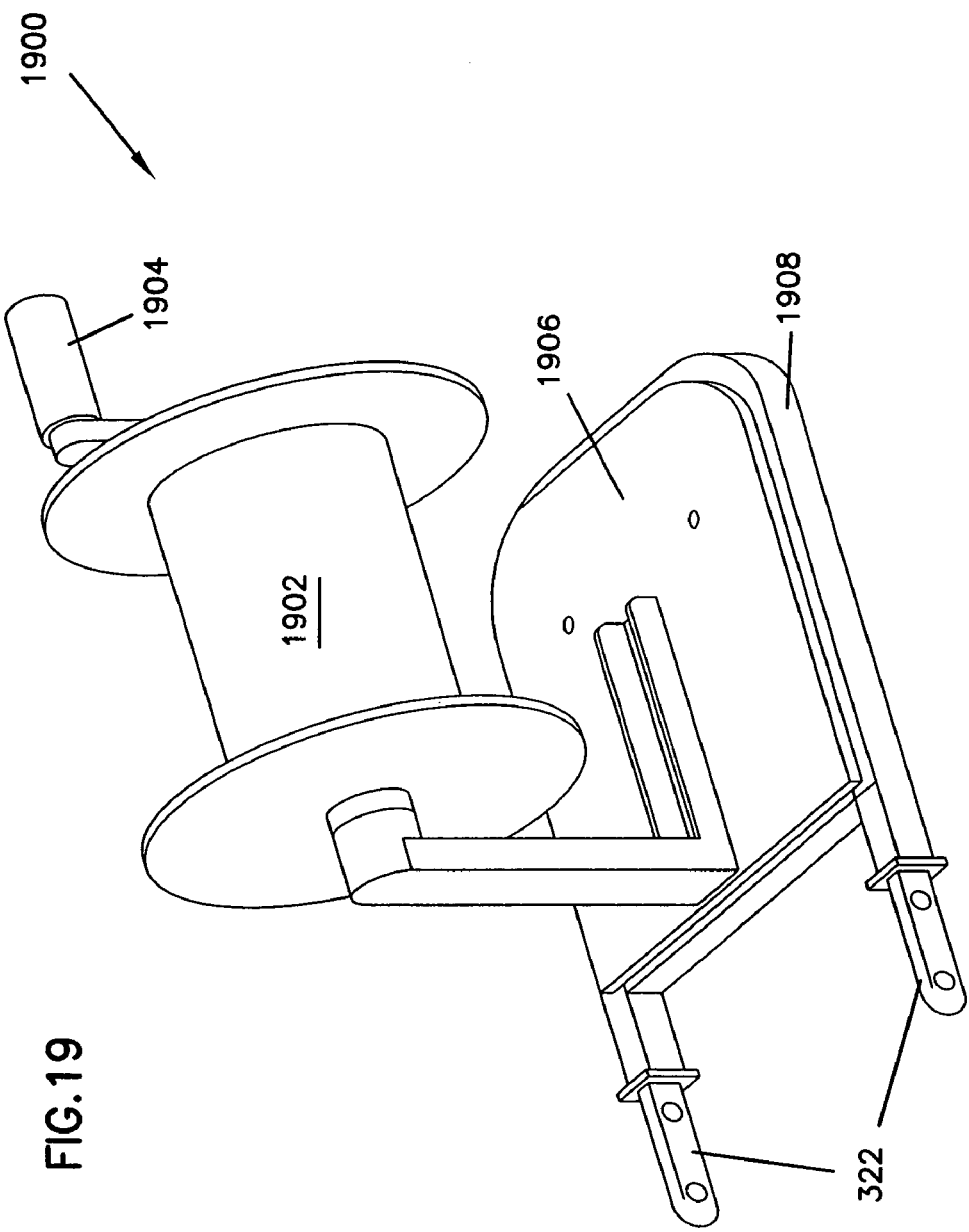

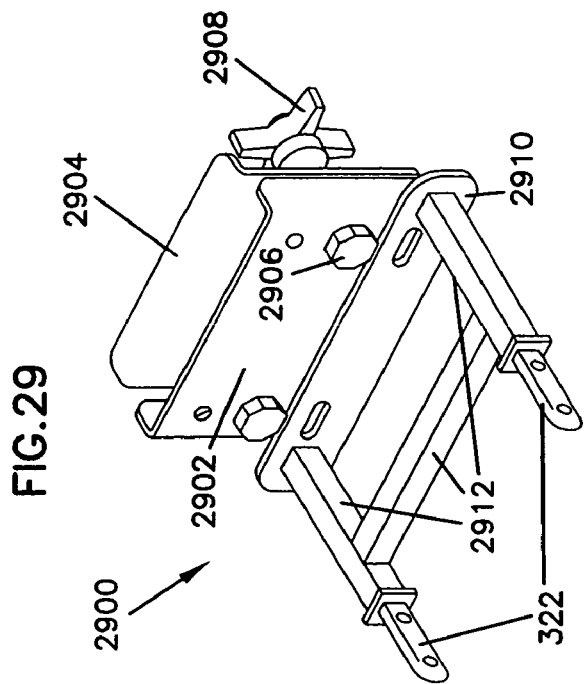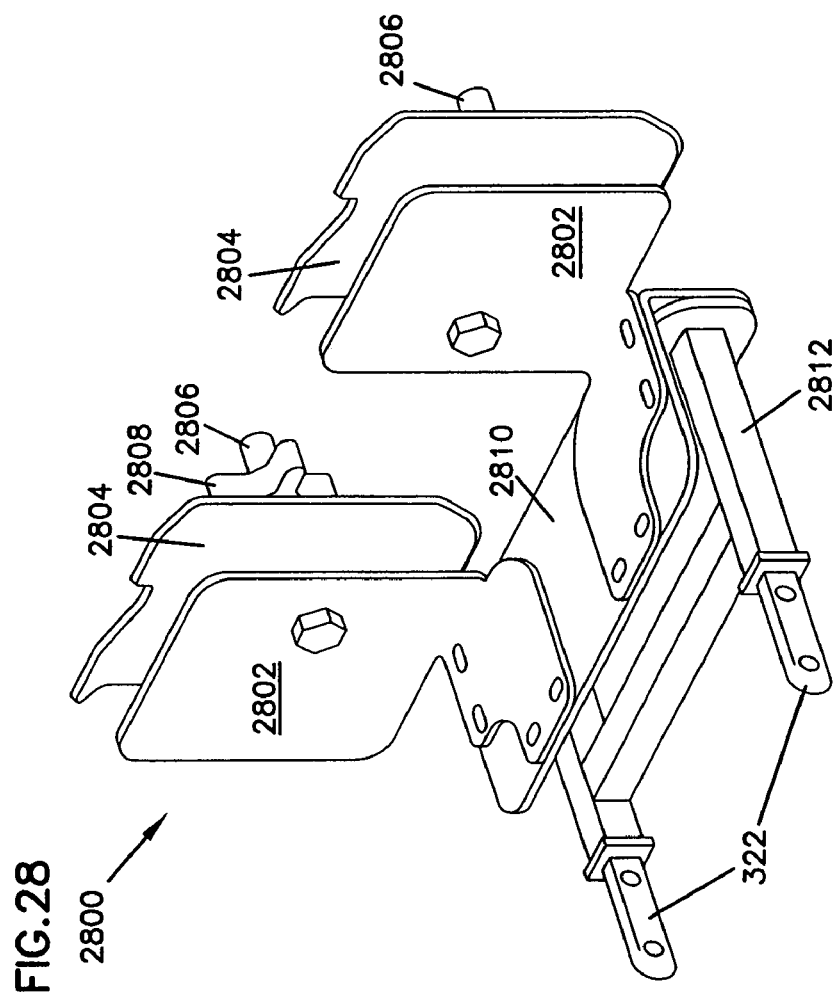

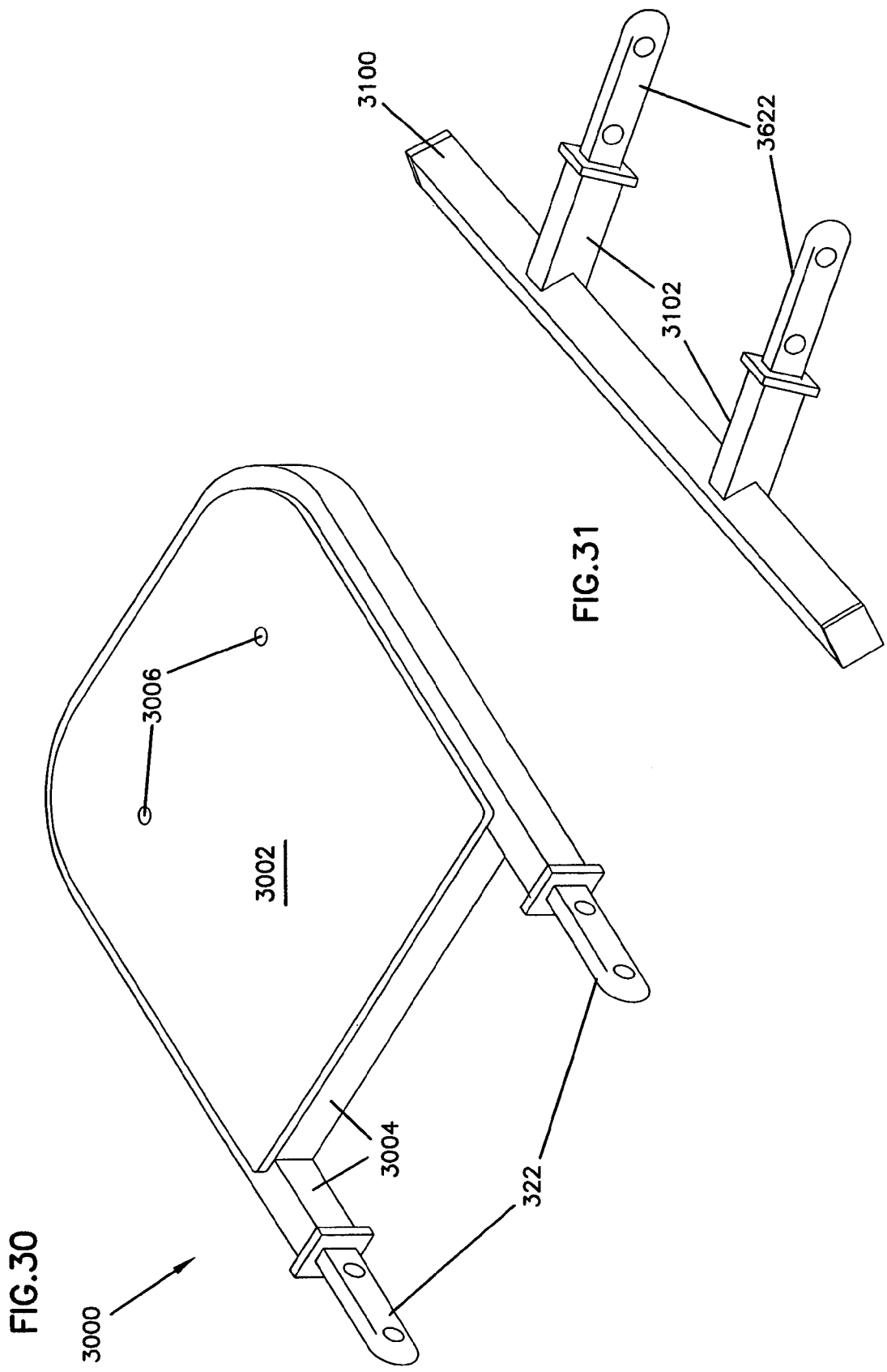

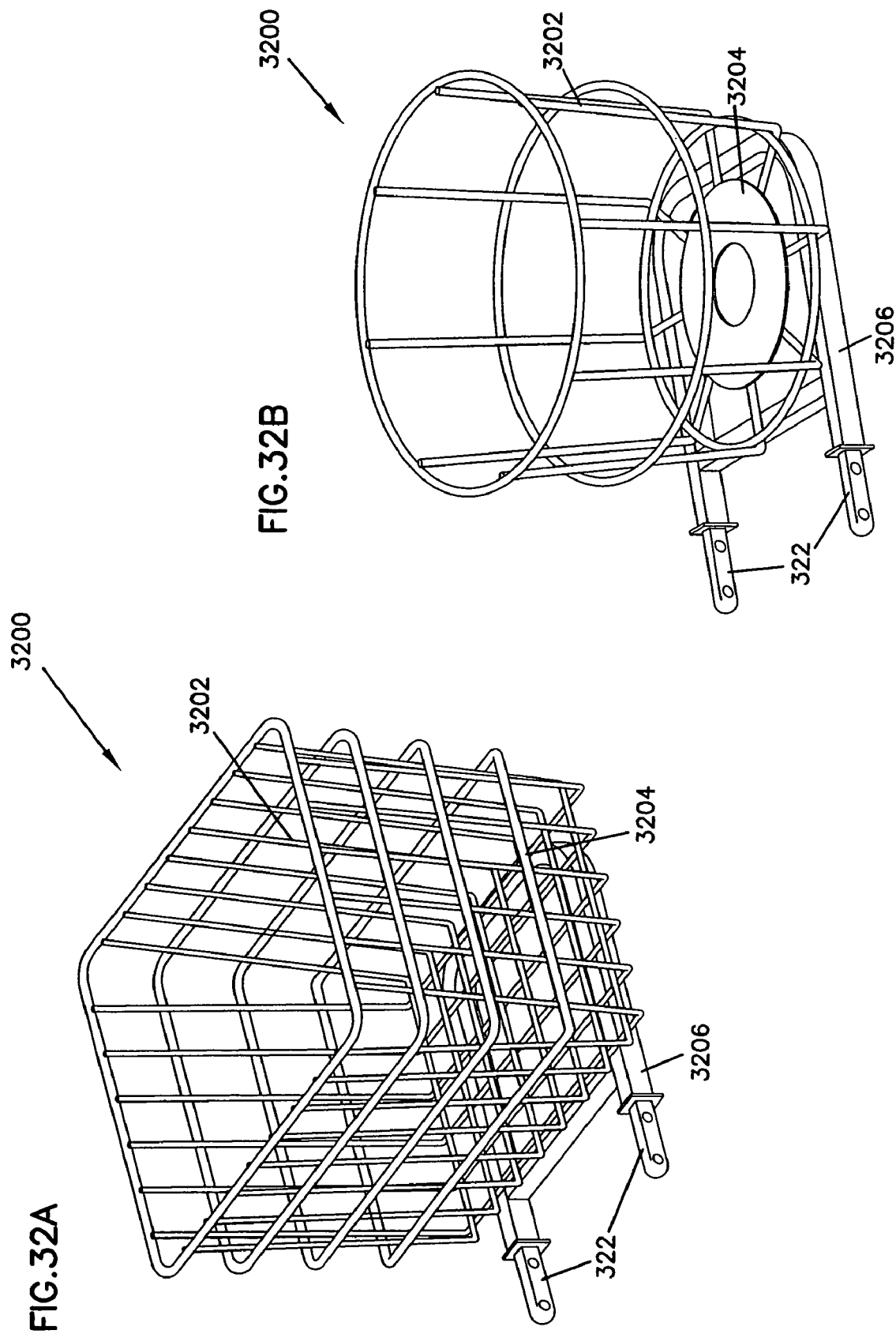

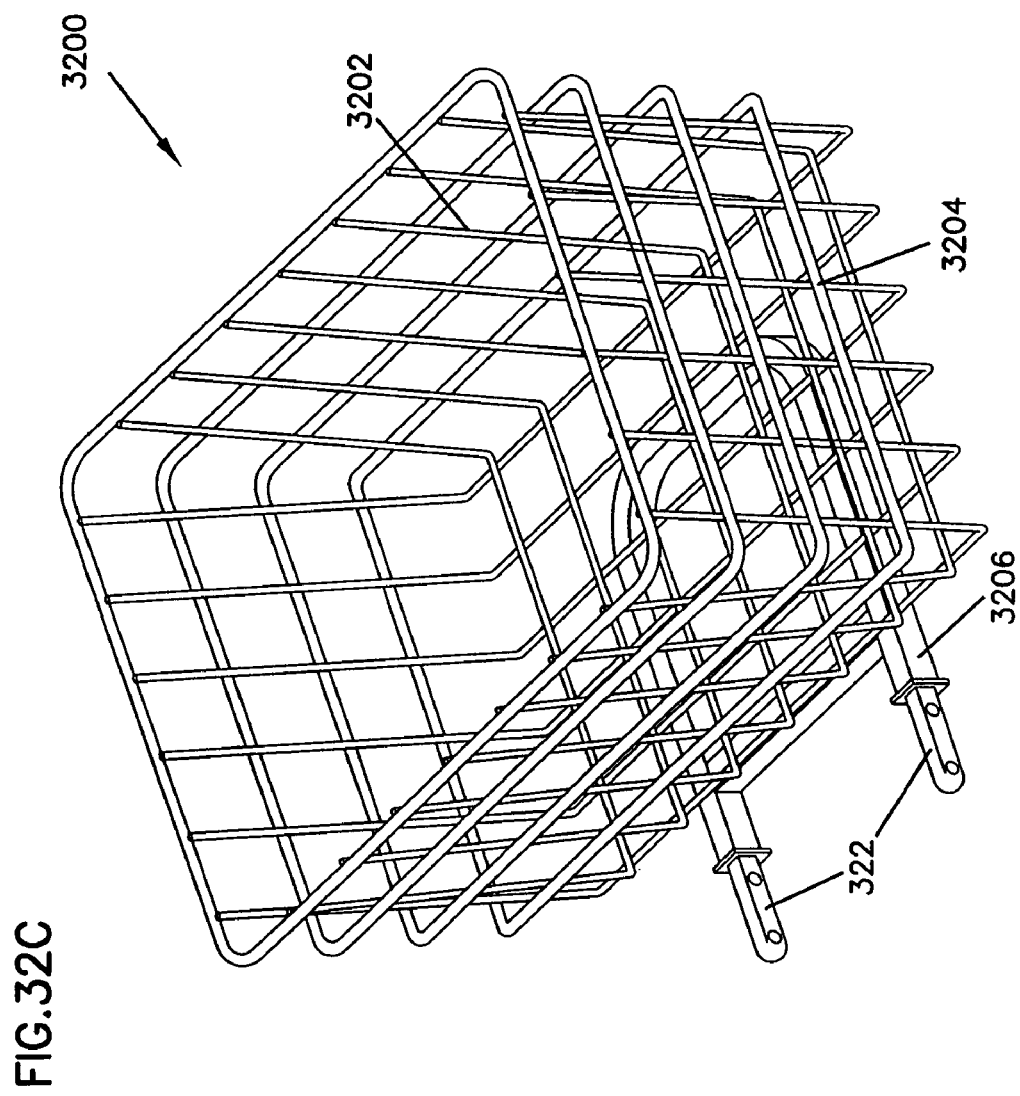

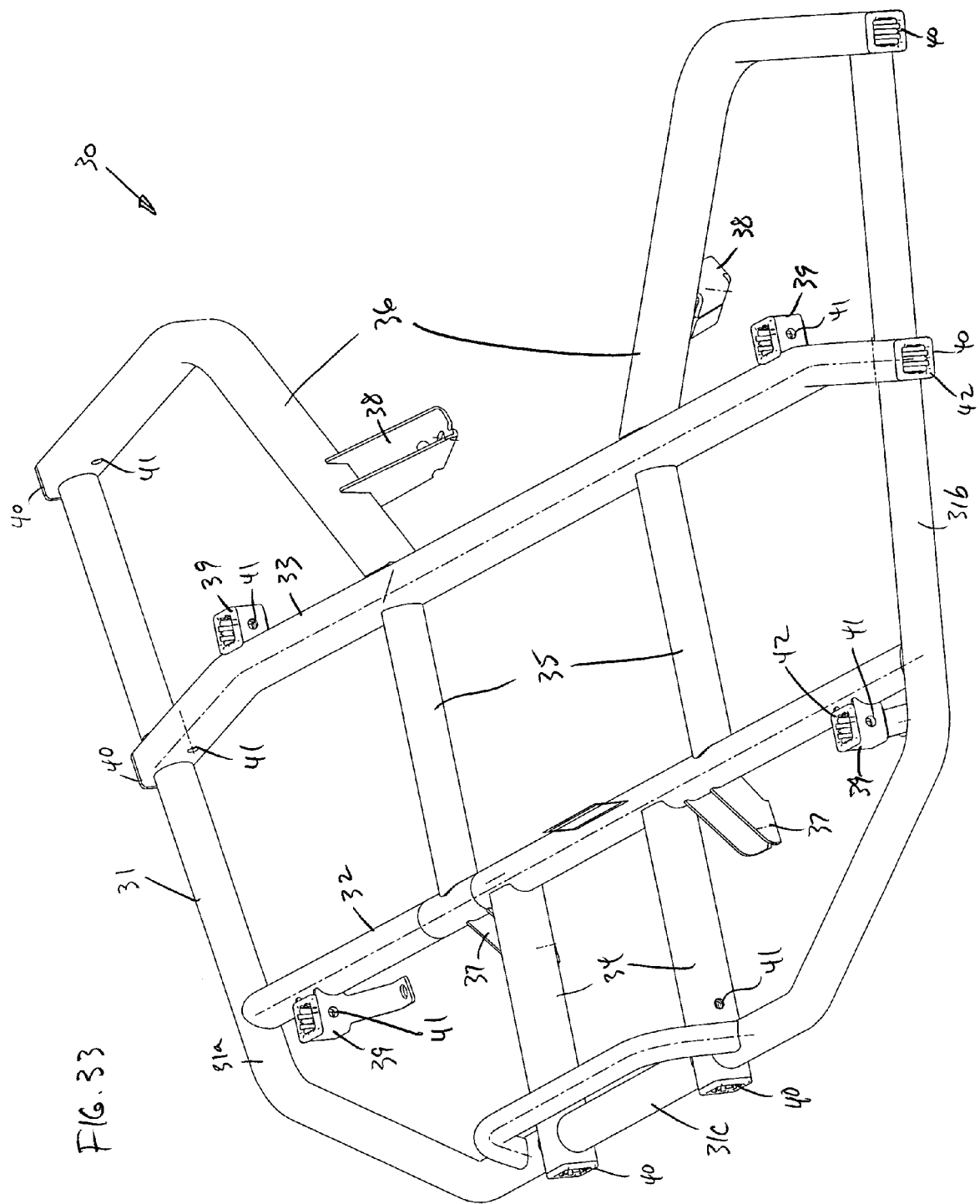

MATING RECEIVER RACK FOR PERSONAL RECREATIONAL VEHICLES

PRIORITY CLAIM

This application is a continuation-in-part of U.S. Published Application No. 2003/0230607 and U.S. patent application Ser. No. 10/172,531, filed on Jun. 13 2002, now U.S. Pat. No. 7,044,526, which application is incorporated herein by reference in its entirety.

TECHNICAL FIELD

The present disclosure relates generally to receiver racks, and more particularly to mating receiver racks for personal recreational vehicles.

BACKGROUND

Personal recreational vehicles, such as all-terrain vehicles (ATVs), snowmobiles, motorcycles, and multi-purpose off-highway utility vehicles (e.g., side-by-side seating vehicles), have grown increasingly popular, both for recreational and utilitarian purposes. Today, Personal recreational vehicles are used for such diverse purposes as transporting workmen to remote and difficult to reach sites or permitting families to reach scenic sites for a picnic. As a consequence of their expanding role, personal recreational vehicles are often used for carrying items. For example, in the case of the workman, the personal recreational vehicle may be used to carry tools, while in the case of the family, the personal recreational vehicle may be used to carry food and a grill.

In the prior art, little provision has been made with respect to the cargo carrying role of a personal recreational vehicle. Generally, if a personal recreational vehicle was to be used to carry a cargo unit, such as a grill, the item had to be strapped (as with a bungee cord) to a rack attached to the personal recreational vehicle. This scheme possessed drawbacks. For example, the process of securing a cargo unit to a rack can be time consuming, particularly if the item was of a shape that did not allow for easy coupling to a rack. Additionally, securing items with a bungee cord can be difficult to carry out reliably.

As is evident from the preceding discussion, there exists a need for a scheme to permit convenient and secure carrying of cargo by a personal recreational vehicle. A desirable scheme will be simple, rugged, and adaptable for carrying many different sorts of items.

SUMMARY

The present disclosure relates to receiver racks and other structures used for attaching cargo units to a personal recreational vehicle. One inventive aspect of the disclosure relates to a personal recreation vehicle that includes a first mounting surface, a base mounting rack, a receiver rack, and a cargo unit. The first mounting surface is located in a position selected from the group consisting of a region of an upper surface of the vehicle above the vehicle's front tires and a region of an upper surface of the vehicle above the vehicle's rear tires. The base mounting rack is configured for attachment to the first or second mounting surface. The receiver rack defines a cargo mounting surface and is releaseably mounted to the base mounting rack. The receiver rack includes at least two side rails, at least one interconnecting rail coupled between the side rails, and a coupler. The cargo unit includes a coupling member that cooperates with the coupler for mounting a cargo unit to the receiver rack.

Another aspect of the disclosure relates to a receiver rack for use with a personal recreational vehicle. The receiver rack includes a first elongate member extending in a length direction of the vehicle, a second elongate member extending substantially parallel to the first tubular member, and at least one cross-linking member connecting the first and second elongate members. A mounting flange is attached to at least one of the first and second elongate members or the cross-linking member for mounting the receiver rack to the vehicle. The receiver rack also includes at least one coupler mounted to the first or second elongate member or the cross-linking member, and a first auxiliary piece having a framework and a coupling member projecting there from. The coupling member is dimensioned to fit within the coupler to secure the first auxiliary member to the receiver rack.

A further aspect of the disclosure relates to a receiver assembly for use with a personal recreational vehicle. The receiver assembly includes a main framework, a plurality of couplers, and a plurality of auxiliary frame pieces. The main framework is mounted to the vehicle and includes a mounting surface. The couplers are secured to the mounting surface of the main framework and each includes an opening that faces away from the vehicle. The auxiliary frame pieces are configured for attachment to the couplers.

BRIEF DESCRIPTION OF THE DRAWINGS

FIG. 7 depicts yet another exemplary cargo unit that has been adapted for cooperation with the sectional receiver rack, in accordance with one embodiment of the present disclosure.

FIG. 14A depicts isometric and cross-sectional views of a bushing that may be used in conjunction with the receiver rack.

FIG. 14B depicts a cross-sectional view of another embodiment of the bushing depicted in FIG. 14A.

FIG. 14C depicts a cross-sectional view of another embodiment of the bushing depicted in FIG. 14A.

FIG. 17 depicts yet another embodiment of a sectional receiver rack.

FIG. 18 depicts a coupling button and o-ring, in accordance with one embodiment of the present disclosure.

FIGS. 19-31 and 32A, 32B, and 32C depict embodiments of various cargo units that have been adapted for cooperation with the sectional receiver rack, in accordance with one embodiment of the present disclosure.

FIG. 33 is a top perspective view of an example receiver rack in accordance with principles of the present disclosure, the rack being configured for coupling directly to a vehicle.

DETAILED DESCRIPTION

The problem of securing a cargo unit to a personal recreational vehicle (such as an all-terrain vehicle) may be solved by utilization of a receiver rack having a variety of mounting and attachment capabilities. A sectional receiver rack includes a main framework piece that is attached to a mounting surface of the personal recreational vehicle. The main framework may be flat and may be fashioned generally in the image of a cargo rack. The main framework may have mounting flanges for facilitating its connection to the recreational vehicle. The main framework may be dimensioned to span the mounting surface to which it is attached.

The main framework may have couplers along one or more portions of its periphery. The couplers enable the main framework to be joined to one or more auxiliary frame pieces that contain coupling members that mate with the couplers of the main framework. Additionally, cargo units may be built with coupling members attached thereto. The auxiliary frame piece may be removed, thereby exposing the couplers to which they were attached. The exposed couplers may be used for joining the cargo unit to the main framework. Accordingly, the cargo units may be secured to the main framework by joining their attached coupling members to the couplers attached to the main framework.

The above-described scheme allows for convenient and secure transportation of cargo units with a personal recreational vehicle. The discussion that follows presents the scheme in greater detail. Although the receiver rack described herein may be used with any personal recreation vehicle (e.g., all-terrain-vehicles, snowmobiles, multi-purpose off-highway utility vehicles, etc.), many of the examples described below may be especially useful with all-terrain vehicles (ATVs).

As used herein, the term "personal recreational vehicle" refers to a vehicle that is used for recreational purposes both on- and off-road. Personal recreational vehicles are typically sized for one or two riders and may include both straddle mount (e.g., all-terrain vehicles, motorcycles, and snowmobiles) and side-by-side seating vehicles (e.g., multi-purpose off-highway utility vehicles). As used herein, the term "ATV" refers to straddle-mounted vehicles that are driven by four or more wheels. In many instances, the term "ATV" may be used to represent the more general category of personal recreational vehicles, which includes non-straddle-mounted vehicles. Also, as used herein, the term "cargo unit" refers to at least: (1) any item carried by a receiver rack that is mounted upon a personal recreational vehicle; or (2) any item that is not an electrical or mechanical component of a personal recreational vehicle and is carried by said vehicle.

Figure 1:
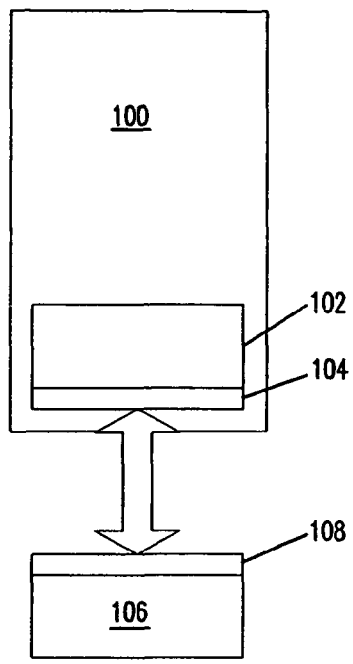
FIG. 1 depicts an ATV outfitted with a sectional receiver rack, which is composed of a main framework and a set of couplers.

FIG. 1 depicts an ATV 100 outfitted with a sectional receiver rack, which is composed of a main framework 102 and a set of couplers 104. The couplers 104 mate with a set of coupling members 108 that are attached to a cargo unit 106. Accordingly, the cargo unit 106 may be secured to the sectional receiver rack by mating the coupling members 108 on the cargo unit 106 to the couplers 104 on the main framework 102. Examples of cargo units 106 that may be outfitted with coupling members include, but are not limited to, a cooking grill, a vise, a workbench, a cooler, a gun rack, a cargo basket, and an auxiliary back rest, a storage box, a cord reel, a carry-all, an articulating spool mount, a flatbed extension, a gun scabbard, a gear lock, a gear cradle, a fender box, a tool lock, a saw lock, a workbase, or a utility bar.

The above-described scheme possesses several advantages. First, the scheme permits convenient and reliable securing of the cargo unit 106 to the ATV 100. Second, the scheme permits the manufacturer of the ATV 100 to share in the revenue derived from the sale of the cargo unit 106.

Figure 2:
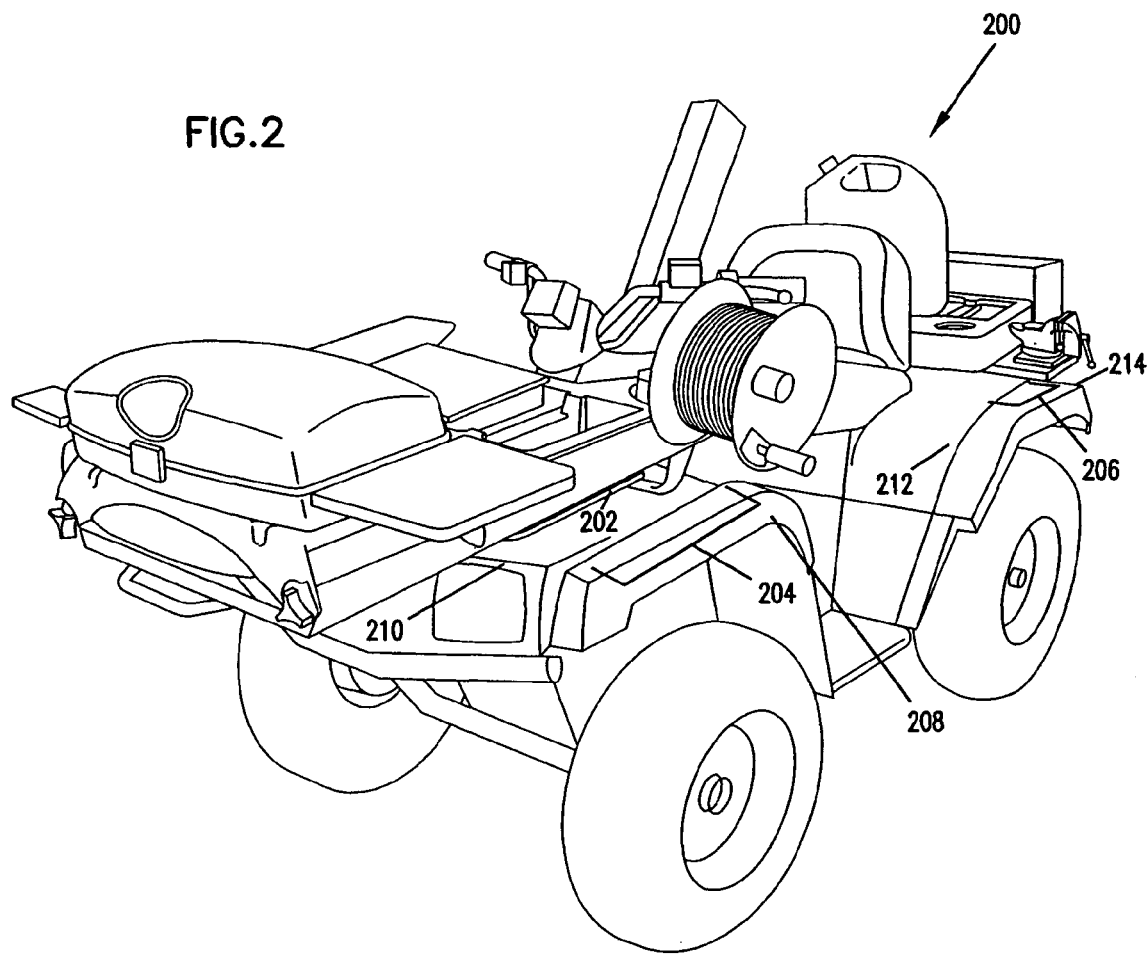
FIG. 2 depicts an ATV outfitted with a sectional receiver rack, in accordance with one embodiment of the present disclosure.

FIG. 2 depicts an ATV 200 outfitted with a sectional receiver rack 202. Details regarding the construction of ATVs 200 are known in the art and therefore need not be discussed herein. As can be seen from FIG. 2, the ATV 200 possesses a forward mounting surface 204 and a rearward mounting surface 206. Each mounting surface 204 and 206 may serve as a platform upon which the sectional receiver rack 202 may be positioned. Thus, the ATV 200 may have as many receiver racks 202 as it has mounting surfaces 204 and 206. According to the embodiment depicted in FIG. 2, the forward mounting surface 204 extends from approximately the rear edge 208 of the front wheel well to the front edge 210 of the ATV 200. The forward mounting surface 204 spans the width of the ATV 200. The rearward mounting surface 206 extends from approximately the front edge 212 of the rear wheel well to the rear edge 214 of the ATV 200. The rearward mounting surface 206 also spans the width of the ATV 200. Other mounting locations and dimensions are possible, and are within the scope of the inventive aspects of the present disclosure.

Figure 3:
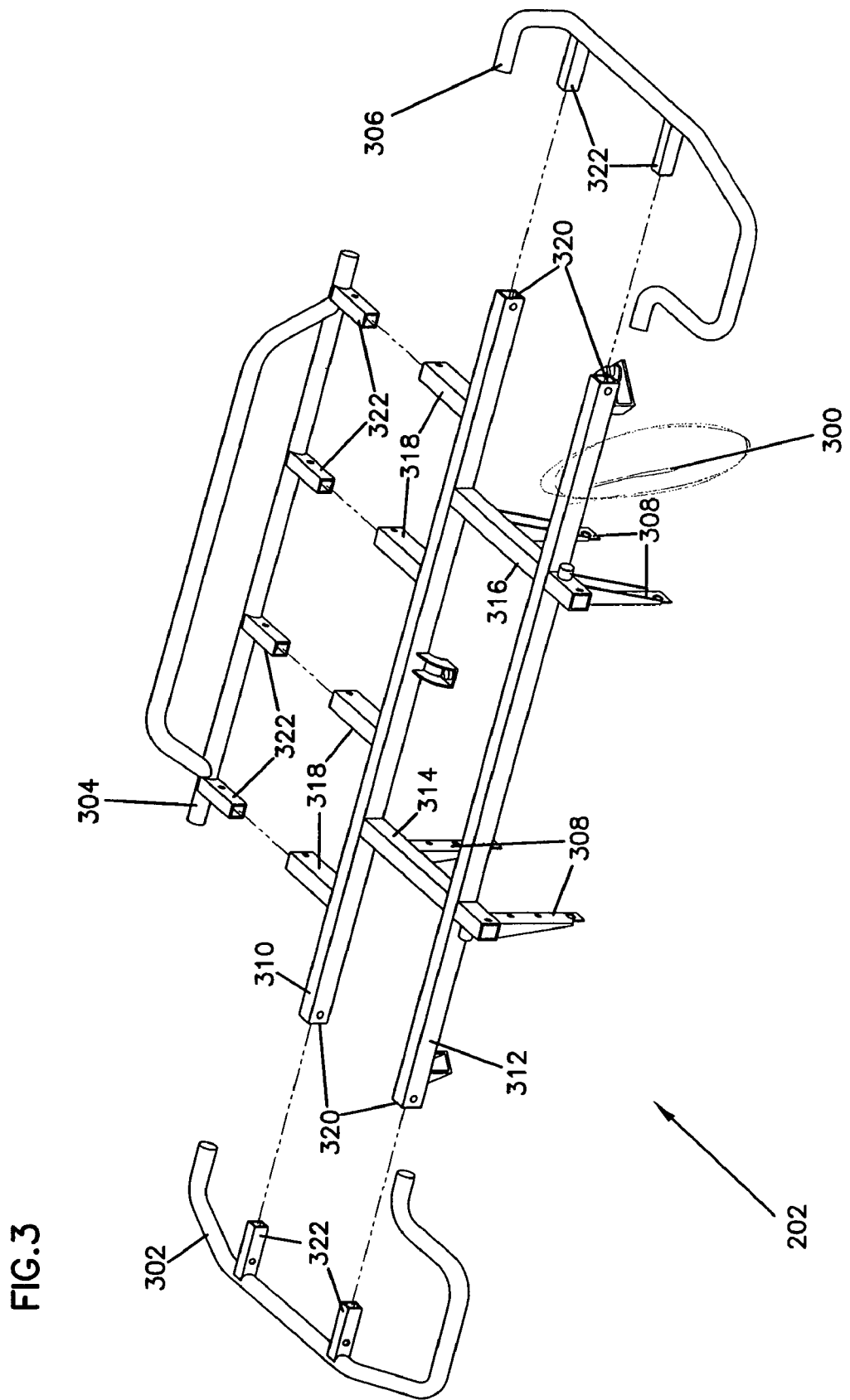
FIG. 3 depicts a sectional receiver rack, in accordance with one embodiment of the present disclosure.

FIG. 3 depicts a sectional receiver rack 202, in accordance with one embodiment of the present disclosure. As illustrated in FIG. 3, the receiver rack 202 includes a main framework 300 and three auxiliary frame pieces 302, 304, and 306. When assembled with the ATV 200, the main framework 300 rests atop a mounting surface 204 or 206 of the ATV 200. The main framework 300 may possess mounting flanges 308, which permit fastening (e.g., via a bolt) of the main framework 300 to the frame (not depicted) or other stable structural unit of the ATV 200.

According to the embodiment depicted in FIG. 3, the main framework 300 possesses two parallel, tubular members 310 and 312. The two members 310 and 312 are cross-linked via linking members 314 and 316. Along the periphery of the main framework are a plurality of couplers 318 and 320. The couplers 318 and 320 permit the auxiliary frame pieces 302, 304, and 306 to join the main framework 300. In some cases, the couplers 318 are separate members 318 that are attached to one of the two parallel, tubular members 310 or 312. In other cases, the end portions of the two parallel, tubular members 310 and 312 serve as couplers 320. In the embodiment depicted in FIG. 3, the auxiliary frame pieces 302, 304 and 306 possess coupling members 322. The coupling members 322 are dimensioned so as to permit their insertion into the couplers 318 and 320 of the main framework 300. Alternatively, the couplers 318 and 320 may be dimensioned to permit their insertion into the coupling members 322.

Figure 4:
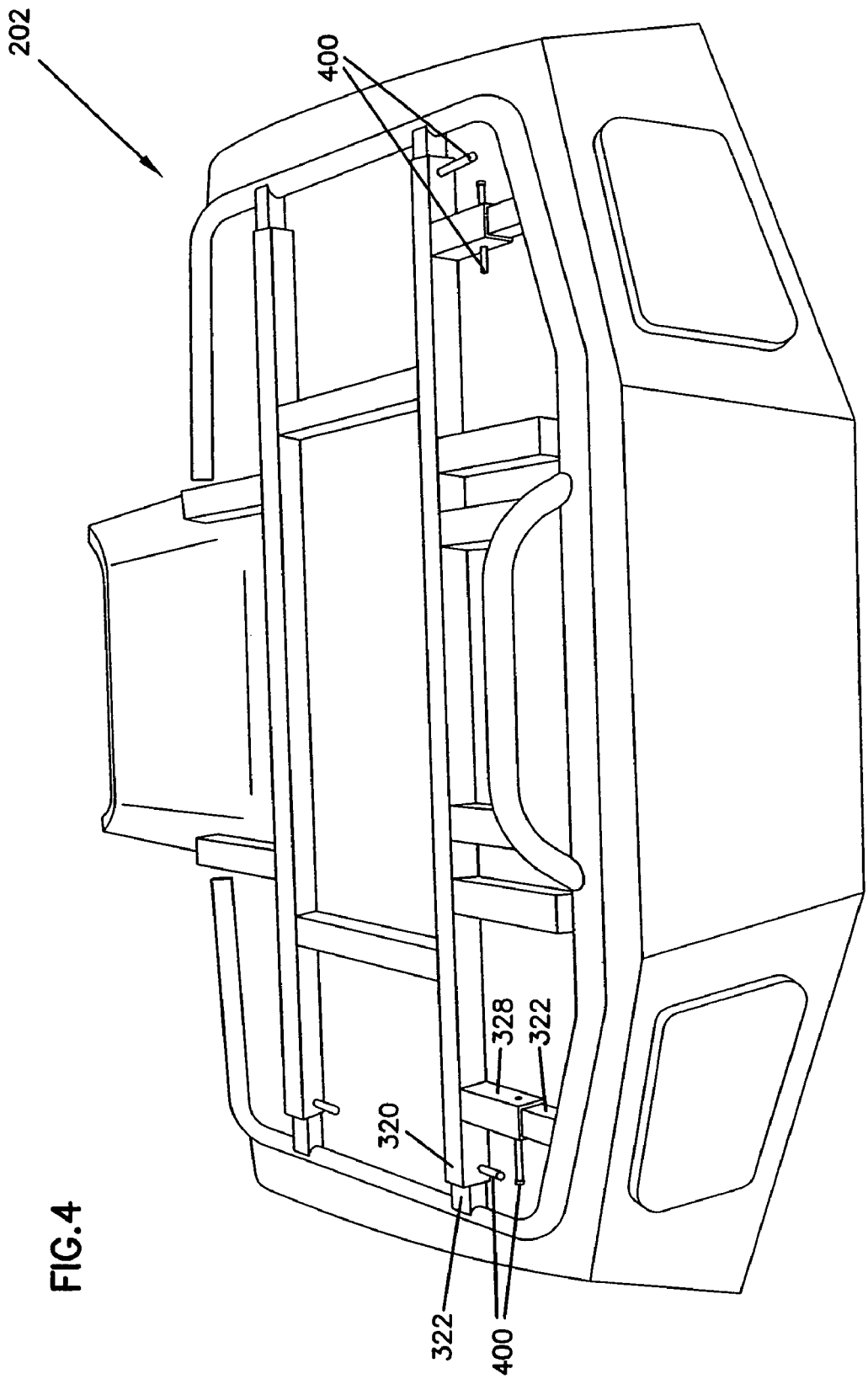
FIG. 4 depicts an assembled sectional receiver rack, in accordance with one embodiment of the present disclosure.

When the auxiliary frame pieces 302, 304, and 306 are joined to the main framework 300, the receiver rack 202 appears as a cargo rack, as is depicted in FIG. 4. The couplers 318 and 320 of the main framework 300 and the coupling members 322 of the auxiliary frame pieces 302, 304, and 306 may each possess a passage through which a restraining pin 400 may pass. As can be seen in FIG. 4, one or more restraining pins 400 may be used to secure the coupling members 322 within the couplers 318 and 320.

FIG. 14A depicts an isometric view and a cross-sectional view of one embodiment of a bushing 1400, in accordance with one embodiment of the present disclosure. The bushing 1400 has a set of side walls 1402, which form a cross-section that is generally congruous with the cross-section of the couplers 318 and 320 on the main framework 300. The outer length, l, and width, w, of the cross-section formed by the side walls 1402 are dimensioned such that the bushing 1400 can fit within the couplers 318 and 320 of the main framework 300.

The bushing 1400 may be inserted into the couplers 318 and 320 on the main framework 300. In turn, the coupling members 322 attached to a cargo unit 106 may be inserted into the bushing 1400. The bushing 1400 relaxes the tolerance requirements for the couplers 318 and 320 and coupling members 322. Additionally, the bushing 1400 prevents the coupling members 322 from rattling within the couplers 318 and 320 when the recreational vehicle is running.

To aid insertion of a coupling member 322 into the bushing, the interior cross-section of the bushing 1400 may taper inwardly. The tapering is depicted in the cross-sectional view and is identified by reference numeral 1404. The bushing 1400 may be made of a flexible plastic, such as high-density polyethylene, to permit the bushing 1400 to conform to the geometries of both the couplers 318 and 320 and the coupling members 322.

As can also be seen from FIG. 14A, oppositely disposed side walls 1402 may be pierced, so as to provide a passage 1405 through which the previously mentioned restraining pin 400 may run.

Optionally, as depicted in FIG. 14B, the side walls 1402 may contain ribs 1406 that project outwardly. The ribs 1406 reduce the surface area of the bushing 1400 in contact with the couplers 318 and 320, thus reducing friction during insertion. The ribs 1406 may be slightly flexible. The flexibility of the ribs 1406 permits the ribs 1406 to compensate for tolerance errors in the cross-sectional dimensions of the tubular member into which the bushing 1400 is inserted. The ribs 1406 also provide an advantage in aiding the gripping process between the bushing 1400 and the tubular member into which it is inserted.

Also depicted in FIG. 14B are optional longitudinal grooves 1408 that run along the interior surface of the bushing 1400. The longitudinal grooves 1408 reduce the surface are of the bushing 1400 in contact with the coupling members 322, thus reducing friction during insertion of the coupling members 322.

Figure 16:
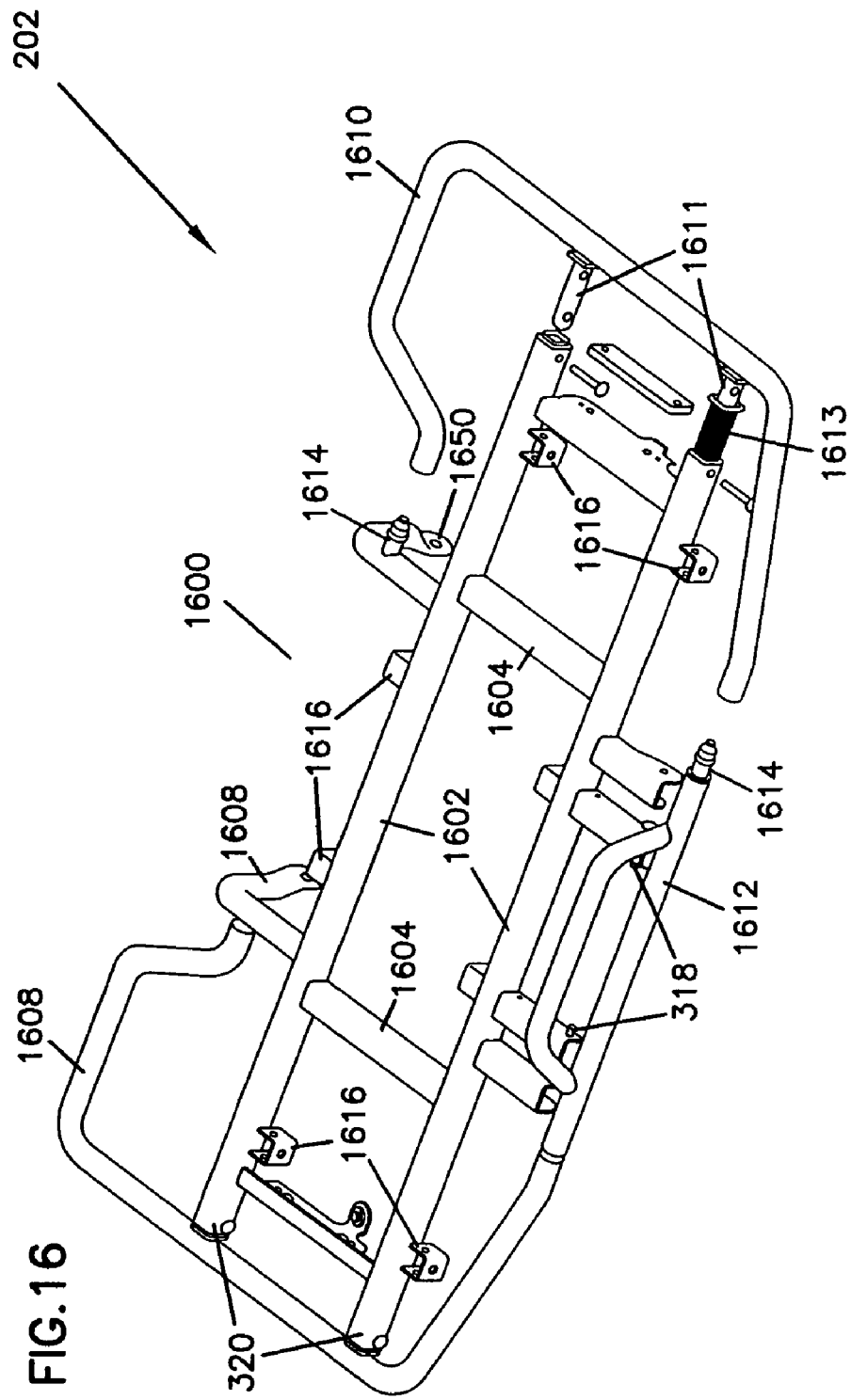
FIG. 16 depicts another embodiment of a sectional receiver rack.

FIG. 16 depicts another embodiment of a sectional receiver rack 202. The sectional receiver rack 202 includes a main framework 1600, which itself includes two substantially parallel tubular members 1602. Cross-linking members 1604 extend between the parallel tubular members 1602, providing lateral stability to the receiver rack 202. Mounting flanges 1606 may extend downwardly from one or both of the parallel tubular members 1602. The mounting flanges 1606 permit the rack 202 to be coupled to the ATV.

Like the embodiment depicted in FIG. 3, the embodiment of FIG. 16 utilizes couplers, which may be separate members, as in the case of couplers 318, or which may take on the form of the outermost portion of the tubular members 1602 themselves, as in couplers 320. The embodiment of FIG. 16 differs from the embodiment of FIG. 3 in certain respects. The embodiment of FIG. 16 includes auxiliary pieces 1608, 1610, and 1612, which fit to the main framework 1600, and fit to each other so as to form a continuous periphery. Where the outermost portions of the auxiliary pieces 1608, 1610, or 1612 connect to each other or to the main framework 1600, a coupling button 1614 is used. The coupling button 1614 is depicted in greater detail in FIG. 18.

As can be seen in FIG. 18, the coupling button 1614 is composed of a distal portion 1800 and a proximal portion 1802. The proximal portion 1802 is designed to mate with a given member of the sectional receiver rack 202. For example, the proximal portion 1802 may have a concave shaped end portion 1803, so as to permit the proximal portion 1802 to be welded to a cylindrical surface, such as the outer surface of a round mounting flange 1606, as shown in FIG. 16. Alternatively, the end portion 1803 may be flat, so as to permit the proximal portion 1802 to be mounted to a flat surface or to be inserted within the hollow end of the auxiliary pieces 1608, 1610, 1612. The distal portion 1800 has a groove 1806 machined into its surface. The groove 1806 mates with a rubber o-ring 1807. The o-ring 1807 fits between the coupling button 1614 and the inner surface of the hollow ends of the auxiliary pieces 1608, 1610, 1612. The o-ring 1807 is slightly flexible, meaning that it can compensate for tolerance errors of the auxiliary frame pieces 1608, 1610, 1612. Also, the o-ring 1807 dampens noise that might be generated by the hollow ends of the auxiliary pieces 1608, 1610, 1612 chattering with the coupling button 1614. The distal portion 1800 of the coupling button 1614 is tapered at its end 1808, so as to permit the hollow ends of the auxiliary pieces 1608, 1610, and 1612 to fit easily over the coupling button 1614.

Returning to FIG. 16, the auxiliary pieces 1608, 1610, and 1612 include coupling members 1611. Unlike the coupling members 322 depicted with the embodiment of FIG. 3, the coupling members 1611 of FIG. 16 are solid pieces (not tubular). The solid coupling members 1611 are dimensioned to as to substantially vertically fill the interior of the bushing 1613 into which it is inserted (such as the bushing depicted in FIGS. 14A and 14B), but to be substantially horizontally smaller than the interior of the bushing. Thus, the coupling member 1611 allows for tolerance error in the horizontal direction. Optionally, the solid coupling members 322 may be pierced to permit a restraining pin to pass through.

As can also be seen from FIG. 16, vertically oriented couplers 1616 are attached to the main framework 1600. The vertically oriented couplers 1616 permit a cargo unit 106 to be mounted in a plane perpendicular to that which results from mounting via couplers 320 or 318. The vertically oriented couplers 1616 have the same cross-sectional dimensions as do couplers 318 or 320, and may be pierced to permit a restraining pin to pass through. Additionally, the vertically oriented couplers 1616 are disposed in relation to each other in a manner identical to that of the horizontally disposed couplers 318 and 320, thereby permitting any cargo unit to mate with either the horizontally disposed couplers 318 and 320 or the vertically oriented couplers 1616. The vertically oriented couplers 1616 are useful for certain forms of cargo units 106, such as winches, which are activated along a direction dictated by the orientation of mounting to the ATV.

FIG. 17 depicts yet another embodiment of the sectional receiver rack 202. Like the embodiment depicted in FIG. 16, the embodiment of FIG. 17 includes two substantially parallel tubular members 1702. The tubular members 1702 are joined by cross-linking members 1704. The rack 202 includes mounting flanges 1706. The rack 202 also includes auxiliary frame pieces 1708, 1710, and 1712, which cooperate to form a continuous periphery. Once again, where the outermost portions of the auxiliary pieces 1708, 1710, or 1712 connect to each other or to the main framework 1700, a coupling button 1714 (identical to coupling button 1614) is used. Again, solid coupling members 1711 are utilized. The solid coupling members cooperate with the bushings 1713 to form a snug connection between the auxiliary frame pieces 1708, 1710, and 1712 and the main framework 1700. Furthermore, vertically oriented couplers 1716 are utilized. The embodiment of FIG. 17 differs from the embodiment of FIG. 16 mainly in that it possesses additional coupling members 318, and uses its cross-linking members 1704 as couplers 318. Additionally, the parallel tubular members 1702 may be constructed of more than one section of tubing.

Figure 5:
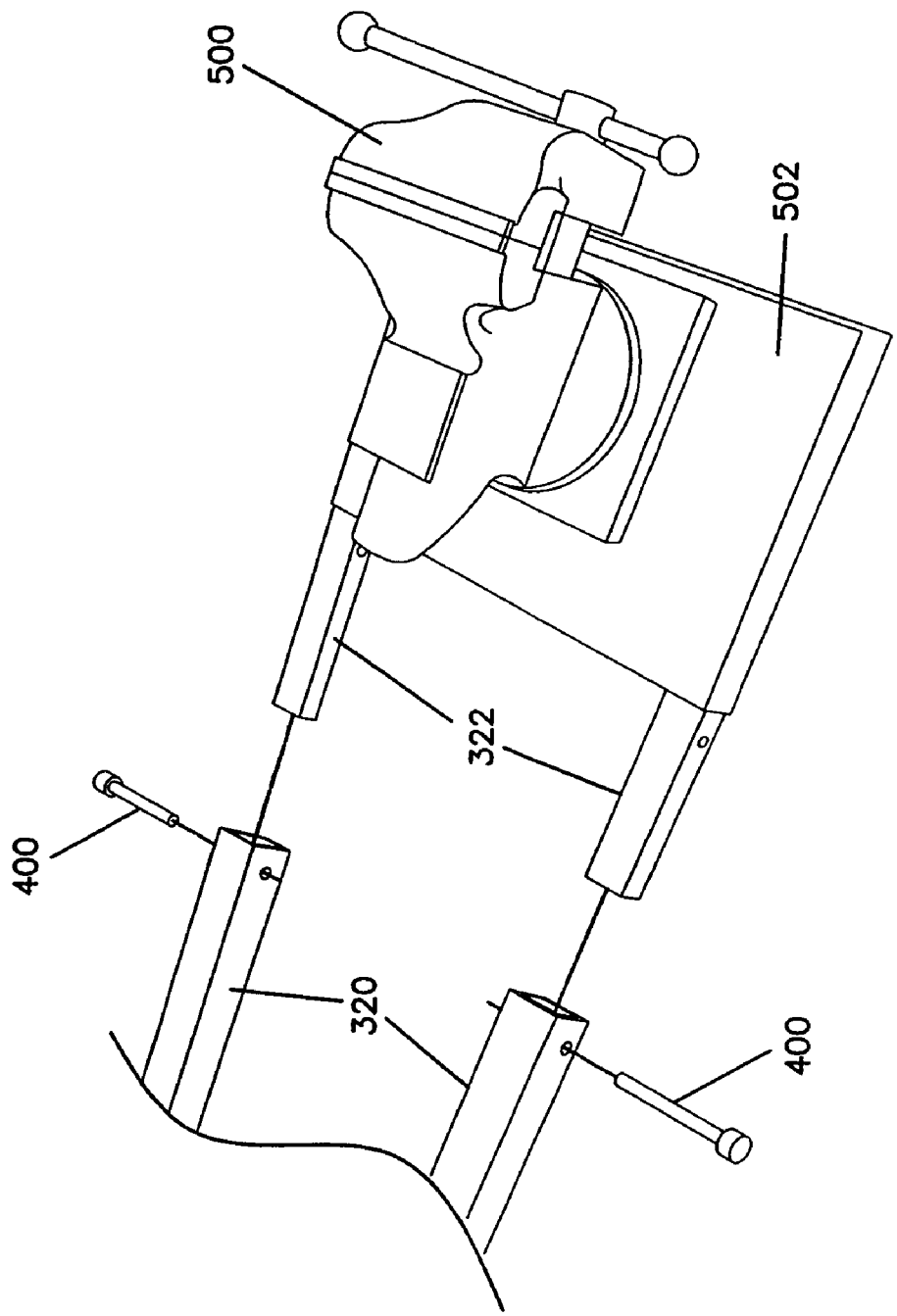
FIG. 5 depicts an exemplary cargo unit that has been adapted for cooperation with the sectional receiver rack, in accordance with one embodiment of the present disclosure.

FIG. 5 depicts an exemplary cargo unit 500 that has been adapted for cooperation with the sectional receiver rack 202. The cargo unit 500 depicted in FIG. 5 is a vise. The vise 500 is mounted atop a platform 502. On the periphery of the platform 502 are two coupling members 322. As described with reference to FIGS. 3 and 4, the coupling members 322 are dimensioned so that they may be inserted into the couplers 318, 320 of the main framework 300, thereby securing the vise 500 to the main framework 300. Restraining pins 400 are used to lock the coupling members 322 within the couplers 318, 320. Accordingly, the vise 500 may be secured to the main framework 300 by virtue of its couplers, rather than via use of bungee cord or some other improvised attaching means.

Figure 6A:
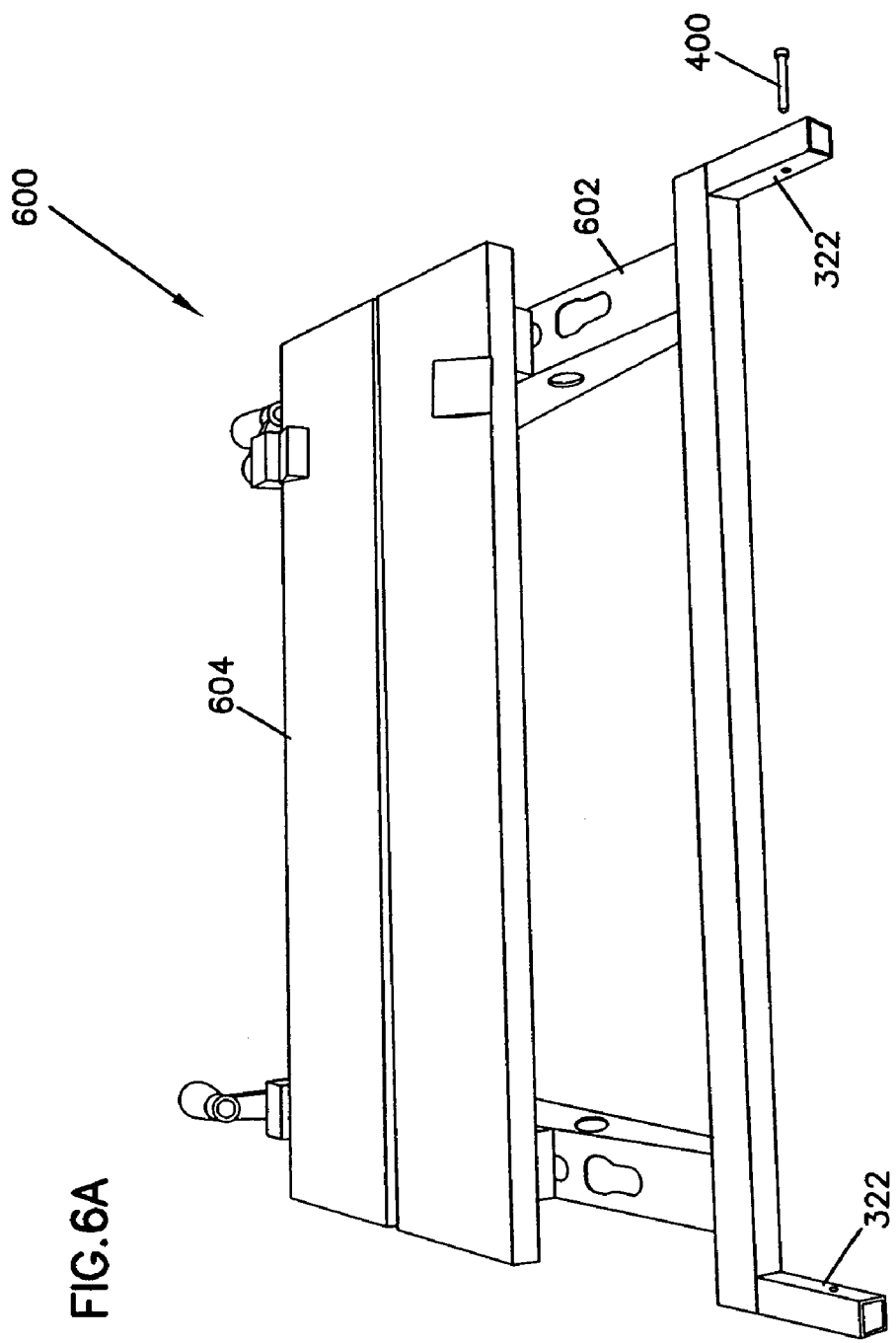
FIG. 6A depicts another exemplary cargo unit that has been adapted for cooperation with the sectional receiver rack, in accordance with one embodiment of the present disclosure.
Figure 6B:
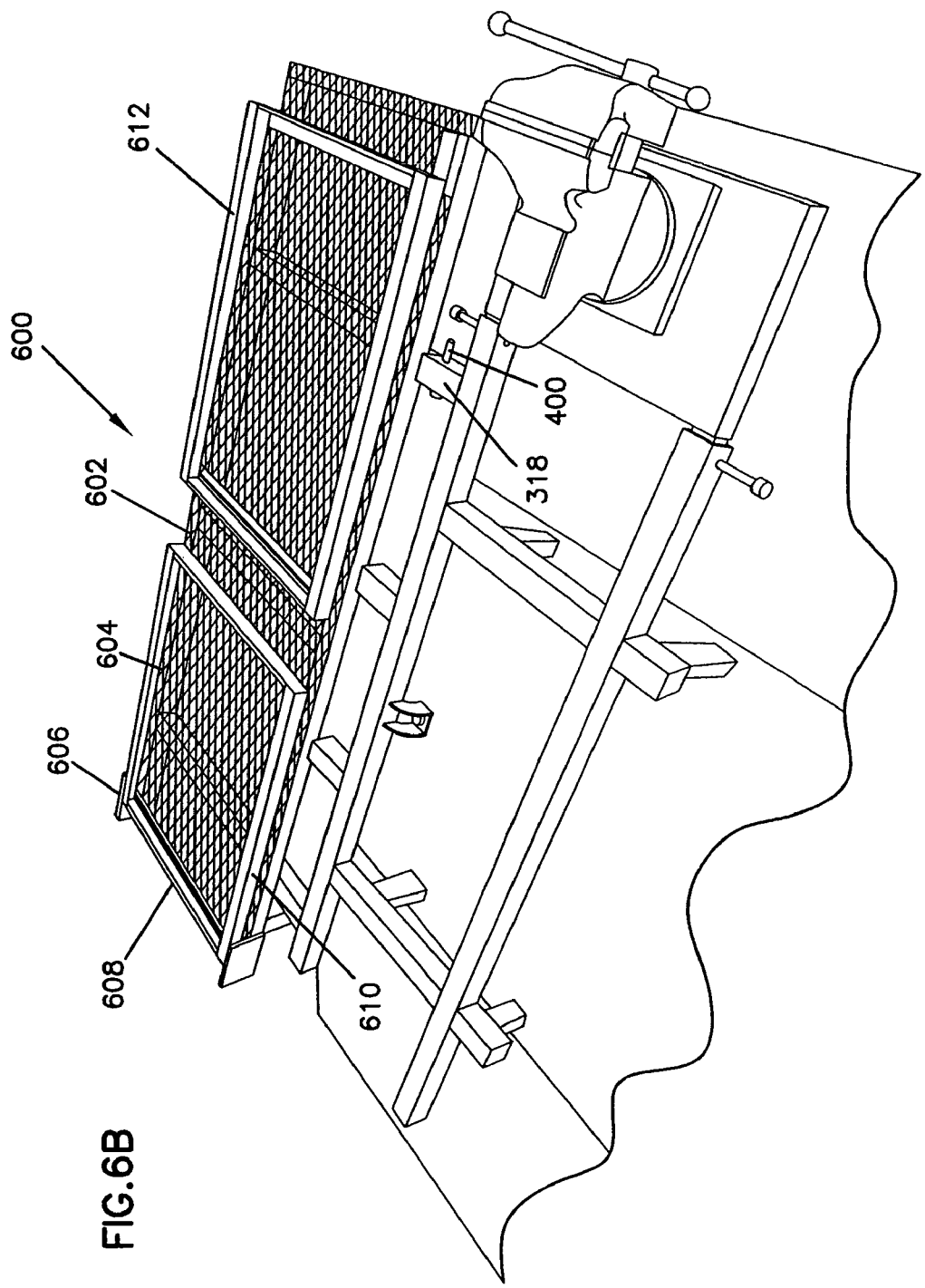
FIG. 6B depicts yet another exemplary cargo unit that has been adapted for cooperation with the sectional receiver rack, in accordance with one embodiment of the present disclosure.
Figure 6C:
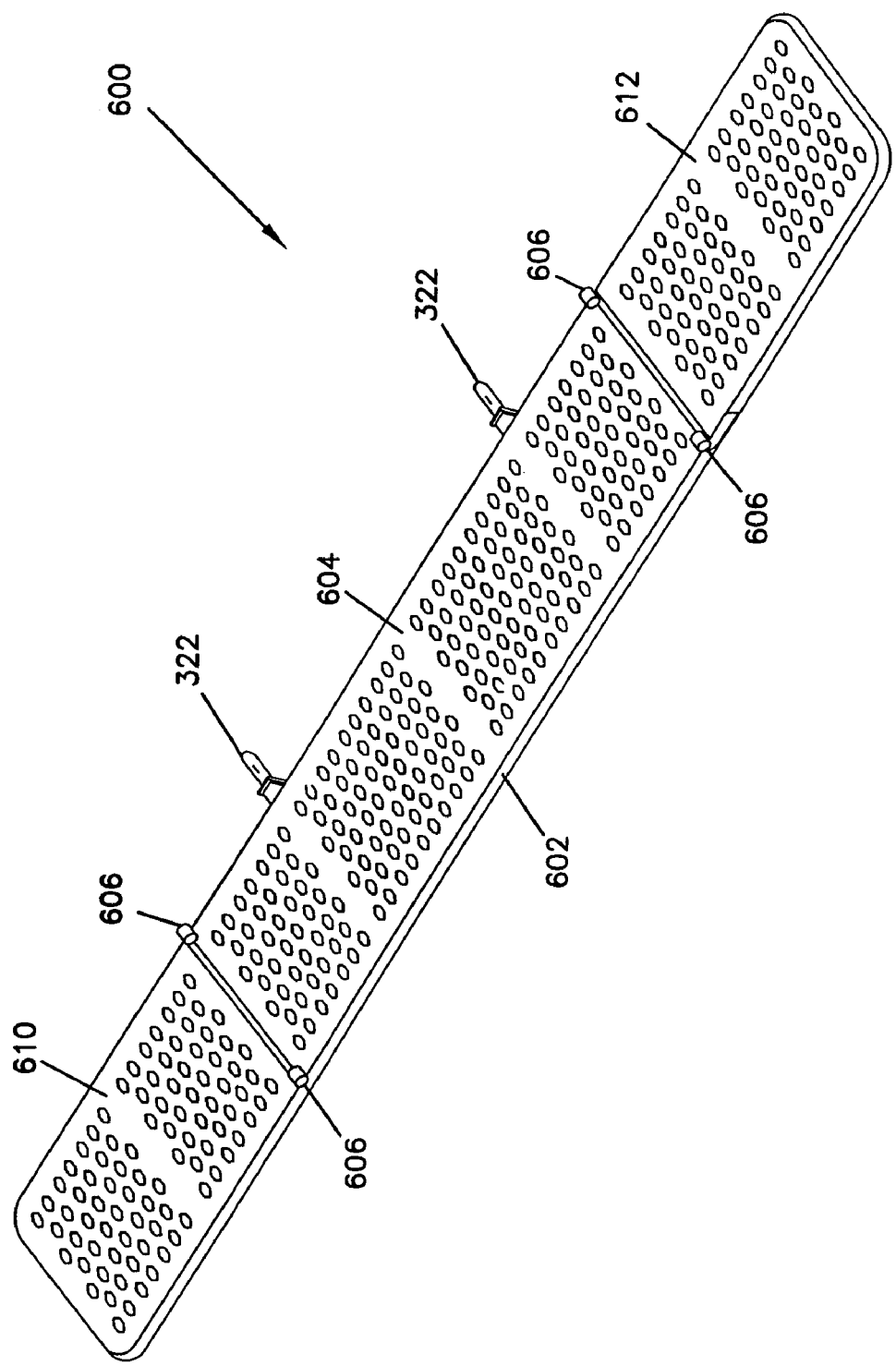
FIG. 6C depicts yet another exemplary cargo unit that has been adapted for cooperation with the sectional receiver rack, in accordance with one embodiment of the present disclosure.

FIGS. 6A, 6B, and 6C depict two exemplary cargo units 600 that have been adapted for cooperation with the sectional receiver rack 202. The cargo units 600 depicted in FIGS. 6A, 6B, and 6C is a workbench. The workbench 600 includes a frame 602, atop which a work surface 604 is attached. The work surface 604 may be a flat, solid surface, as shown in FIG. 6A, may be a metallic mesh 604, as shown in FIG. 6B, or may be a perforated metal, as shown in FIG. 6C. In any embodiment, the frame 602 has a plurality of coupling members 322 positioned along the edge of the frame 602 that is proximal to the main framework 300. Once again, the coupling members 322 are dimensioned so that they may be inserted into the couplers 318, 320 of the main framework 300, thereby securing the workbench 600 to the main framework 300. Restraining pins 400 are used to lock the coupling members 322 within the couplers 318, 320. In the embodiment depicted in FIGS. 6B and 6C the frame 602 possesses hinges 606 along its lateral edges 608. The hinges 606 join the frame 602 to auxiliary frame units 610, 612. The auxiliary frame units 610, 612 may be rotated to rest upon the frame 602, so that the auxiliary frame units 610, 612 do not protrude beyond the lateral edges of the ATV. Conversely, the auxiliary frame units 610, 612 may be rotated into an unfolded position, so that the work surface of the workbench 600 extends beyond the lateral edges of the ATV.

FIG. 7 depicts yet another exemplary cargo unit 700 that has been adapted for cooperation with the sectional receiver rack 202. The cargo unit 700 depicted in FIG. 7 is a cooking grill. The grill 700 is secured within a frame 702. The frame 702 has a plurality of coupling members 322 positioned along the edge of the frame 702. As shown in FIG. 7, the coupling members 322 may be defined by a rigid U-shaped tubular structure 704. Again, the coupling members 322 are dimensioned so that they may be inserted into the couplers 318, 320 of the main framework 300, thereby securing the workbench 700 to the main framework 300. The U-shaped structure 704 is, in turn, coupled to the frame 702. The U-shaped structure 704 serves as a base upon which the grill 700 may rest. When the grill 700 is inserted within the frame 702, the frame 702 runs along the periphery of the grill 700, thereby laterally securing the grill 700.

Figure 8:
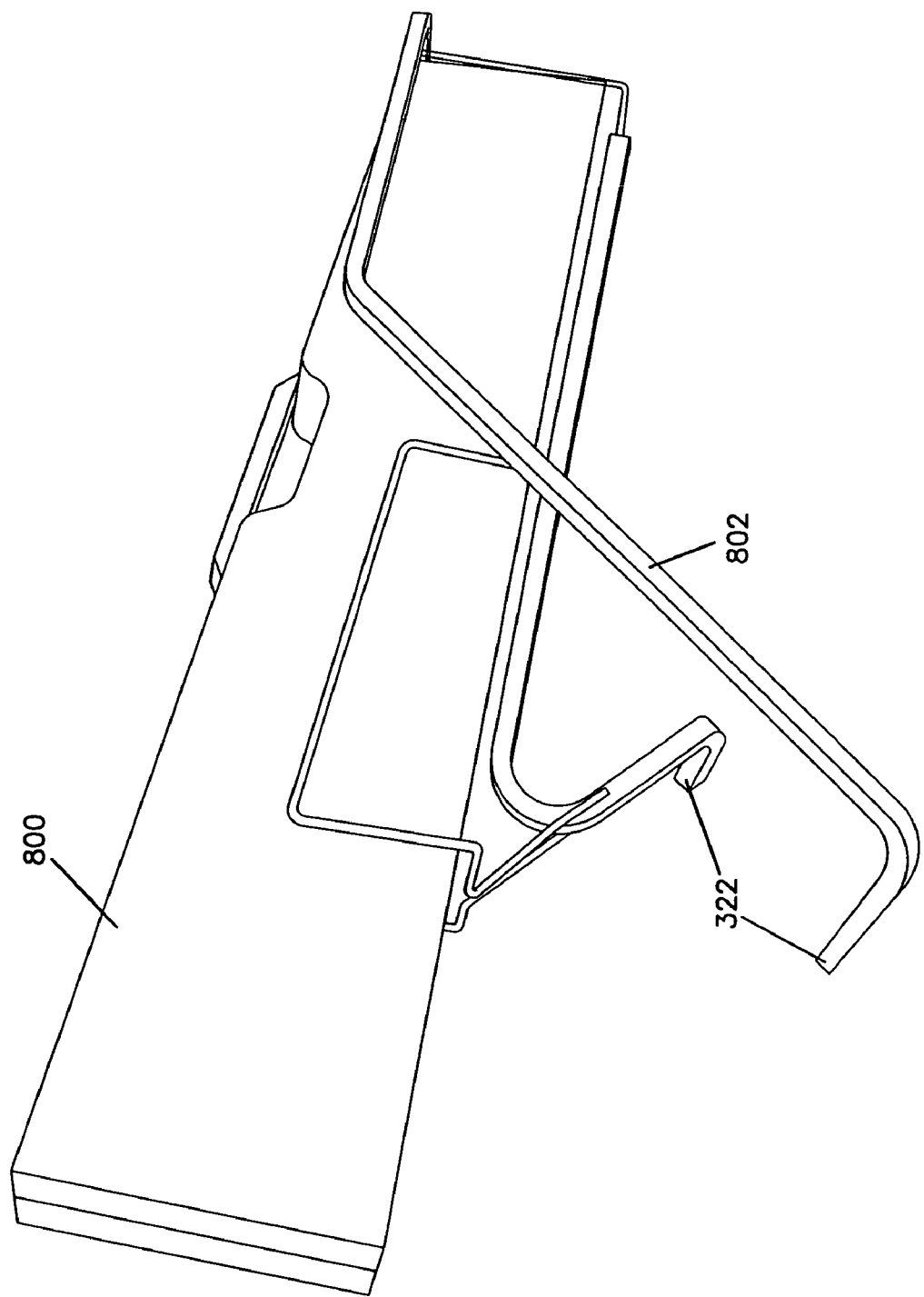
FIG. 8 depicts yet another exemplary cargo unit that has been adapted for cooperation with the sectional receiver rack, in accordance with one embodiment of the present disclosure.

FIG. 8 depicts yet another exemplary cargo unit 800 that has been adapted for cooperation with the sectional receiver rack 202. The cargo unit 800 depicted in FIG. 8 is a gun rack. The gun rack 800 is held by a frame 802. The frame 802 has a plurality of coupling members 322, which are dimensioned so that they may be inserted into the couplers 318, 320 of the main framework 300.

Figure 9:
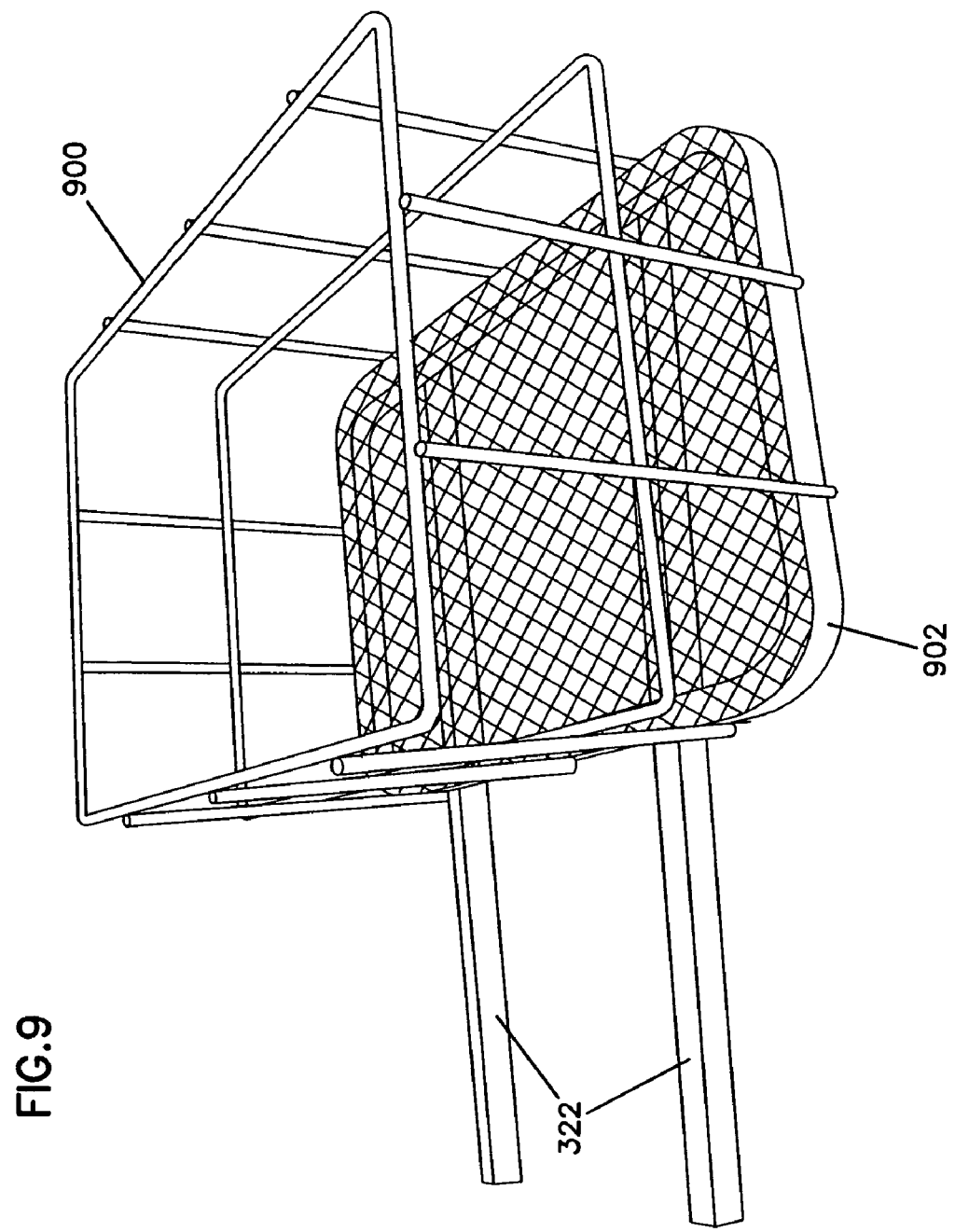
FIG. 9 depicts yet another exemplary cargo unit that has been adapted for cooperation with the sectional receiver rack, in accordance with one embodiment of the present disclosure.

FIG. 9 depicts yet another exemplary cargo unit 900 that has been adapted for cooperation with the sectional receiver rack 202. The cargo unit 900 depicted in FIG. 9 is a cargo bucket. The bottom surface of the cargo basket 900 is mounted to a frame 902. The frame 902 has a plurality of coupling members 322, which are dimensioned so that they may be inserted into the couplers 318, 320 of the main framework 300.

Figure 10:
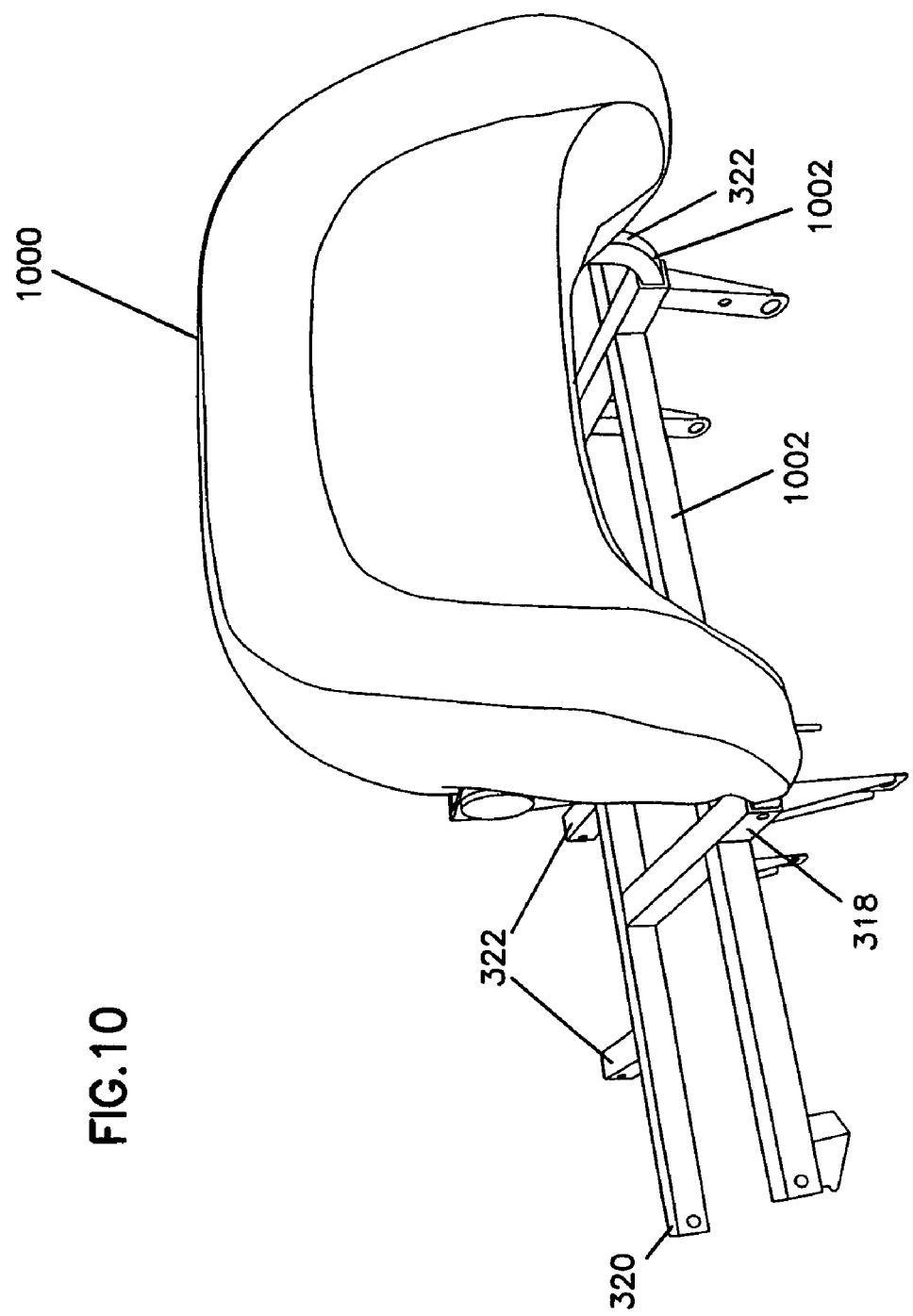
FIG. 10 depicts yet another exemplary cargo unit that has been adapted for cooperation with the sectional receiver rack, in accordance with one embodiment of the present disclosure.

FIG. 10 depicts yet another exemplary cargo unit 1000 that has been adapted for cooperation with the sectional receiver rack 202. The cargo unit 1000 depicted in FIG. 10 is an auxiliary back rest, which provides back support for the driver of the recreational vehicle. The back rest 1000 is mounted to a frame 1002, the ends of which may double as coupling members 322. The coupling members 322 are dimensioned so that they may be inserted into the couplers 318, 320 of the main framework 300.

Figure 11:
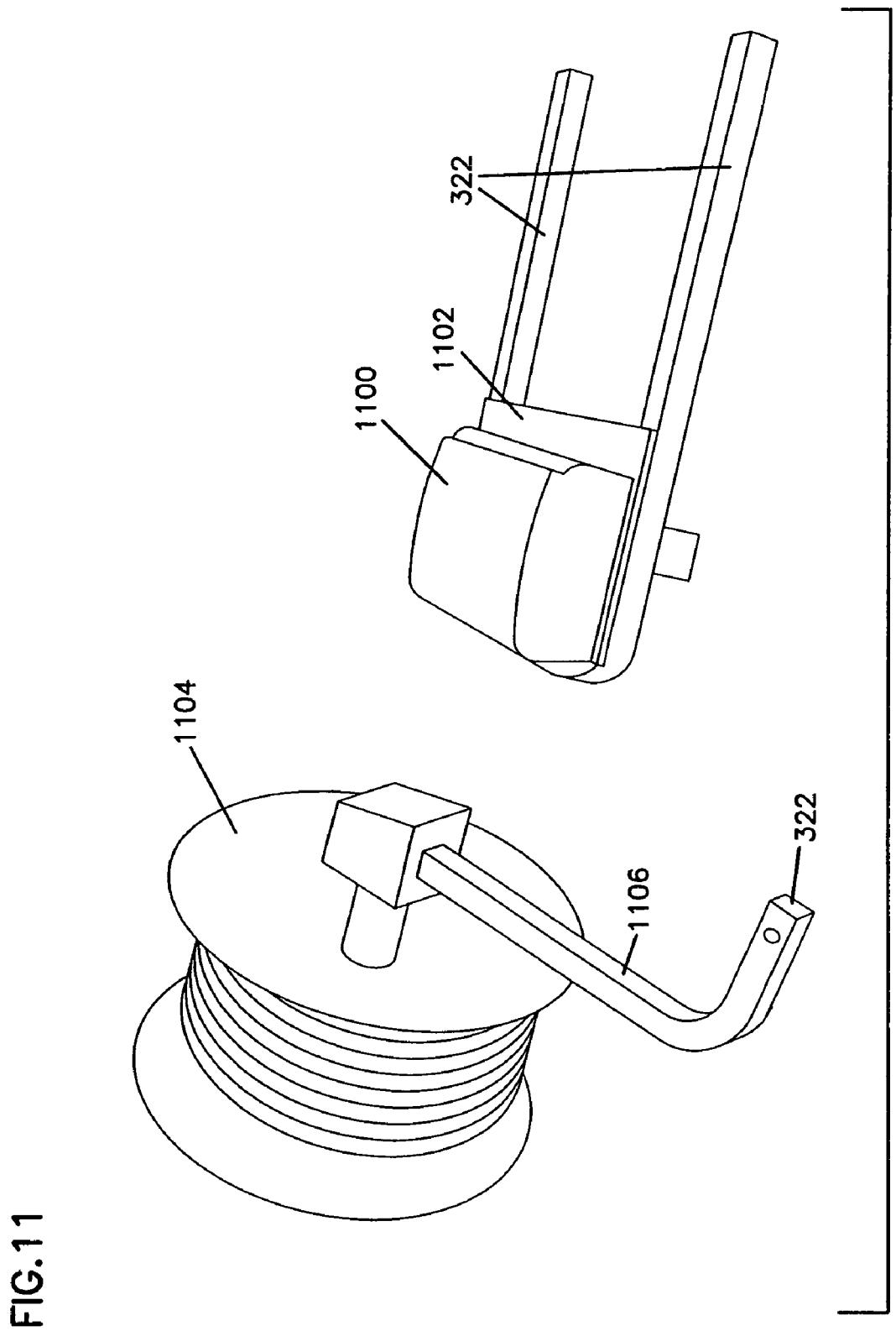
FIG. 11 depicts two other exemplary cargo units that have been adapted for cooperation with the sectional receiver rack, in accordance with one embodiment of the present disclosure.

FIG. 11 depicts a power inverter 1100 and an electrical cord reel 1104 which have been adapted for cooperation with the sectional receiver rack 202. The power inverter 1100 and the electrical cord reel 1104 are each mounted to frames 1102 and 1106, which are connected to one or more coupling members 322. The power inverter 1100 is used to convert 12 volt direct current (DC) power into 110 volt alternating current (AC) power. The electrical cord reel 1104 is used to carry the power cord, which may distribute power from the inverter 1100.

FIG. 19 depicts a cord reel 1900 that has been adapted for cooperation with the sectional receiver rack 202. The cord reel 1900 has a rotatable reel portion 1902 which is free to spin, and may be used to coil wire, rope, cord, or other such materials. A handle 1904 may be used to cause the reel 1902 to spin. The reel is mounted to a base 1906, which is, in turn, mounted atop a frame 1908. The frame 1908 includes coupling members 322, which may be used to secure the cord reel 1900 to the receiver rack 202.

Figure 20:
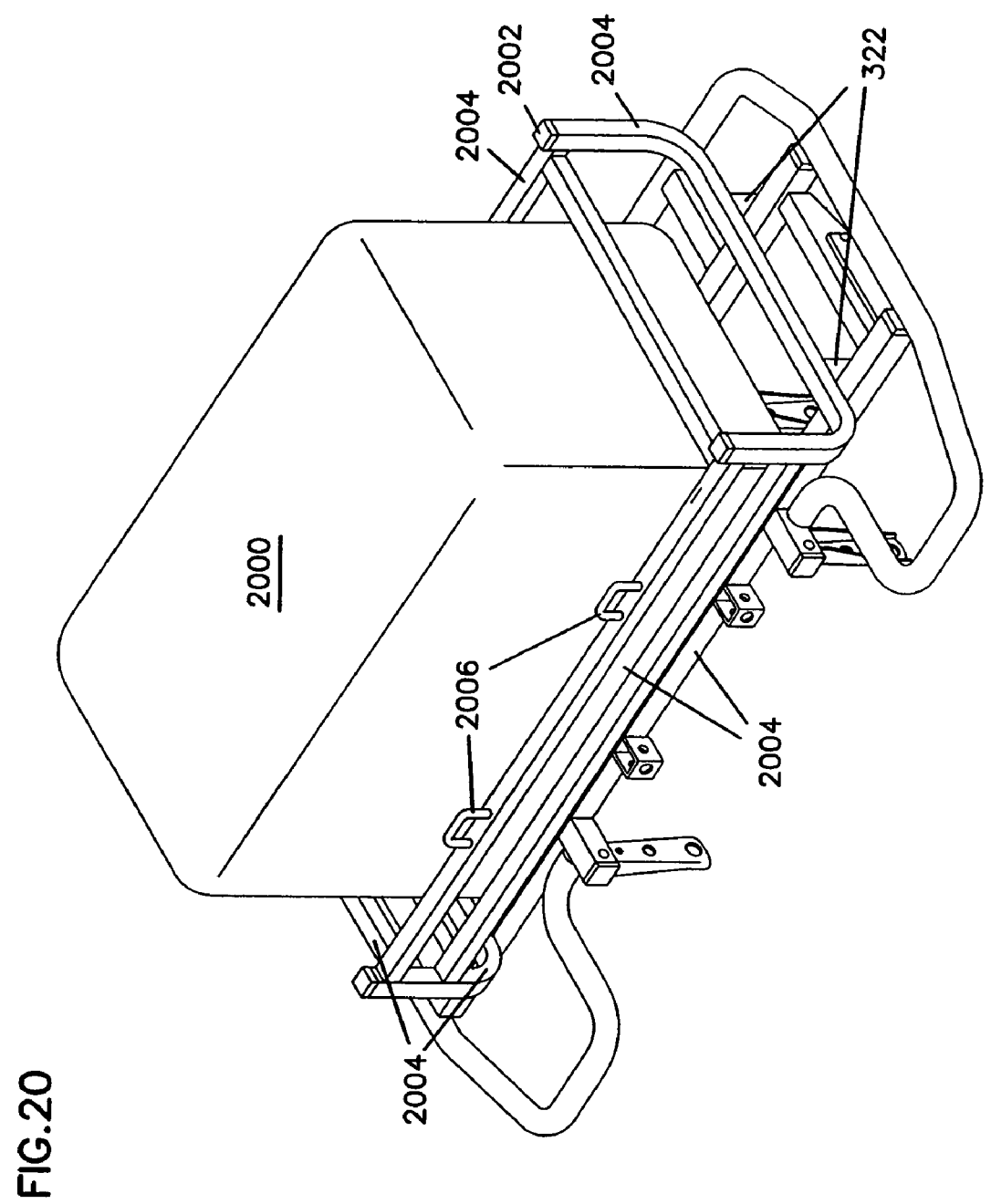

FIG. 20 depicts a carryall 2000 that has been adapted for cooperation with the sectional receiver rack 202. The carryall 2000 may take on the form of a cooler, box, basket, etc. The carryall 2000 is held within a frame 2002. The frame 2002 includes restraining members 2004 that run along the periphery of the carryall 2000, and serve to hold the carryall 2000. Attached to the restraining members 2004 are coupling members 322, which may cooperate with vertically oriented couplers mounts, such as are shown in FIGS. 16 and 17 (1616 and 1716) to secure the frame 2002 to the sectional receiver rack 202. The restraining members may include hook members 2006 that protrude upwardly therefrom. The hook members 2006 may be used to secure a cord, strap, or rope across the top of the carryall 2000, so as to hold the carryall 200 within the frame 2002.

Figure 21:
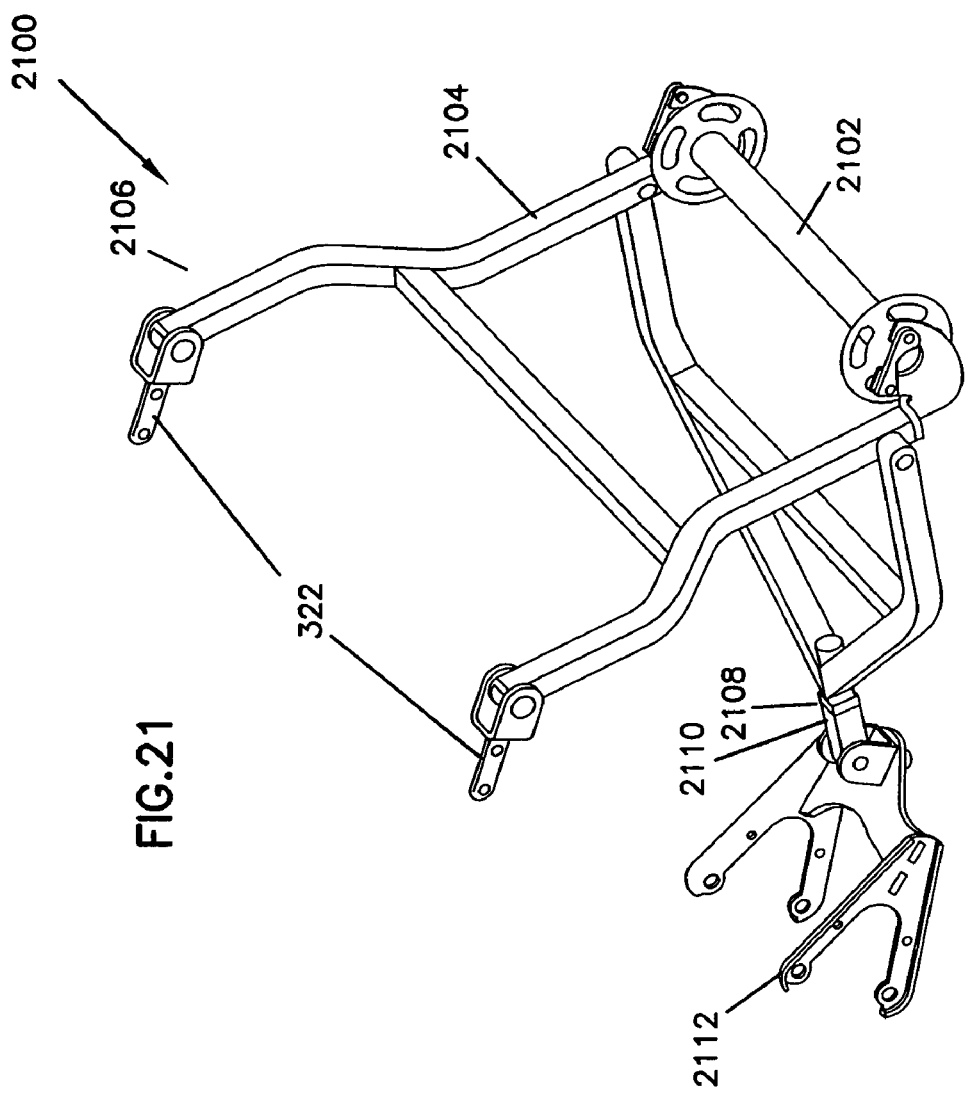

FIG. 21 depicts an articulating spool mount 2100 that has been adapted for cooperation with the sectional receiver rack 202. The spool mount 2100 includes a rotatable spool portion 2102. A coil of barbed wire, hose, cord, cable, or other such material may be wound around the rotatable spool portion 2102. The spool portion 2102 is releaseably connected on either end to a frame 2104. The frame 2104 has two ends, a rack-mounted end 2106 and a hitch-mounted end 2108. The rack-mounted end 2106 of the frame 2104 includes two coupling members 322, which permit the articulating spool mount 2100 to be secured to the sectional receiver rack 202. The hitch-mounted end 2108 of the frame 2104 includes a protruding member 2110 that mates with an ATV hitch 2112, which is a permanent part of the rear axle (not shown) of the ATV.

Figure 22:
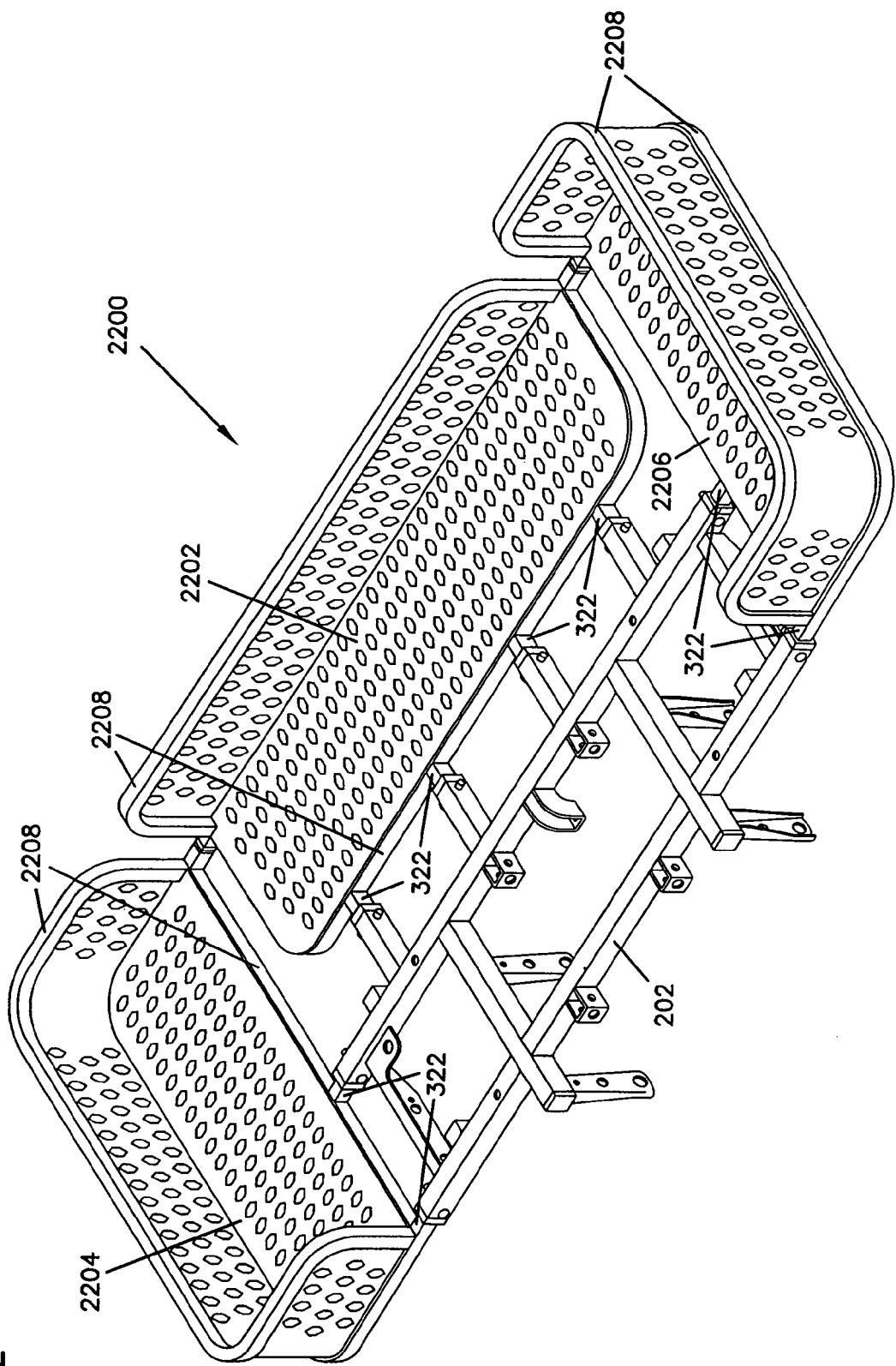

FIG. 22 depicts a carrying device 2200 that has been adapted for cooperation with the sectional receiver rack 202. The carrying device 2200 is composed of a middle piece 2202 flanked by two end pieces 2204, 2206. Each of the pieces 2202, 2204, and 2206 are composed of perforated metal fastened to a frame 2208. Perforated metal is desirable because it is flat and smooth. Attached to the frames of the pieces 2202, 2204, and 2206 are a plurality of coupling members 322, which serve to secure the various pieces 2202, 2204, and 2206 to the rack 202. Together, the middle piece 2202 and end pieces 2204, 2206 cooperate to form a partially enclosed volume in which an object may be carried.

Figure 23:
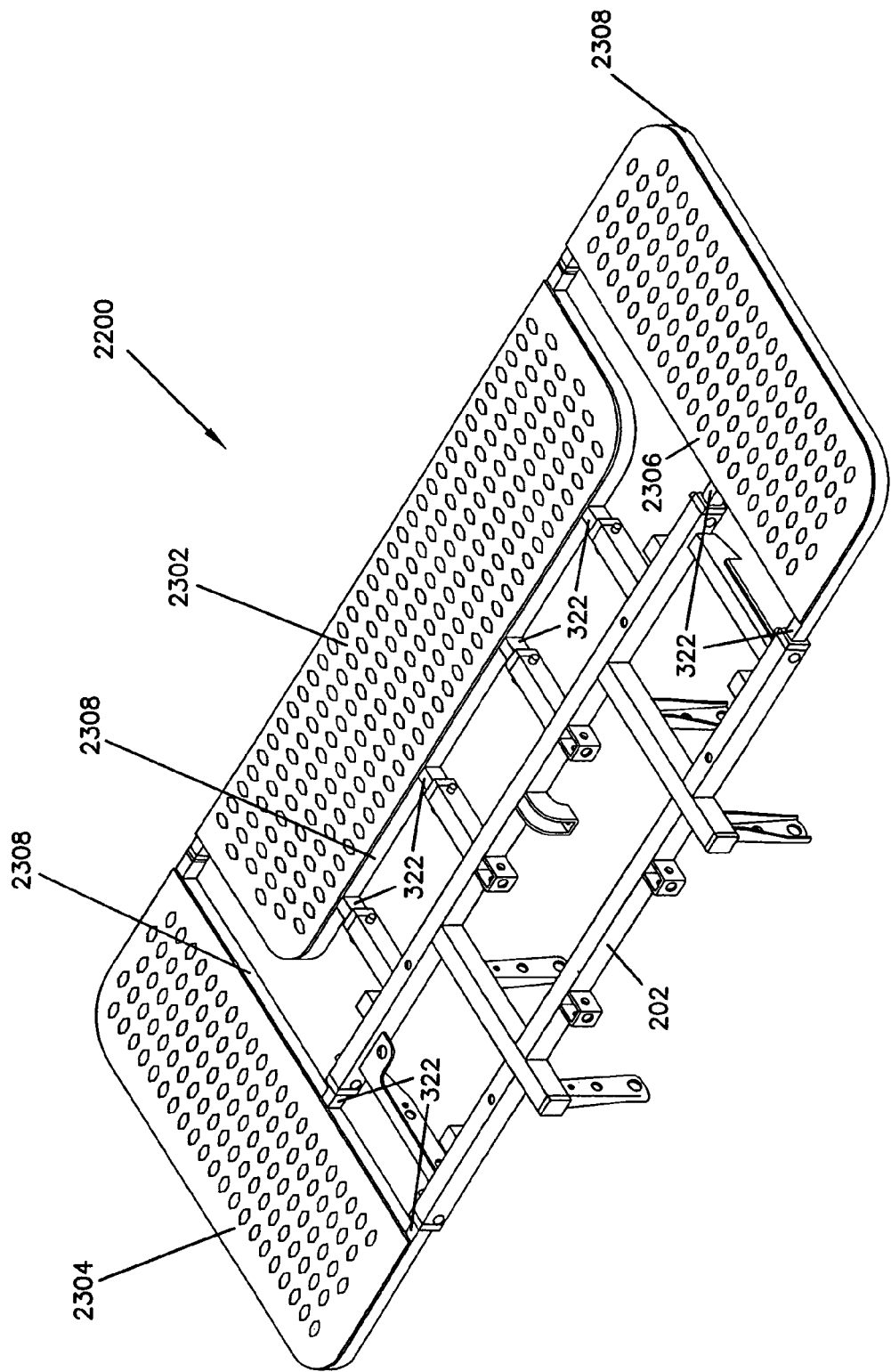

FIG. 23 depicts flatbed extensions 2300 which have been adapted for cooperation with the sectional receiver rack 202. The flatbed extensions 2300 are composed of a middle piece 2302 flanked by two end pieces 2304, 2306. Each of the pieces 2302, 2304, and 2306 are composed of perforated metal fastened to a frame 2308. Perforated metal is desirable because it is flat and smooth. Attached to the frames of the pieces 2302, 2304, and 2306 are a plurality of coupling members 322, which serve to secure the various pieces 2302, 2304, and 2306 to the rack 202. Together, the middle piece 2302 and end pieces 2304, 2306 cooperate to form a continuous surface upon which an object may be placed.

Figure 24:
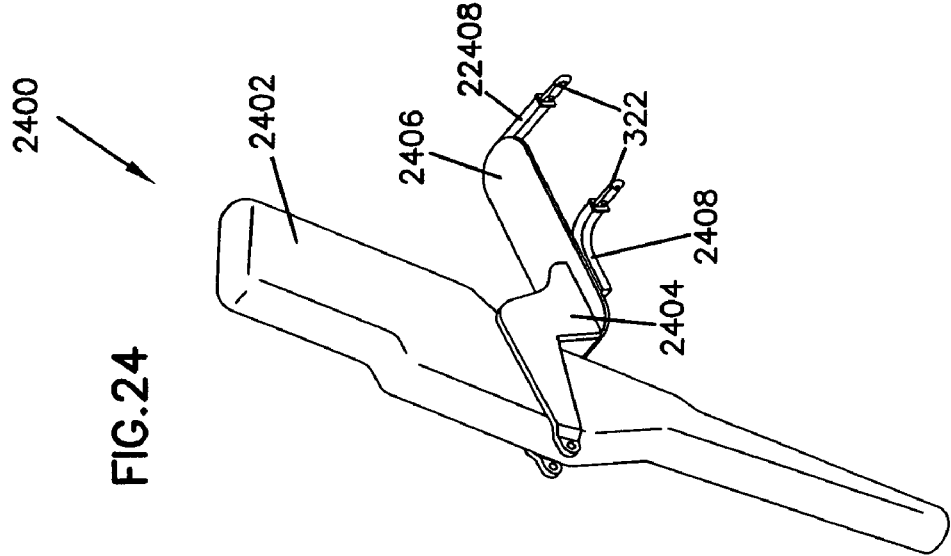

FIG. 24 depicts a gun scabbard mounting unit 2400 that has been adapted for cooperation with the sectional receiver rack 202. As can be seen from FIG. 24, the gun scabbard 2402 is held by an L-shaped bracket piece 2404. The L-shaped bracket piece 2404 is, in turn, mounted to a base 2406. The mounting may be accomplished by way of bolting the base 2406 (which may possess bolt holes to facilitate mounting) to the L-shaped bracket piece 2404. The base 2406 is mounted to a frame 2408, which includes a set of coupling members 322, which serve to secure the base 2406, L-shaped bracket 2404, and gun scabbard 2402 to the rack 202.

Figure 25:
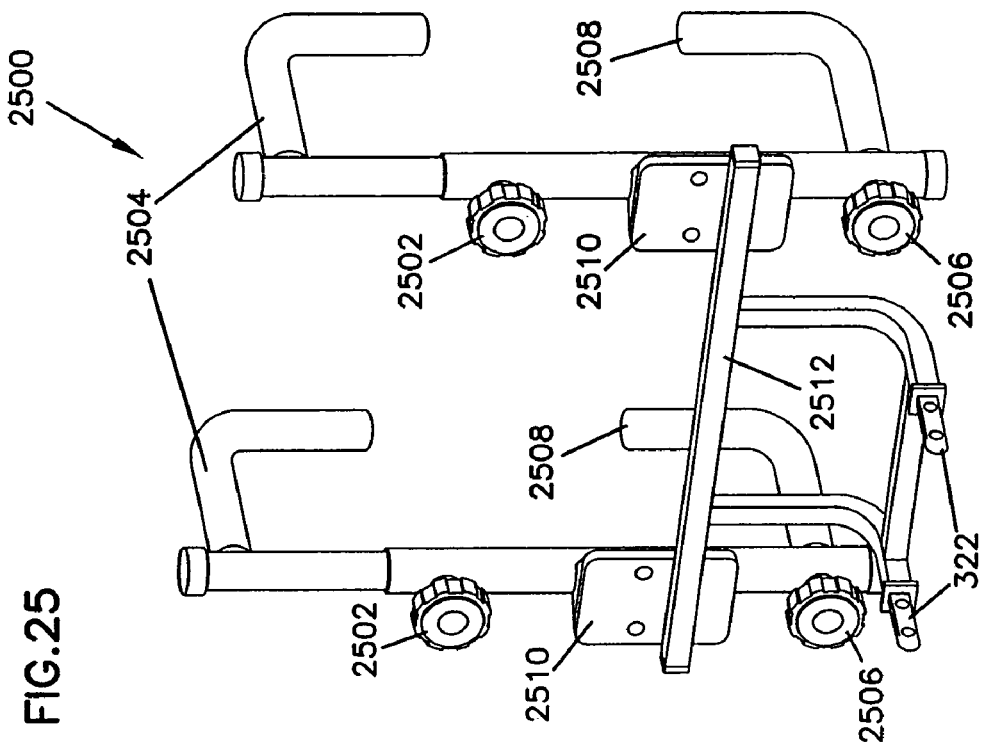

FIG. 25 depicts a gear lock 2500 that that has been adapted for cooperation with the sectional receiver rack 202. The gear lock 2500 design is standard. It includes a first set of gears 2502 that control the vertical orientation of a first set of clamping members 2504. By turning the gears 2502 either clockwise or counterclockwise, the first set of clamping members 2504 may be moved either upwardly or downwardly. A second set of gears 2506 controls the horizontal orientation of a second set of clamping members 2508. By turning the gears 2506 either clockwise or counterclockwise, the second set of clamping members 2508 are moved either inwardly or outwardly. The first and second set of clamping members 2504 and 2508 cooperate to form a channel into which an object, such as a bicycle may be clamped. The gear lock 2500 is fastened (e.g., via bolts) to a pair of bases 2510, which are, in turn, fastened to a frame 2512. The frame 2512 includes a set of coupling members 322, which serve to secure the gear lock 2500 to the rack 202.

Figure 26:
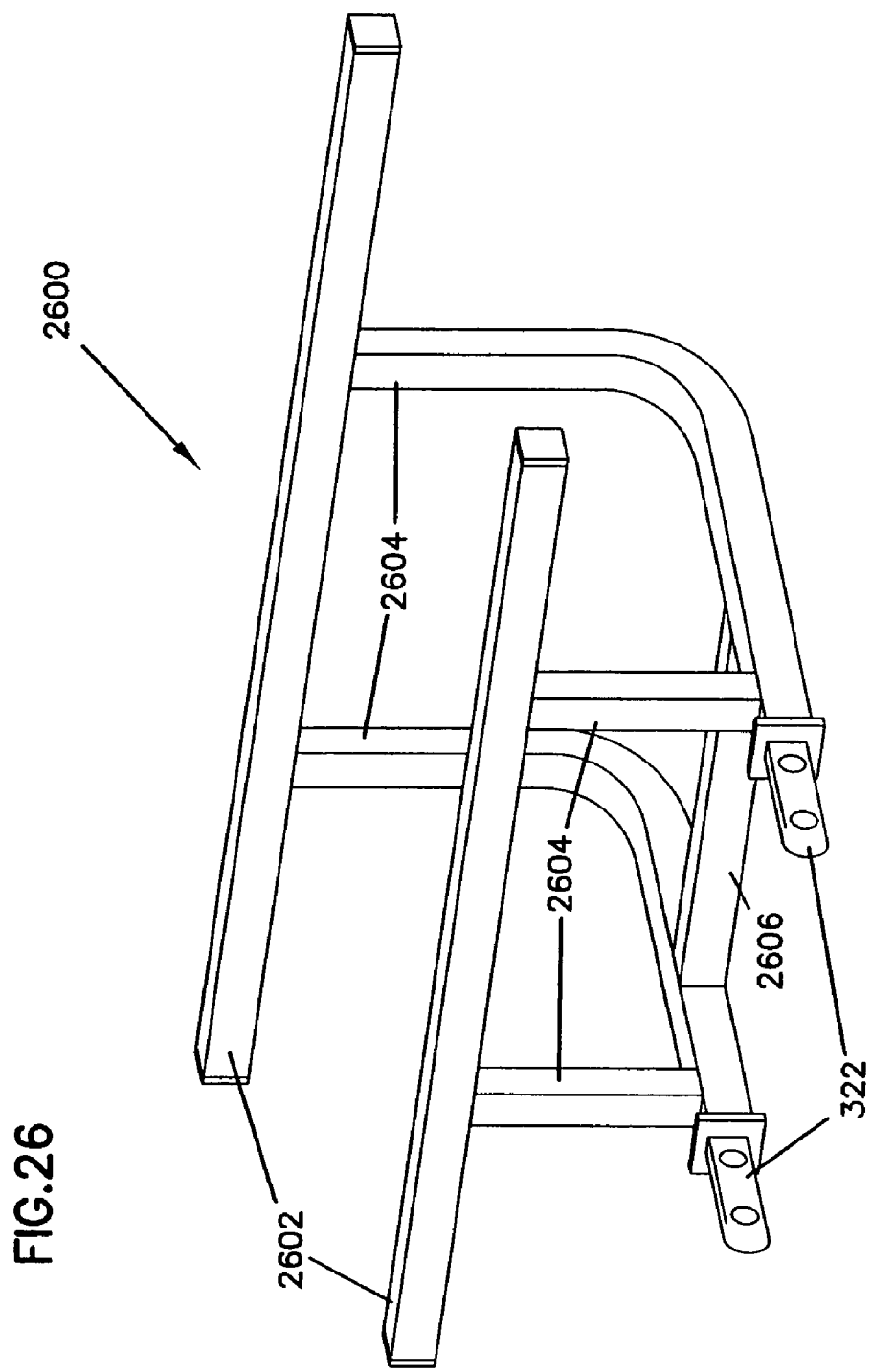

FIG. 26 depicts a gear cradle 2600 that has been adapted for cooperation with the sectional receiver rack 202. The gear cradle 2600 includes a set of substantially parallel restraining members 2602. Each of the substantially parallel restraining members 2602 has a pair of downwardly projecting members 2604 attached thereto. The downwardly projecting members 2604 may be cross-linked by one or more cross-linking members 2606. Together, the substantially parallel members 2602 and the downwardly projecting members 2604 cooperate to form a channel for carrying objects. The downwardly projecting members 2604 are attached to a set of coupling members 322, which serve to secure the gear cradle to the rack 202.

Figure 27:
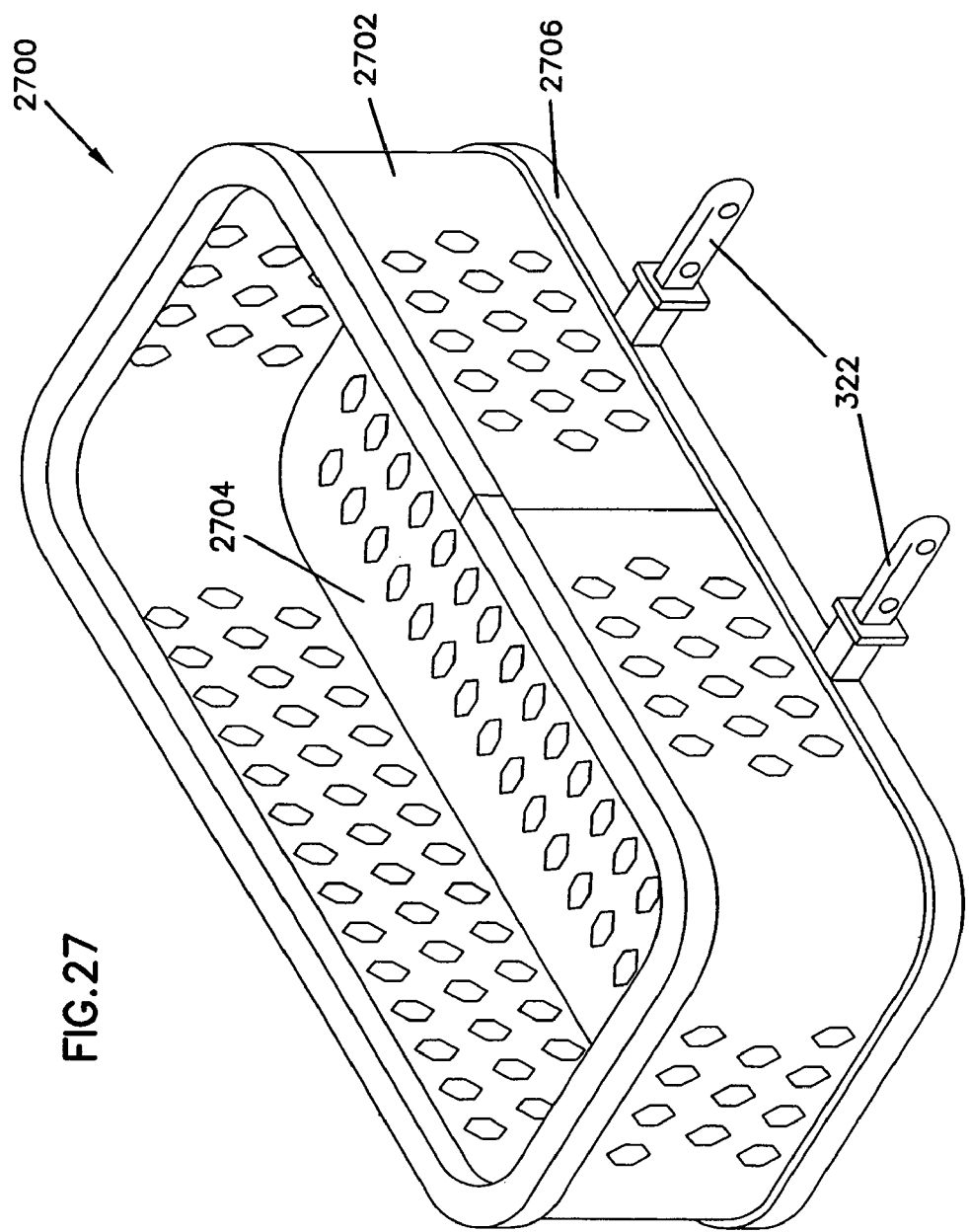

FIG. 27 depicts a fender box 2700 that has been adapted for cooperation with the sectional receiver rack 202. The fender box 2700 includes a set of side walls 2702 attached to a bottom portion 2704. The side walls 2702 and bottom portion 2704 cooperate to form a basket-like volume into which objects may be inserted for carrying. The side walls 2702 and bottom portion may be made of perforated metal, which is desirable due to its flatness and smoothness. The bottom portion 2704 is connected to a frame 2706, which includes a set of coupling members 322, which serve to secure the fender box to the rack 202.

FIG. 28 depicts a tool lock 2800 that has been adapted for cooperation with the sectional receiver rack 202. The tool lock 2800 includes a set of L-shaped clamping members 2802 that are vertical portions of which are substantially co-planar. A second clamping member 2804 is associated with each L-shaped member 2802. Each L-shaped clamping member 2804 and its associated clamping member 2804 are connected via a threaded fastener 2806, which is terminated by a wing nut 2808. The wing nut 2808 therefore controls the spacing between each L-shaped member 2802 and its associated clamping member 2804. A tool or other object may be secured between the L-shaped members 2802 and their associated clamping members 2804. The horizontal portion of each L-shaped member 2802 is bolted to a base 2810, which is, in turn, connected to a frame 2812. The frame 2812 includes coupling members 322, which serve to connect the tool lock 2800 to the rack 202.

FIG. 29 depicts a saw lock 2900 that has been adapted for cooperation with the sectional receiver rack 202. The saw lock 2900 includes a first plate 2902 that is substantially parallel to a second plate 2904. The first and second plates 2902 and 2904 are connected via threaded fasteners 2906. Wing nuts 2908 are disposed on the threaded fasteners 2906. The wing nuts 2908 may be turned either clockwise or counterclockwise to cause the first and second plates 2902 and 2904 to either approach each other or grow more distant. The blade of a saw or chainsaw, for example, may be clamped between the first and second plates 2902 and 2904. The first plate 2902 is attached to a base 2910, which is, in turn, attached to a frame 2912. The frame 2912 includes coupling members 322, which serve to connect the tool lock 2800 to the rack 202.

FIG. 30 depicts a workbase 3000 that has been adapted for cooperation with the sectional receiver rack 202. The workbase includes a base plate 3002 that is attached to a frame 3004 that runs along its periphery. The base plate 3002 provides a solid surface upon which to work. Optionally, the base plate may define a plurality of holes 3006, such as threaded passages, which permit an object (e.g., a vise) to be mounted thereto. The frame 3004 includes coupling members 322, which serve to connect the workbase 3000 to the rack 202.

FIG. 31 depicts a utility bar 3100. The utility bar is connected to two substantially parallel frame pieces 3102, which are, in turn, connected to coupling members 322. The utility bar may be used, for example, to clamp various items upon (e.g., lights, a compass etc.). The coupling members 322 serve to connect the utility bar 3100 to the sectional receiver rack 202.

FIGS. 32A, 32B, and 32C depict various embodiments of a carryall 3200 that has been adapted for cooperation with the sectional receiver rack 202. Each of the various embodiments depicted in FIGS. 32A, 32B, and 32C possesses side portions 3202 and a bottom portion 3204. For each embodiment, the side portions 3202 and bottom portion 3204 cooperate to form a partially enclosed basket-like volume into which an object may be inserted for carrying. The bottom portion 3204 is connected to a frame 3206, which includes coupling members 322 that serve to connect the carryall 3200 to the rack 202.

The cargo units depicted in FIGS. 5-11 and 19-32C are exemplary, One skilled in the art understands that other forms of cargo units may be made to possess coupling members 322 that mate with the couplers 318, 320 of the main framework 300. Further, although the various embodiments of cargo units depicted in FIGS. 5-11 and 19-32 are shown as using either a tubular or solid coupling member 322, any embodiment of any cargo unit may make use of either a solid or tubular coupling member 322. Further still, any of the cargo units depicted in FIGS. 5-11 and 19-32C may be mated with either the horizontally disposed couplers 318 and 320 or the vertically oriented couplers 1616.

Figure 12:
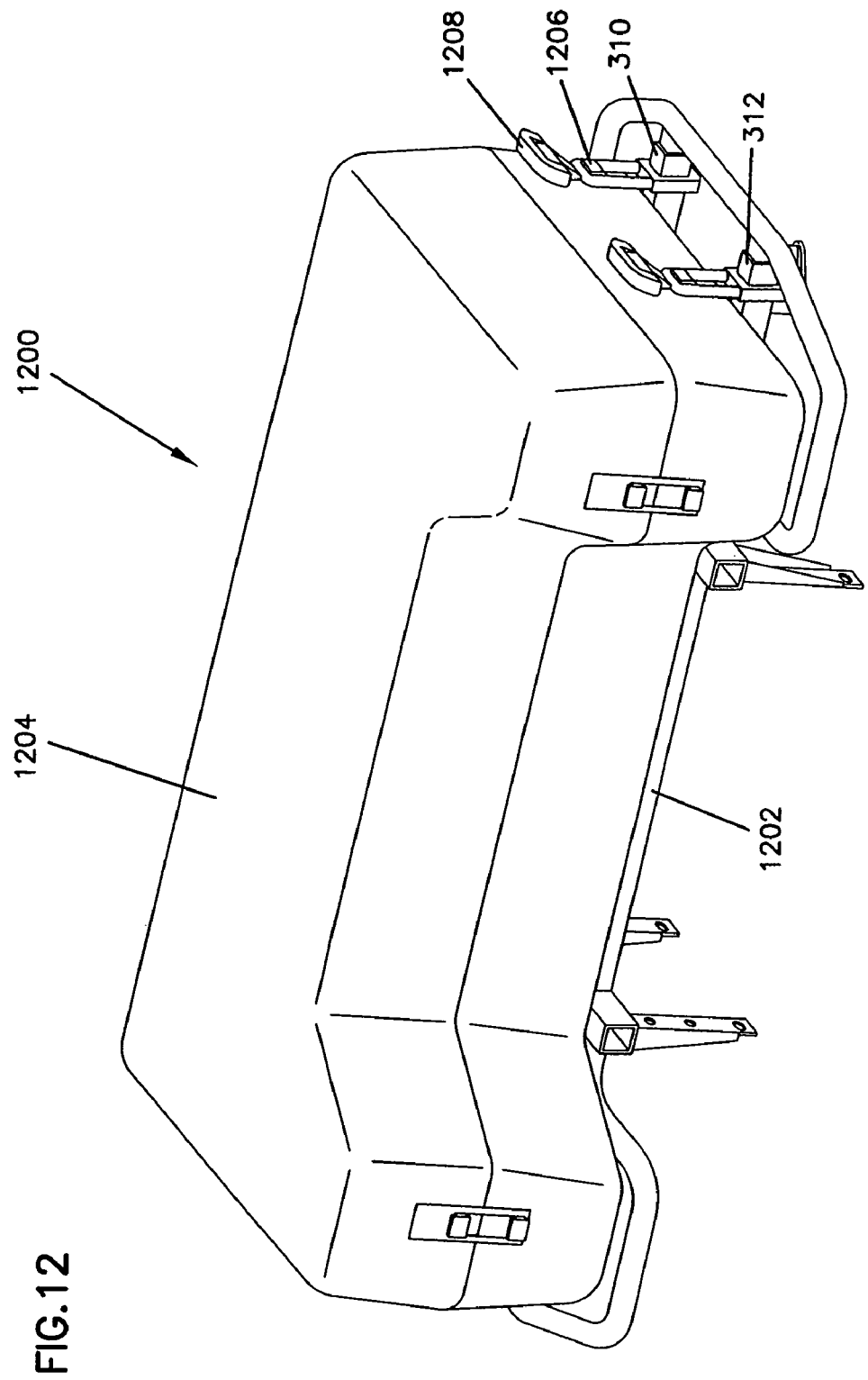
FIG. 12 depicts a cargo unit adapted for fastening to the sectional receiver rack, in accordance with one embodiment of the present disclosure.

According to another embodiment of the disclosure, cargo units may be made to mate with the receiver rack 202 by schemes other than attachment of coupling members to the cargo unit. FIG. 12 depicts one such embodiment. A storage box 1200 is depicted in FIG. 12. The storage box 1200 includes a base portion 1202 and a lid portion 1204. The base portion 1202 possesses a plurality of flanges 1206, which serve as anchor points around which releasable fasteners 1208 are hooked. The fasteners 1208 are designed to fit snugly with the parallel, tubular members 310 and 312 and hook around the flanges 1306, thereby securing the storage box 1200 to the receiver rack 202.

Figure 15A:
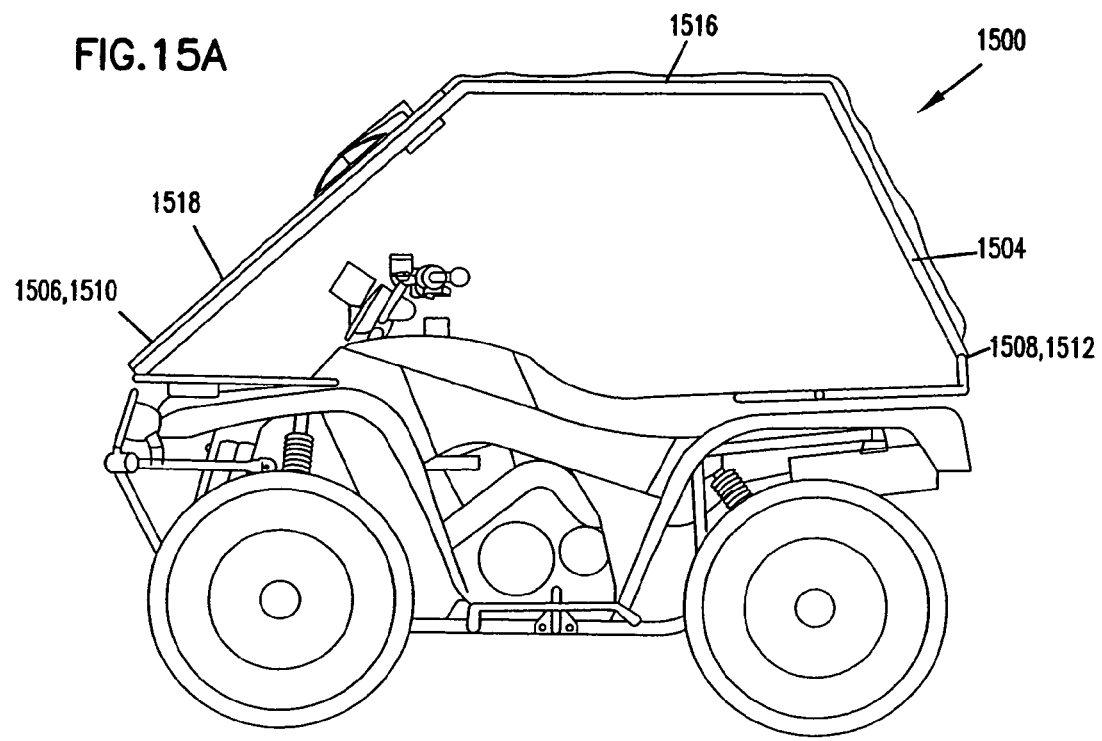
FIG. 15A depicts a side view of a recreational vehicle outfitted with a top unit that is arranged to mate with the sectional receiver unit, in accordance with one embodiment of the present disclosure.
Figure 15B:
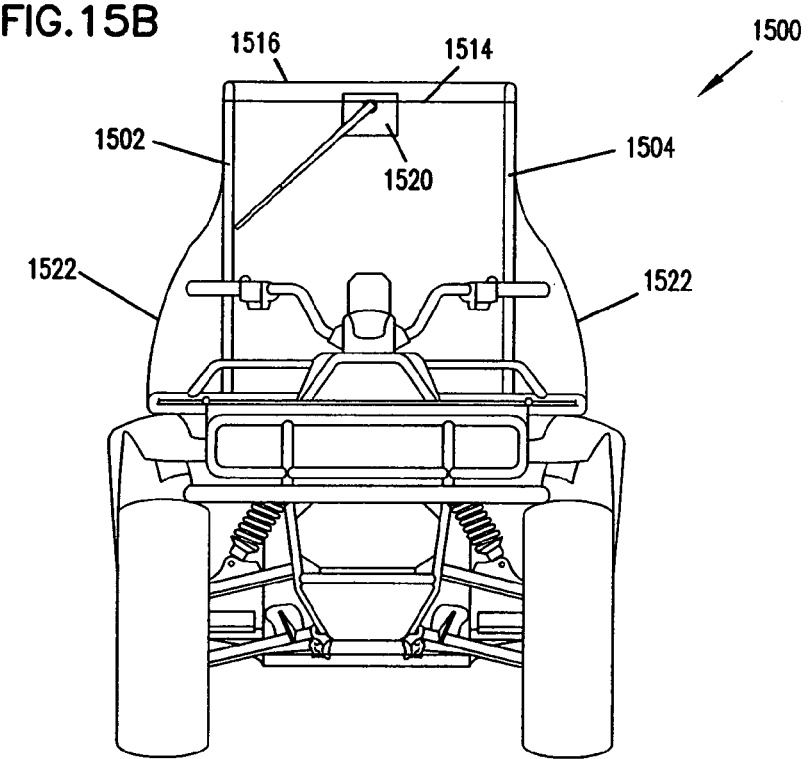
FIG. 15B depicts a side view of a recreational vehicle outfitted with a top unit that is arranged to mate with the sectional receiver unit, in accordance with one embodiment of the present disclosure.

FIGS. 15A and 15B depict a top unit 1500 that is arranged to mate with the couplers 104 of the main framework 102. The top unit 1500 includes two frame pieces 1502 and 1504, each of which extends from the rear of the ATV to the front of the ATV. A pair of main frameworks 102 are mounted upon mounting surfaces located at the front of the ATV and at the rear of the ATV. The first frame piece 1502 possesses a front coupling member 1506 that mates with a coupler 318 located on the frontally-mounted main framework 102, on its left-hand edge (wherein "left" refers to the direction that would be judged as being "left" from the vantage of a driver of the ATV). On its rear edge, the first frame piece 1502 possesses a rear coupling member 1508 that mates with a coupler 318 located on the rearward-mounted main framework 102, on its left-hand side. On the other side of the ATV (the right-hand side), the second frame piece 1504 possesses a front coupling member 1510 that mates with a coupler 318 located on the front mounted main framework 102, on its right-hand edge. On its rear edge, the second frame piece 1504 possesses a rear coupling member 1512 that mates with a coupler 318 located on the rearward-mounted main framework 102, on its right-hand side.

As can be seen from FIGS. 15A and 15B, each of the frame pieces 1502 and 1504 projects upwardly from the front edge of the ATV, so as to provide comfortable head room for a rider seated in the ATV. It is also dimensioned so as to provide a comfortable amount of space over the cargo area by the rearward main framework 102. Thus, the general shape of each of the two frame pieces 1502 and 1504 is such that each piece connects to a front corner of the ATV, projects upwardly therefrom, runs rearward toward the back of the ATV, and projects downwardly so as to permit a connection to a rear corner of the ATV. The frontal upward projection of each frame piece 1502, 1504 may be sloped, so as to generally mimic the shape of a front windshield of an automobile. One or more cargo uniting members 1514 may run between the frame pieces 1502, 1504, thereby providing lateral stability to the top unit 1500.

A canvas material (or other similar material) may be stretched so as to span the region between the two frame pieces 1502, 1504, thereby forming a top 1516, which might shield the passenger and cargo space of the ATV from rain or other elements. The canvas top 1516 may be removably fastened to the frame pieces 1502, 1504, such as by snaps or other fastening mechanisms known in the art.

Spanning the region between the frontal upward projection of each frame piece 1502, 1504 may be a transparent plastic material that acts as a windshield 1518. The windshield 1518 may be mounted on one end to a cross-linking member 1514 that runs along the bottom of the windshield 1518 and to another cross-linking member 1514 that runs along the top end of the windshield 1518. The windshield's 1518 sides may be mounted to each respective frame piece 1502 and 1504.

Optionally, the cross-linking member 1514 located along the bottom or top of the windshield 1518 may provide a pivotal anchor point for a windshield wiper unit 1520. The windshield wiper unit 1520 may draw its power from the electrical system of the ATV.

Optionally, windshield extensions 1522 may be coupled to the periphery of the windshield 1518. The windshield extension 1522 extends outwardly so as to protect the hands of the driver of the ATV.

Side curtains 1523 may optionally extend from the top of the frame pieces 1502, 1504 to a set of anchor points located along the forward and rearward edges of each frame piece 1502, 1504. Like the top 1516, the side curtains 1523 may be made of canvas or other similar material. The side curtains 1523, top 1516, and windshield 1518 cooperate to enclose the passenger and cargo space of the ATV.

According to one embodiment, the top 1516, side curtains 1523, and windshield 1518 are each made of a transparent plastic. In some embodiments, the transparent plastic is rigid, while in another embodiment, the transparent plastic material is a flexible sheet-like polymer.

Another embodiment of the disclosure is directed toward a method of doing business. The cargo units described in the passages corresponding to FIGS. 1 and 5-12 are items that are used in conjunction with ATVs. However, the revenue generated by the sale of those cargo units has heretofore been uncaptured by the manufacturer of the ATV. By producing a receiver rack designed to mate with particular cargo units, the ATV manufacturer is able to capture the revenue from the sale of those products.

Figure 13:
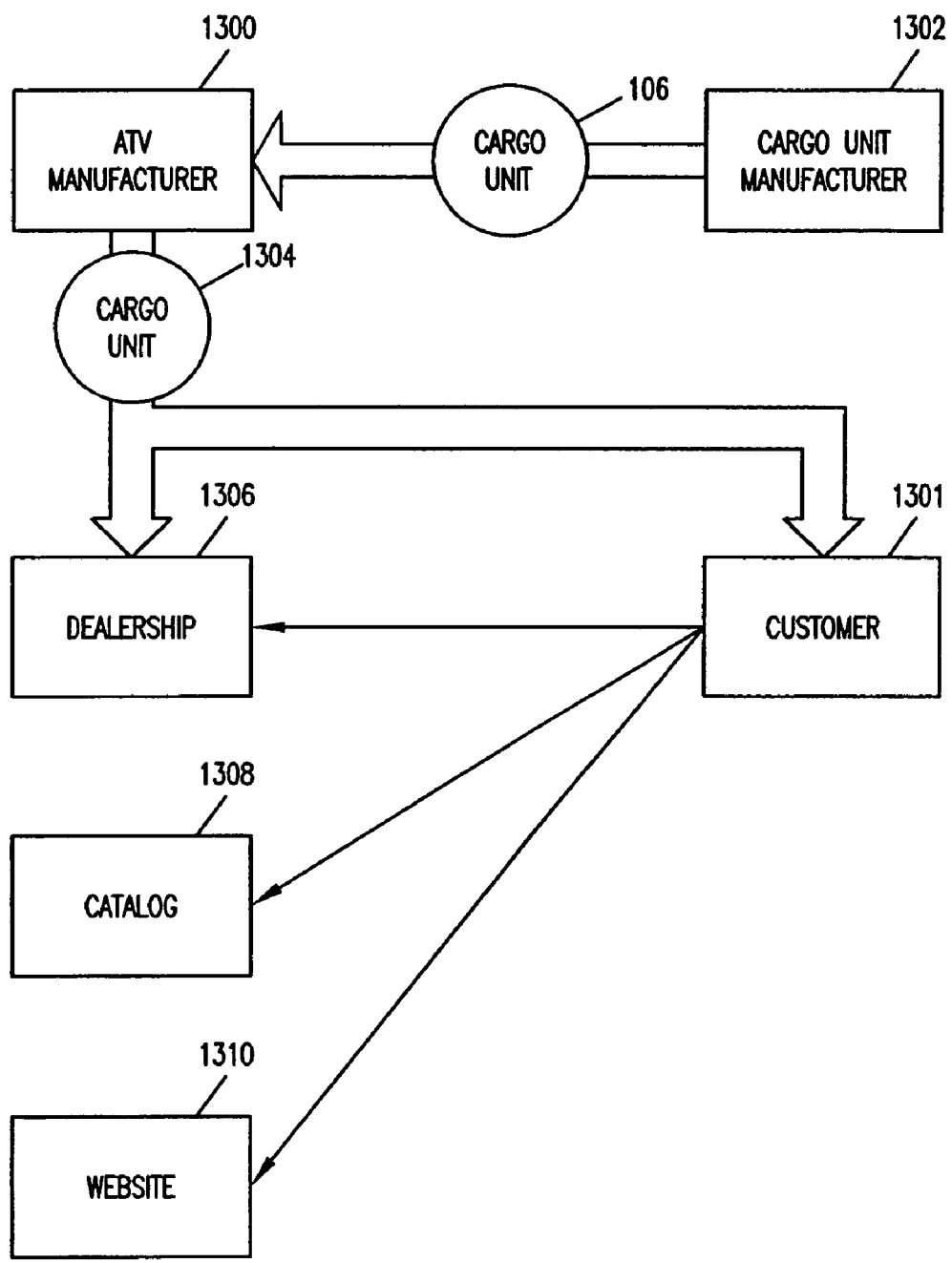
FIG. 13 depicts a business scheme by which a manufacturer of an ATV may capture some of the revenue generated from the sale of the cargo units, in accordance with one embodiment of the present disclosure.

FIG. 13 depicts a business scheme of by which a manufacturer 1300 of an ATV may capture some of the revenue generated from the sale of the cargo units. As can be seen from FIG. 13, the ATV manufacturer 1300 buys cargo units 106 from a cargo unit manufacturer 1302. The ATV manufacturer 1300 arranges for the cargo units 106 to be fitted with coupling members 322 for mating with the sectional receiver rack 202 (the ATV manufacturer 1300 can also fit the cargo units 106 to mate with the sectional receiver rack 202 in other ways, an example of which is depicted in FIG. 8). The ATV manufacturer 1300 may either perform the fitting operation itself, or may contract with a third party to do so.

The ATV manufacturer 1300 makes the fitted cargo unit 1304 available for sale by any of several means. The cargo unit 1304 may be shipped to an ATV dealership 1306 for presentation to customers 1301 in the same retail setting as the ATVs are sold. Also, the cargo unit may be advertised via a catalog 1308 or via a website 1310. Purchases conducted via a catalog 1308 or via a website 1310 may be transacted via a dealership 1306 or may be transacted directly between the ATV manufacturer 1300 and the customer 1301.

By selling the fitted cargo units 1304, the ATV manufacturer 1300 may realize a profit on the entire cargo unit 1304.

Another example receiver rack embodiment 30 is shown and described with reference to FIG. 33. Receiver rack 30 includes an outer frame member 31, first and second connecting members 32, 33, first, second and third sets of cross-linking members 34-36, and front and rear mounting flanges 37, 38. The outer frame member 31 includes elongate side members 31A, 31B that may be interconnected with each other across a front portion 31C of the receiver rack. In some embodiments, the members 31A-C may be an integral unitary piece, while in other embodiments these members may be separately formed and connected to each other. The first and second connecting members 32, 33 provide support across a width of the outer frame member 31. The cross-linking members 34-36 provide support between the connecting members 32, 33 and the outer frame member 31 in the length direction of the receiver rack 30. The members 31-36 provide a support or mounting surface across a top thereof for use, for example, in supporting a load or cargo on top of the receiver rack.

The receiver rack 30 includes a plurality of vertically oriented couplers 39 and a plurality of horizontally oriented couplers 40 positioned in spaced relation to each other on the rack 30. The vertical couplers 39 are supported by the first and second connecting members 32, 33 whereas the horizontal couplers 40 are supported by the cross-linking members 34, ends of the second connecting member members 33, and ends of the third set of cross-linking members 36. This arrangement of couplers is exemplary only. Other embodiments may include couplers positioned at other locations (e.g., noncoplanar in different horizontal planes) on the receiver rack 30.

Each of the couplers 39, 40 includes a bushing 42, and a passage or aperture 41 sized to receive a retain pin. The bushing 42 may have a configuration as described above with reference to bushing 1400 shown in FIGS. 14A-14C. The couplers 39, 40 are orientated such that openings into the bushing 42 face in generally perpendicular directions. However, the couplers 39, 40 are mounted in generally the same horizontal plane. This type of coplanar arrangement of the couplers may provide certain advantages related to, for example, manufacturing of the receiver rack 30 and attaching cargo units to he rack in a uniform manner.

The mounting flanges 37, 38 may be used to directly couple the receiver rack 30 to a personal recreation vehicle such as an ATV or a snowmobile. Various attachment means such as fastener, clips, buckles, or other structures may be used to provide a secure attachment between the flanges 37, 38 and the vehicle. The flanges 37, 38, like the couplers 39, 40, may be positioned at other location on the receiver rack 30 and still provide the desired attachment function.

Figure 34:
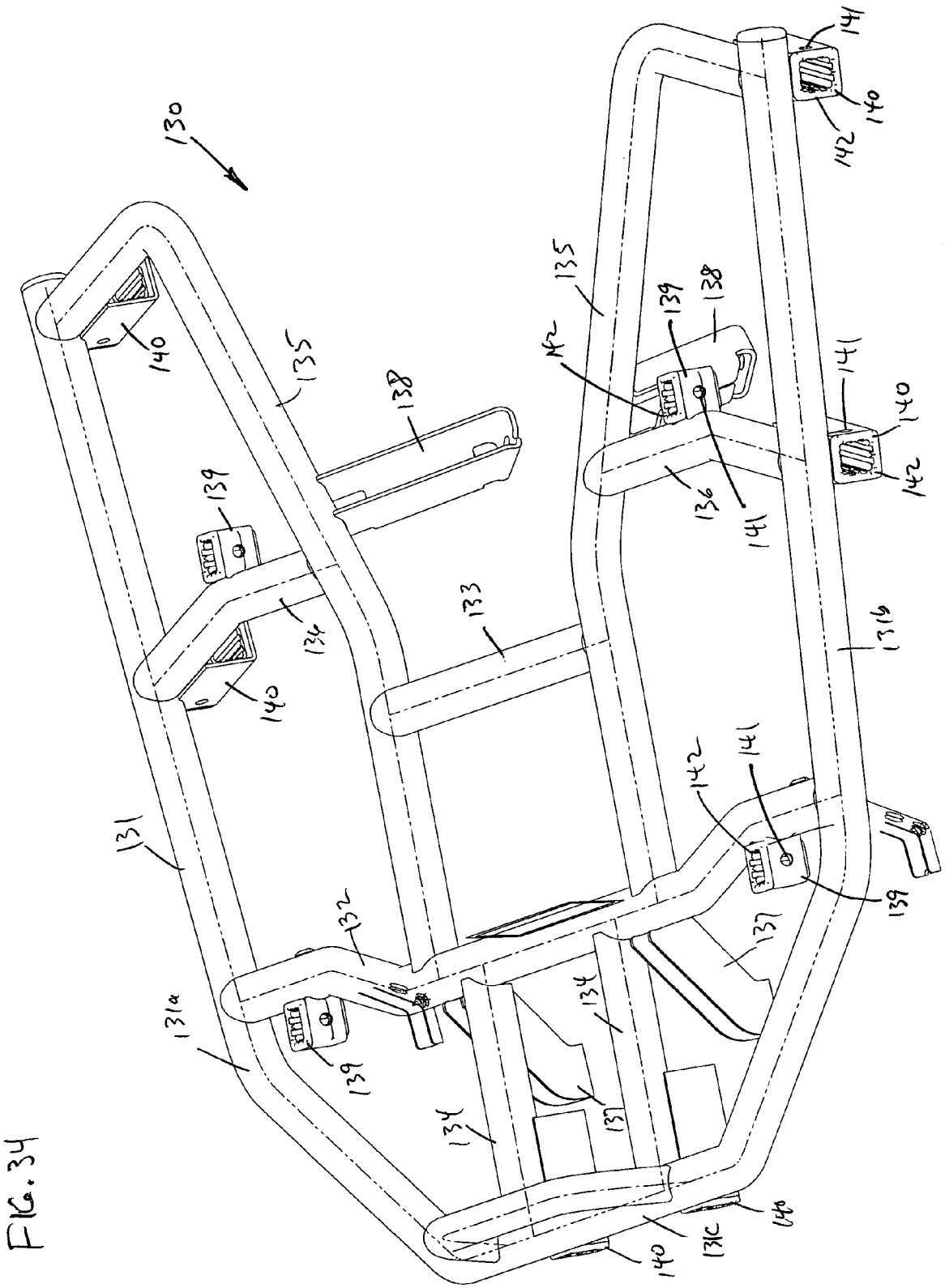
FIG. 34 is a top perspective view of another example receiver rack in accordance with principles of the present disclosure, the rack being configured for coupling directly to a vehicle.

A further receiver rack embodiment 130 is shown and described with reference to FIG. 34. Receiver rack 130 includes an outer frame member 131, first, second and third connecting members 132, 133, 136, and first and second sets of cross-linking members 134, 135. The outer frame member 131 includes first and second side members 131A, 131B that are coupled together via a front member 131C. The outer frame member 131 may be integrally formed as a single piece by combining members 131 A-C as an integrally formed piece, or these members may be separately formed and later connected together.

The connecting members 132, 133, 136 interconnect the side members 131A, 131B, and the first and second sets of cross-linking members 134, 135 secure the outer frame 131 to each of the connecting members 132, 133, 136. In some embodiments, there may be only one or more than two member(s) in each of the sets of cross-linking members 134, 135.

The receiver rack 130 may include front and rear mounting flanges 137, 138 configured for securing the receiver rack 130 to a vehicle. The mounting flanges 137, 138 may be mounted to any of the members 131-136 and may have any desired shape and size. In some embodiments, the mounting flanges 137, 138 and the mounting flanges 37, 38 described above may be replaced with or may be used in combination with couplings that are configured to mount the receiver rack 130, 30 to a coupler (e.g., couplers 54 of base rack 50 described below).

The receiver rack 130 also includes vertical and horizontal orientated couplers 139, 140 positioned at various locations on the receiver rack. The vertically orientated couplers 139 are shown coupled to the first and third connecting members 132, 136 while the horizontally oriented couplers 140 are mounted to the outer frame member 131, the connecting member 136, and the cross-linking members 135. Other embodiments may include additional or fewer couplers and different arrangements of the couplers on the receiver rack 130.

The couplers 139, 140 are positioned on different horizontal planes relative to each other. Such a noncoplanar arrangement of the couplers may have advantages related to mounting of cargo units and the manufacture of the receiver rack 130 as compared to the receiver rack 30 described above.

Each of the couplers 139, 140 includes a bushing 142 and a passage 141 sized to receive a retaining pin. The bushing 142 may be configured similar to the bushing 1400 described above with reference to FIGS. 14A-C.

A still further receiver rack embodiment 230 is shown and described with reference to FIG. 35. Receiver rack 230 includes an outer frame member 231, first and second connecting members 232, 233, first, second and third cross-linking members 234, 235, 236. The outer frame member 231 may be "sectional" in that it may divided into several separate pieces around a periphery of the receiver rack 230. In some embodiments, the outer frame member 231 may be formed integrally as a single piece, may be formed in two or three large sections, or may be three or more sections that are coupled together prior to or during assembly of the outer frame member 131 to the other members 232-236.

The receiver rack 230 may include a plurality of vertically and horizontally oriented couplers 239, 240 positioned at various locations on the receiver rack. The vertical oriented couplers 239 are mounted to the connecting members 232, 233 spaced inward from the outer frame member 231. The horizontally oriented couplers 240 are positioned at the outer frame member 231 and along the connecting members 232, 233 and along the cross-linking members 236. Other embodiments may include more or fewer couplers or coupler members positioned at other locations than those shown in FIG. 35.

Receiver rack 230 also includes a pair of mounting plates 243 each having front and rear mounting couplings 237, 238 extending from opposing ends thereof. The front couplings 237 include attachment flanges 244 that provide an additional connecting function when mounting the receiver rack 230 to a vehicle. The rear mounting flanges 238 may include an aperture there through such that a retaining pin can pass through the aperture (not labeled) to provide positive attachment of the receiver rack 230 to the vehicle.

Figure 35:
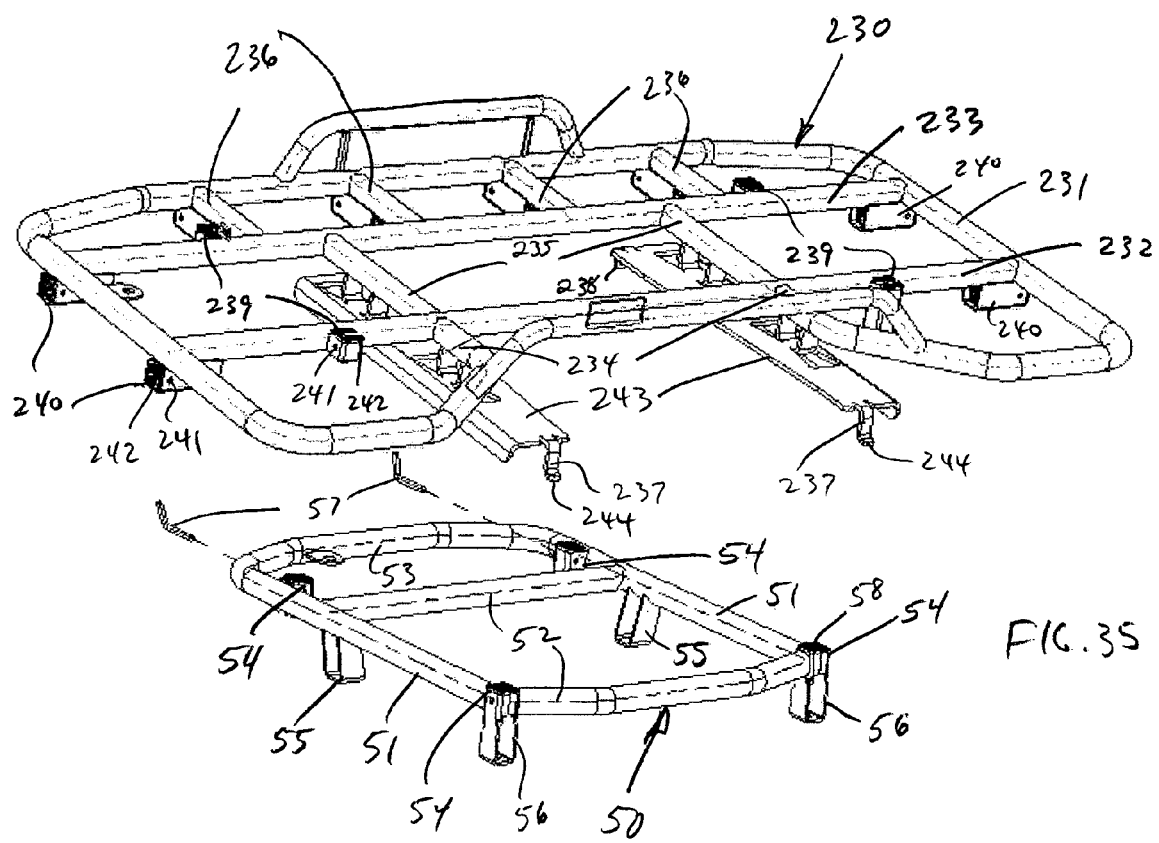
FIG. 35 is a top perspective view of another example receiver rack in accordance with principles of the present disclosure, the receiver rack being configured for coupling to a base rack mounted on a vehicle.

FIG. 35 also illustrates a mounting rack base 50 that can be interposed between receiver rack 230 and a vehicle. The base 50 is configured for direct attachment to the vehicle via front and rear mounting flanges 55, 56. The base includes side members 51, cross-linking members 52, an end frame member 53, and a plurality of vertically oriented couplers 54. Couplers 54 positioned at an end of the base opposite of the end frame member 53 are configured for receiving the front mounting couplings 237 with the attachment flanges 244. The receiver rack 230 must be pivoted relative to a top surface of the base 50 in order for the attachment flanges 244 to be inserted into the couplers 54. With the flanges inserted, the receiver rack is pivoted towards the base 50 for the remaining portion of the front couplings 257 to be inserted into the couplers 54 and the rear couplings 238 to be inserted into the rear oriented couplers 54. The flanges 244, in this attached position, prevent the front couplings 257 from being removed from the couplers 54. Retainer pins 57 can be inserted through the couplers 54 and apertures (not numbered) in the rear mounting couplings 238 to provide a secure attachment of the receiver rack 230 to the base 50. This attachment configuration provides a quick release connection system for quickly detaching and attaching the receiver rack 230 relative to the base 50.

Each of the couplers 54 includes a bushing 58 in accordance with features of the bushing 1400 shown and described above with reference to FIGS. 14A-C. In some embodiments, the couplers 54 may be positioned at alternative positions on the base 50, or the base 50 may include additional sets of couplers to provide mounting of different receiver racks or other cargo units to the base 50 (in combination with or in place of the mounted receiver rack), wherein the additional cargo units have different coupling arrangement. Further, the base 50 may include couplers mounted with horizontally oriented openings. Such horizontal couplers may be useful for coupling certain types of cargo units or others type of receiver racks having different coupling arrangements.

Figure 38:
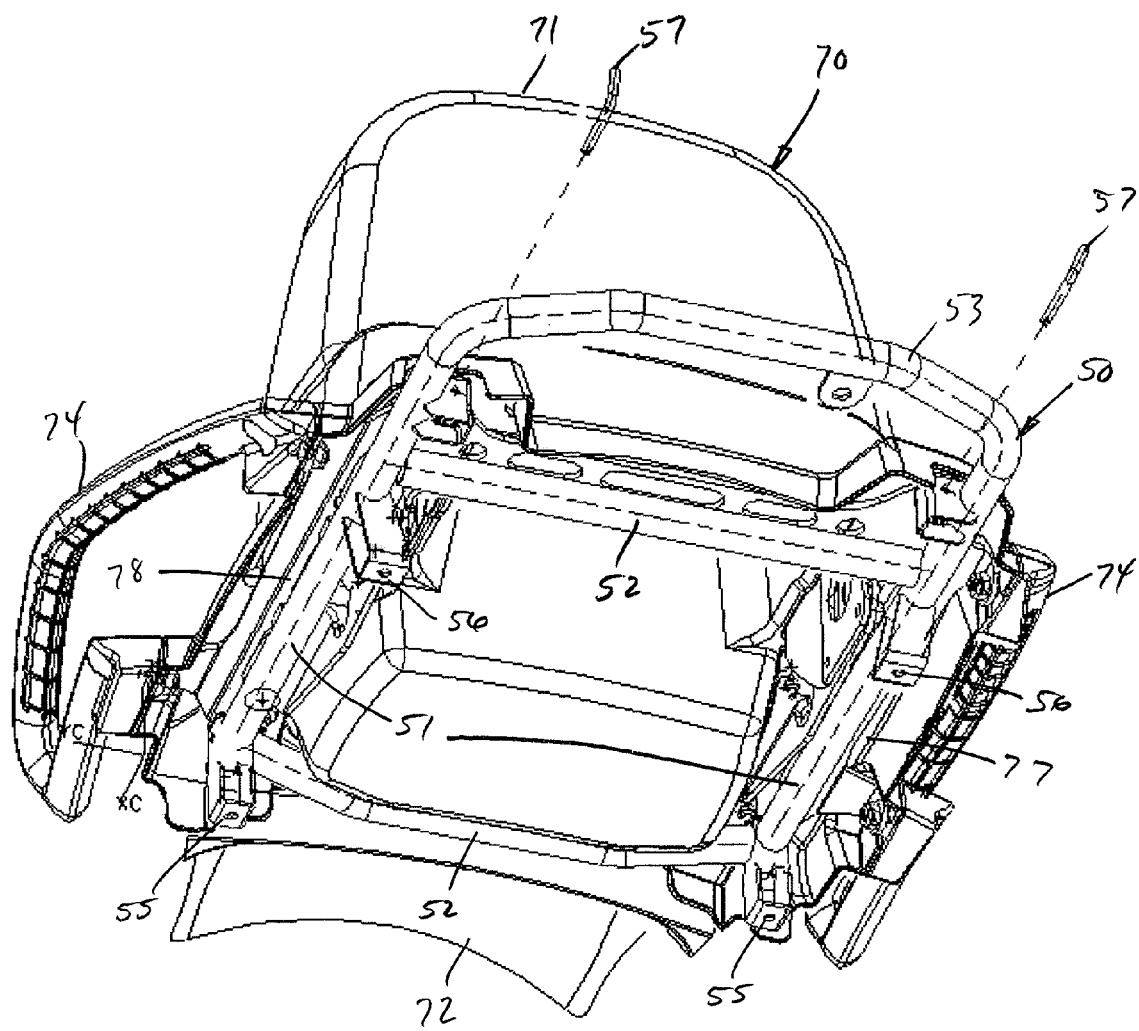
FIG. 38 is a bottom perspective view of the seat shown in FIG. 37 with the seat secured to the base rack.
Figure 39:
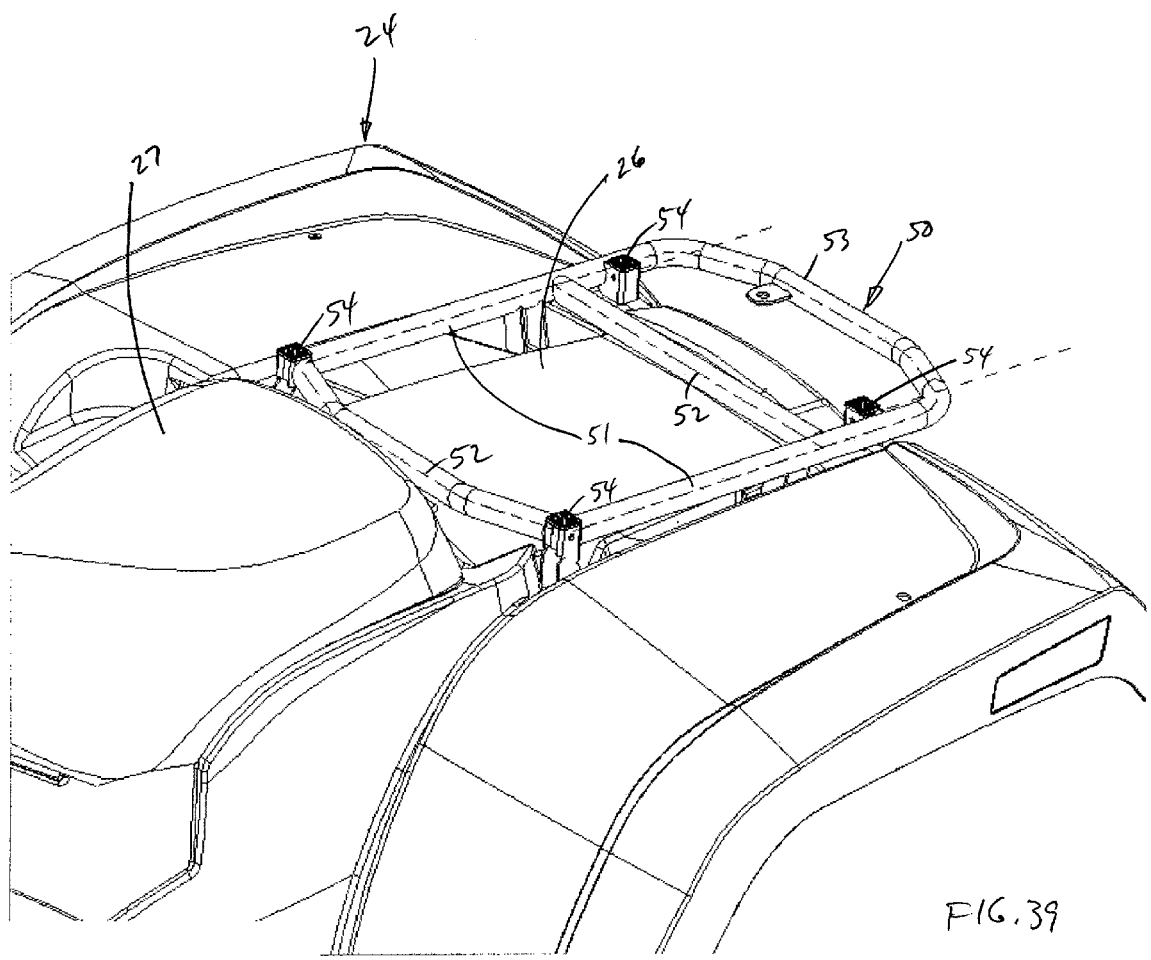
FIG. 39 is a top perspective view of the base rack shown in FIGS. 35-38 secured to a straddle mount vehicle.

FIG. 39 illustrates the base 50 mounted to a rear mounting surface 26 of an all-terrain vehicle (ATV) 24. One end of the base 50 is positioned adjacent to a seat 27 of the ATV while the opposing end is positioned near a rear surface of the ATV. While not clearly shown, the front and rear mounting flanges 55, 56 may be used to directly secure the base 50 to the ATV using, for example, fasteners or other connecting devices or means. The base 50 itself may be used as either a base unit for attaching a receiver rack, other types of cargo units, or other devices (e.g., the box and seat disclosed with reference to FIGS. 36-38 described below), or may be used as a receiver rack or mounting surface by itself. For example, cargo or other types of load may be directly secured to the members 51, 52, 53. Further, one or more of the couplers 54 may be used to secure an attachment or cargo unit to the ATV.

Figure 36:
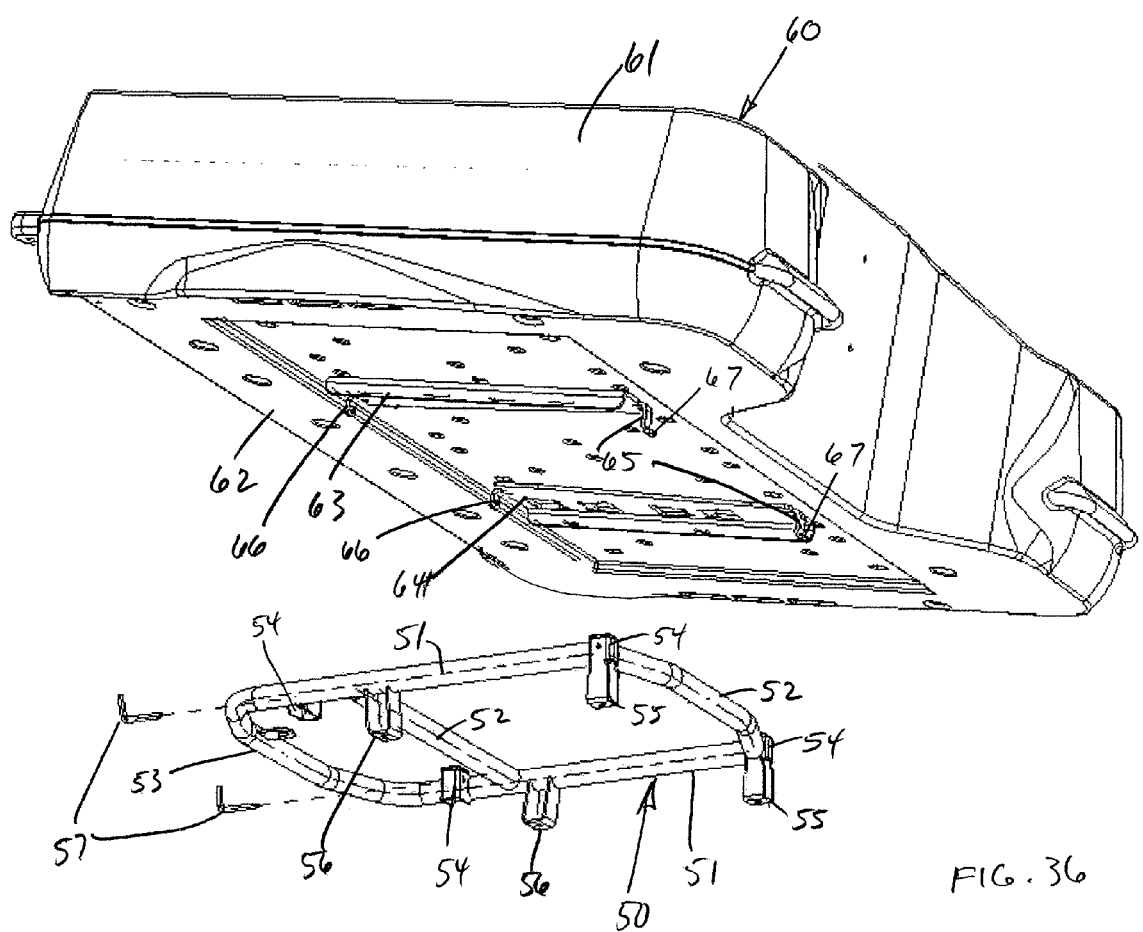
FIG. 36 is a bottom perspective view of an example storage box in accordance with principles of the present disclosure, the storage box being configured for coupling to a base rack mounted on a vehicle.

FIG. 36 illustrates a storage box 60 configured for mounting to the base 50. The box 60 includes a side wall 61 extending around a periphery of the box 60, and a bottom wall 62 that faces the base 50. First and second mounting plates 63, 64 are secured to the bottom wall 62. Front and rear mounting couplings 65, 66 extend from each of the plates 63, 64. A flange 67 may extend from either the front or rear couplings 65, 66 to provide the pivot locking feature described above with reference to receiver rack 30 being mounted to the base 50. In some embodiments, the couplings 65, 66 may be mounted directly to the bottom surface without an intervening mounting plate.

The box 60 may be an enclosed box having a lid or may be an open box. The box 60 may comprise any desired material such as a polymer-based, metallic or fibrous material. The box 60 may have many different shapes and sized and may be manufactured using, for example, molding, stamping, welding, fastening, and other forming and connecting techniques.

Figure 36A:
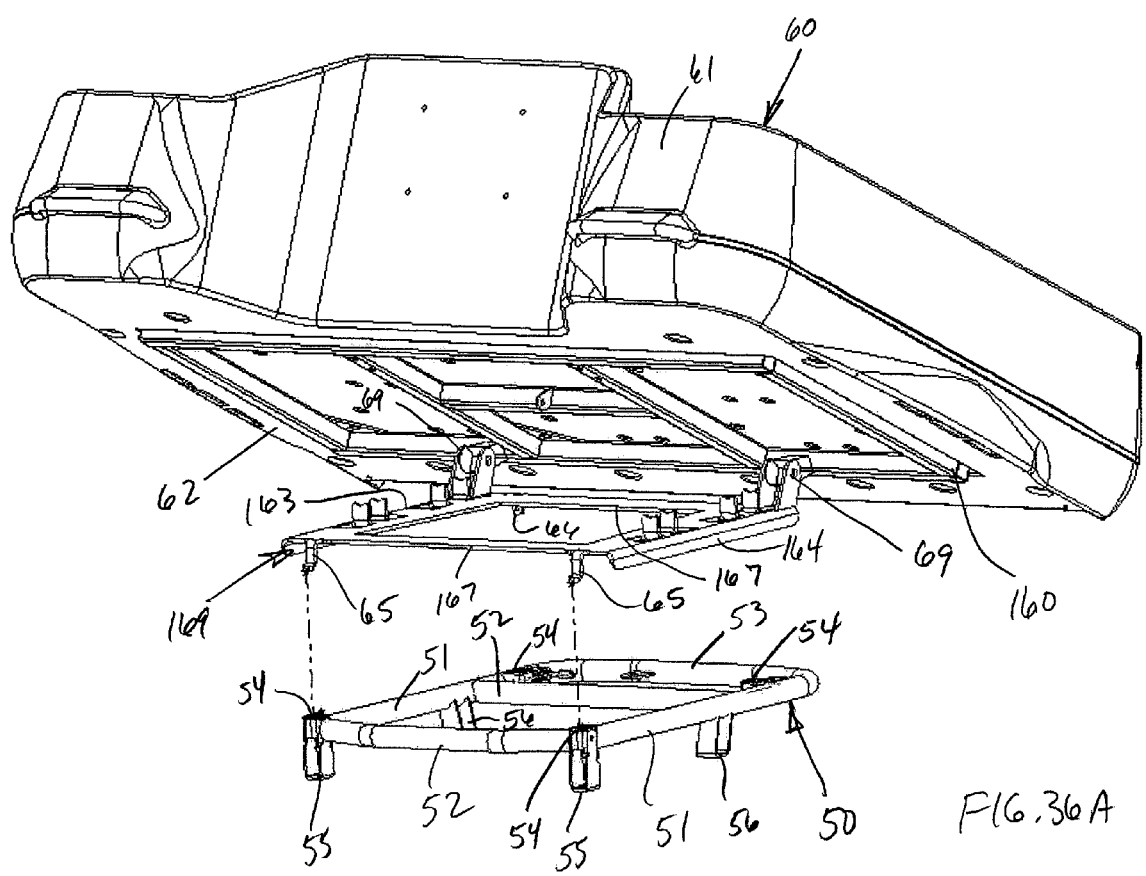
FIG. 36A is a bottom perspective view of another example storage box having a tilt feature.
Figure 36B:
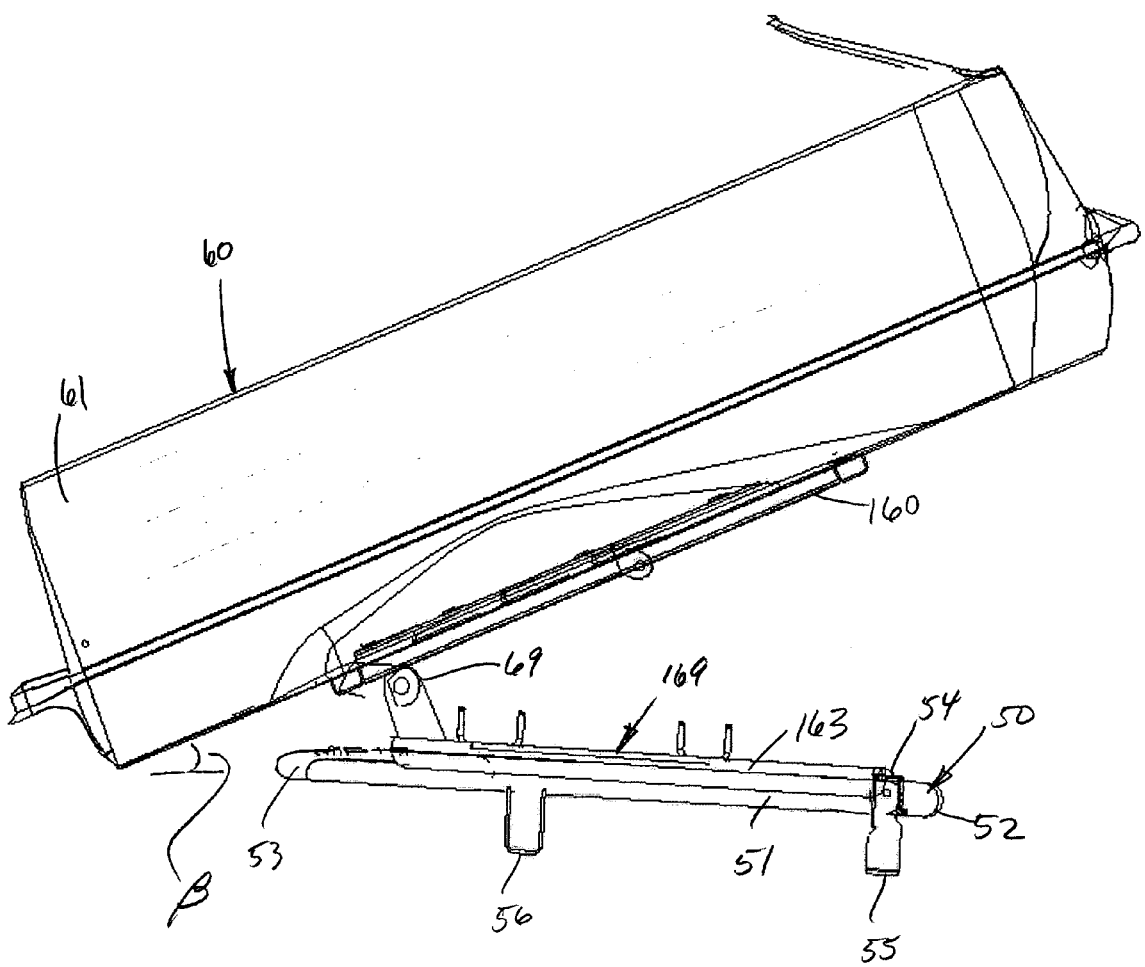
FIG. 36B is a side view of the storage box shown in FIG. 36A.

FIGS. 36A and 36B illustrate box 60 further including a bottom frame 160 secured to the bottom side 62 of the box. The bottom frame 160 is coupled to an attachment frame 169 that includes side members 163, 164 and cross-members 167. Front and rear couplings 65, 66 extend downward from the frame 169 and are configured for attachment of the box to the base 50 in the same or similar way as described with reference to FIG. 36.

A pair of pivot attachment members 69 provide a pivotal attachment of the bottom frame 160 to the attachment frame 169. The pivot member 69 allow the box 60 to be tilted at some angle β (see FIG. 36B) from a position wherein the bottom surface 62 is generally coplanar with a top surface of the attachment frame 169 and a top surface of the base 50. The tilt angle β is preferable between about 0 degree and about 90 degrees, and more preferably between about 20 degrees and about 60 degrees. Tilting of the box 60 may be advantageous for unloading contents of the box.

The bottom frame 160 and attachment frame 169 may include further adjustable attachment features that facilitate holding the bed in a completely lowered position or to hold the bed in a titled position (e.g., β>0 degrees). The attachment features may include, for example, a removable pin that fits within aligned apertures of the bottom and attachment frames 160, 169.

In some embodiments, portions of the pivot members 69 may include structure similar to the coupling members described herein. With such coupling members, the pivot members may be capable of directly mounting within the couples 54 of the base 50 or couplers of a rack (e.g., couplers 39 of rack 30) that is mounted to the base 50 or a rack that is mounted directly to a mounting surface of a recreational vehicle.

Figure 37:
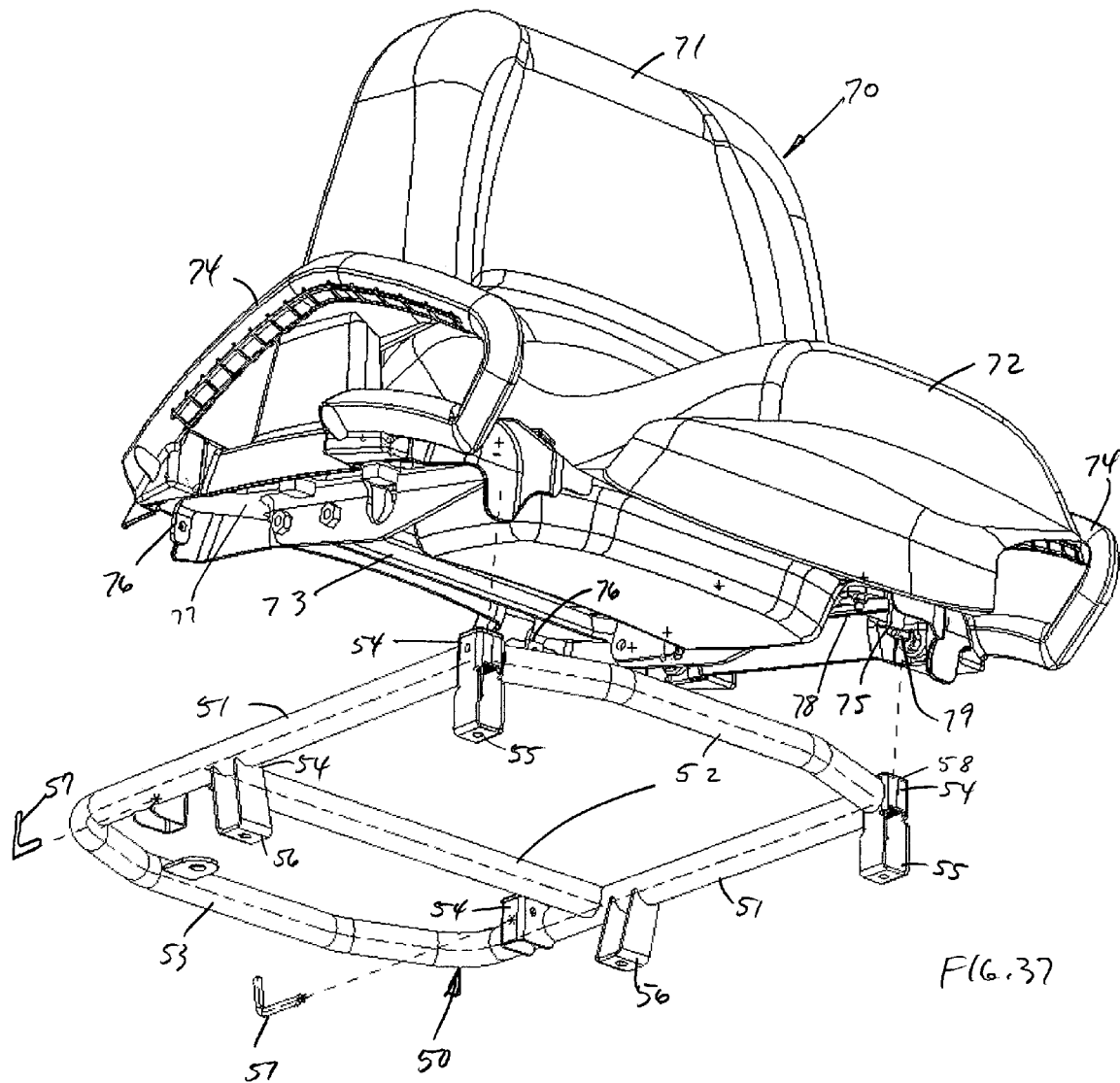
FIG. 37 is a bottom perspective view of an example straddle mount seat attachment in accordance with principles of the present disclosure, the seat being configured for coupling to a base rack mounted on a vehicle.

Referring now to FIGS. 37 and 38, an example auxiliary seat member 70 is shown and described. The seat 70 includes a back support 71, a seating surface 72, a bottom surface 73, handlebars 74, front and rear mounting couplings 75, 76, and first and second mounting plates 77, 78. The mounting couplings 75, 76 extend downward from the mounting plates 77, 78 and the mounting plates are coupled to the bottom surface 73. A flange member 79 may extend from the front couplings 75. The rear couplings 76 may include an aperture there through that together with the flange members 79 provide the pivot locking attachment to base 50 described above with reference to receiver rack 230. The retainer pins 57 can be inserted through the rear oriented couplers 54 and the aperture (not numbered) formed in the rear coupling 76 to provide a positive connection (along with the engagement of flanges 79 in the front oriented couplers 54) of the seat 70 to the base 50. The pivot locking arrangement requires a set of retainer pins 57 in only one of the two sets of couplers to provide the desired attachment of the seat 70 to the vehicle.

FIG. 38 illustrates the seat 70 coupled to the base 50 just prior to inserting the retainer pins 57 into the rear couplings 76. With the seat 70 securely connected to the base 50, the auxiliary seat 70 provides an additional seating position for a second rider on the ATV 24. Preferably, the ATV 24 is configured as a tandem riding vehicle having additional wheel base length so as to provide sufficient space along the mounting surface 26 for the seat 70 to reside completely on (that is, not extending beyond a rear surface of the ATV) top of the ATV 24.

In other embodiments, the couplers associated with the base may be separately mounted to the ATV (e.g., with attachment structures similar to the flanges 55, 56). In such embodiments, the base may be eliminated and replaced by the directly mounted couplers. The ATV may be provided with a plurality of apertures or other mounting structures or configurations that provide positioning of the directly mounted couplers at different adjusted positions to accommodate different coupling arrangements of any of a number of different cargo units (e.g., receiver rack, box, auxiliary seat) that is to be releasably coupled to the ATV via the couplers 54.

Figure 40:
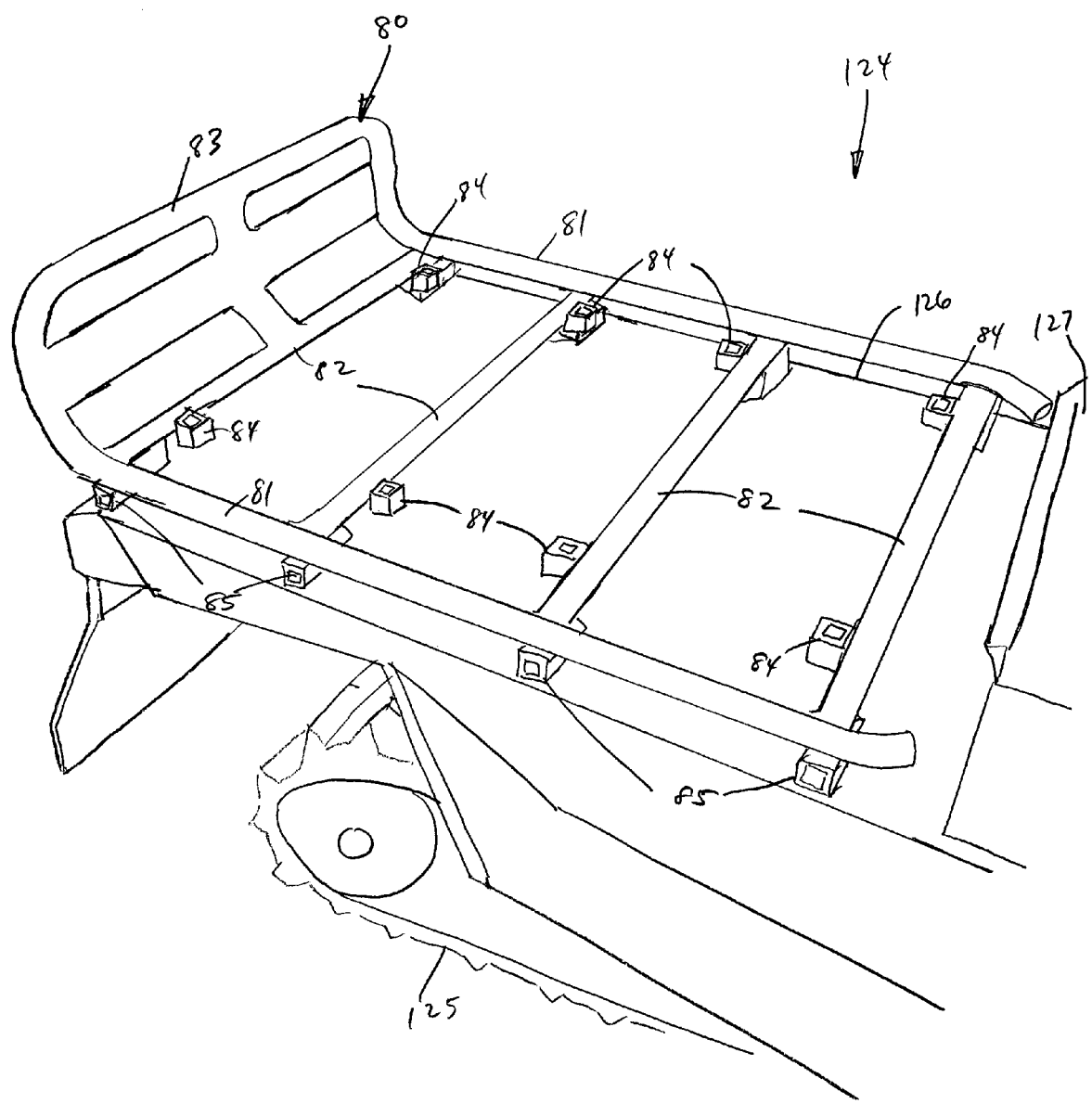
FIG. 40 is a top perspective view of an example receiver rack for use with a snowmobile.
Figure 41:
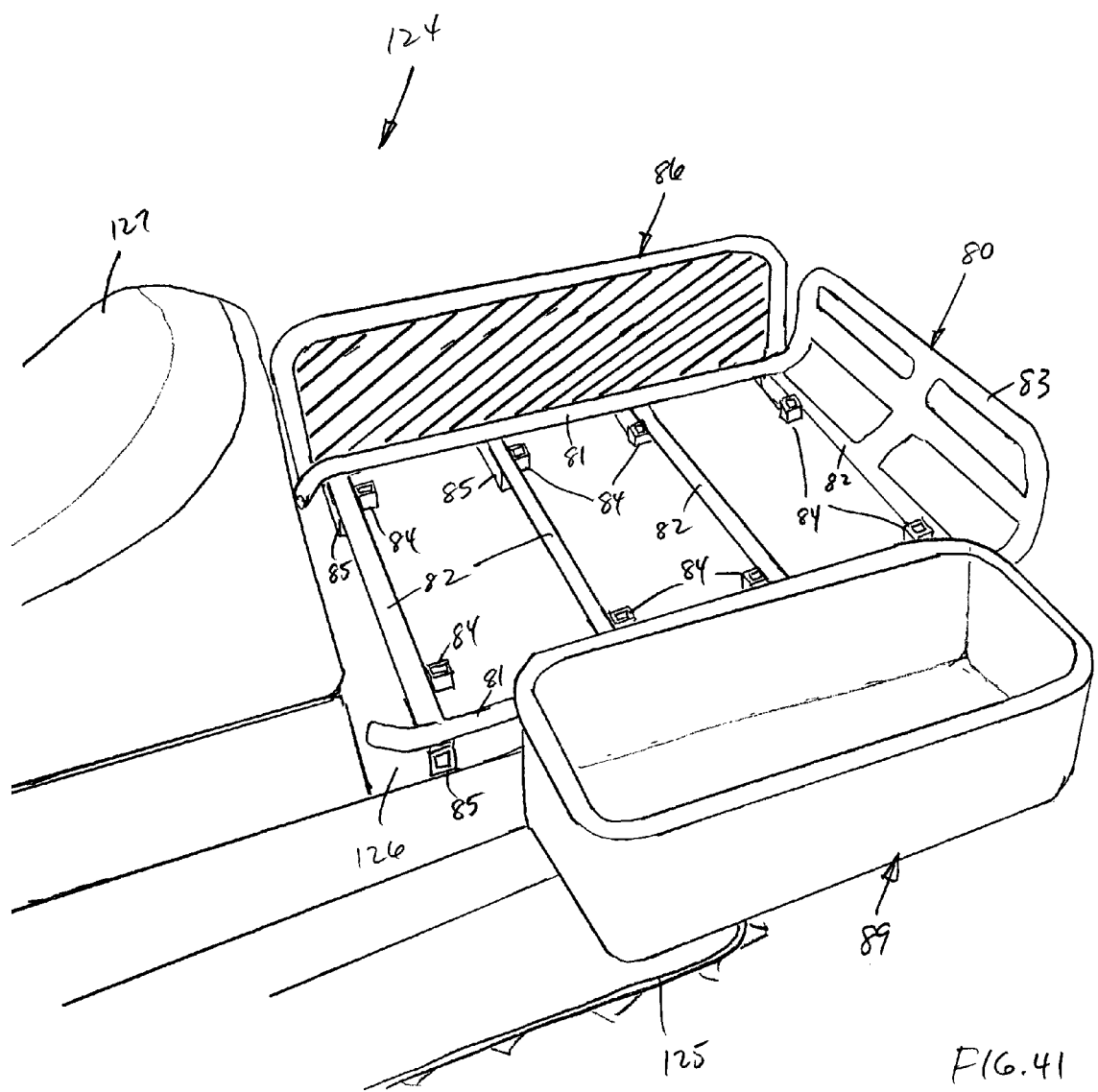
FIG. 41 is a top perspective view of a side panel and a basket mounted to the receiver rack shown in FIG. 40.
Figure 42:
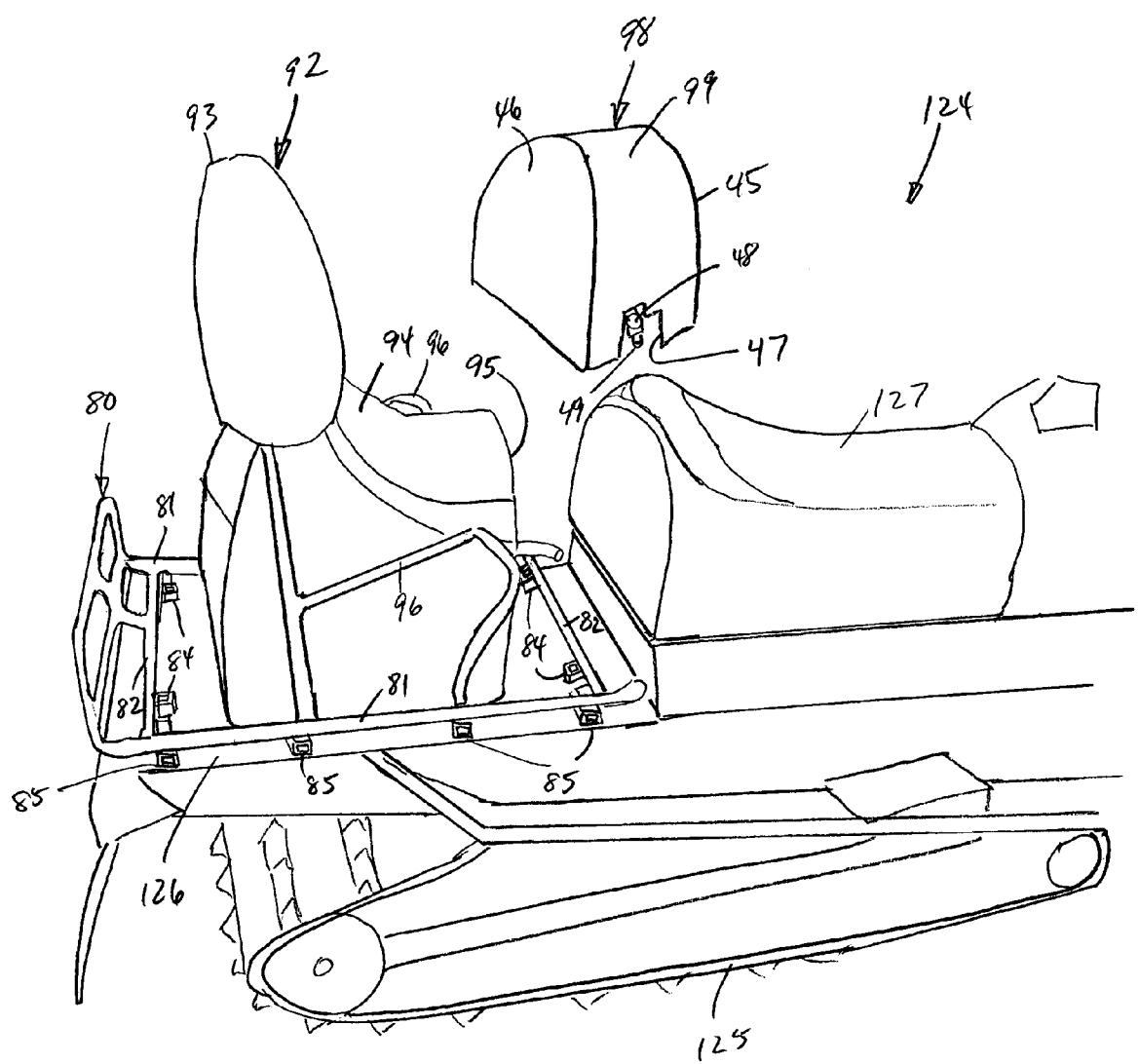
FIG. 42 is a side perspective view of a passenger seat mounted to the receiver rack shown in FIG. 40 and a seat extension prepared for mounting to the receiver rack.

Referring now to FIGS. 40-42, an example receiver rack 80 configured for use with a straddle mount snowmobile is shown and described. Receiver rack 80 includes side rails 81 extending in a length direction of the snowmobile, cross-linking members 82 interconnecting the side rails 81, a rear panel/rail member 83, and a plurality of vertically and horizontally oriented couplers 84, 85. The receiver rack 80 is sized for positioning along a rear mounting surface 126 of a snowmobile 124. The mounting surface 126 is positioned rearward of a seat 127 and oriented vertically above an end of a track 125 of the snowmobile.

A pair of vertically orientated couplers 84 is connected to each of the cross-linking members 82. The couplers 84 are positioned inward from the side rails 81, but may, in other embodiments, be positioned along the side rails 81 or removed from the cross-linking members 82. The horizontal couplers 85 are positioned vertically below the side rails 81 and cross-linking members 82 and are also aligned with the cross-linking members 82. The horizontal couplers 85 are exposed along the side rails 81. In other embodiments, the couplers 84, 85 may be positioned at alternative locations and positions and may be positioned coplanar relative to each (e.g., see coupler arrangement of receiver rack 30) other rather than the noncoplanar arrangement shown in FIG. 40.

FIG. 41 illustrates two separate cargo units or attachment members that can be mounted to the receiver rack 80. A side panel 86 having a plurality of couplings (not shown) may be mounted to at least some of the horizontal couplers 85 via bushings 85A (similar to bushings 1400 shown in FIGS. 14A-C). A basket 89 having a plurality of couplings (not shown) may also be mounted to the receiver rack 80 via at least some of the horizontal couplers 85. FIGS. 22 and 27 described above illustrate other basket and panel member configurations that include couplings (e.g., couplings 322 and FIG. 27) that may be used for the side panel 86 and basket 89. The side panel 86 and basket 89 may include a coupling configuration that permits mounting to the vertical couplers 84.

Referring now to FIG. 42, an example auxiliary seat 92 and seat extension 98 are shown and described. The seat 92 includes a back rest 93, a seating surface or member 94 having a front surface 95, handlebars 96, and a plurality of couplings (not shown). The back rest 93 may be coupled to the handlebars 96 and mounted as a separate unit to the snowmobile 124 from the seating member 94. The seat 92 includes at least one pair of couplings that extends from ends of the handlebars 96 and at least one pair of couplings that extend from the seating member 94 for attachment to couplers 84, 85 of the receiver rack.

The seat 92 may be positioned at an offset location from the seat 127 as shown in FIG. 42 where the seat 92 is mounted to couplers associated with the middle cross-linking members 82, or may be positioned directly adjacent to the seat 127 using couplers of the front oriented cross-linking members 82. In the mounted orientation shown in FIG. 42, a space is provided between the seat 92 and the seat 127 wherein the seat extension 98 may be positioned. Seat extension 98 includes a seating surface 99, front and rear surfaces 45, 46, a recess 47 sized for positioning of a support member 48 from which a coupling 49 extends. The couplings 49 the vertically oriented couplers 84 of the receiver rack. The seat extension 98 provides for a longer seating surface area for a second passenger seated behind a rider of the snowmobile that is sitting on the seat 127.

In a another embodiment (not shown), the seat 92 may be positioned at a maximum rear oriented position on the receiver rack 80 and a seat extension having twice the longitudinal size of seat extension 98 may be inserted between the seat 92 and seat 127. Such a seating configuration would provide maximum seating space for riders of the snowmobile 124 given the length of the rack 80.

In other embodiments, the couplings of the seat 92 and seat extension 98 maybe configured to fit into the horizontally oriented couplers 85 on the receiver rack 80. In still further embodiments, the rack 80 may have different lengths, widths and numbers of components to accommodate different seat configurations.

Figure 43:
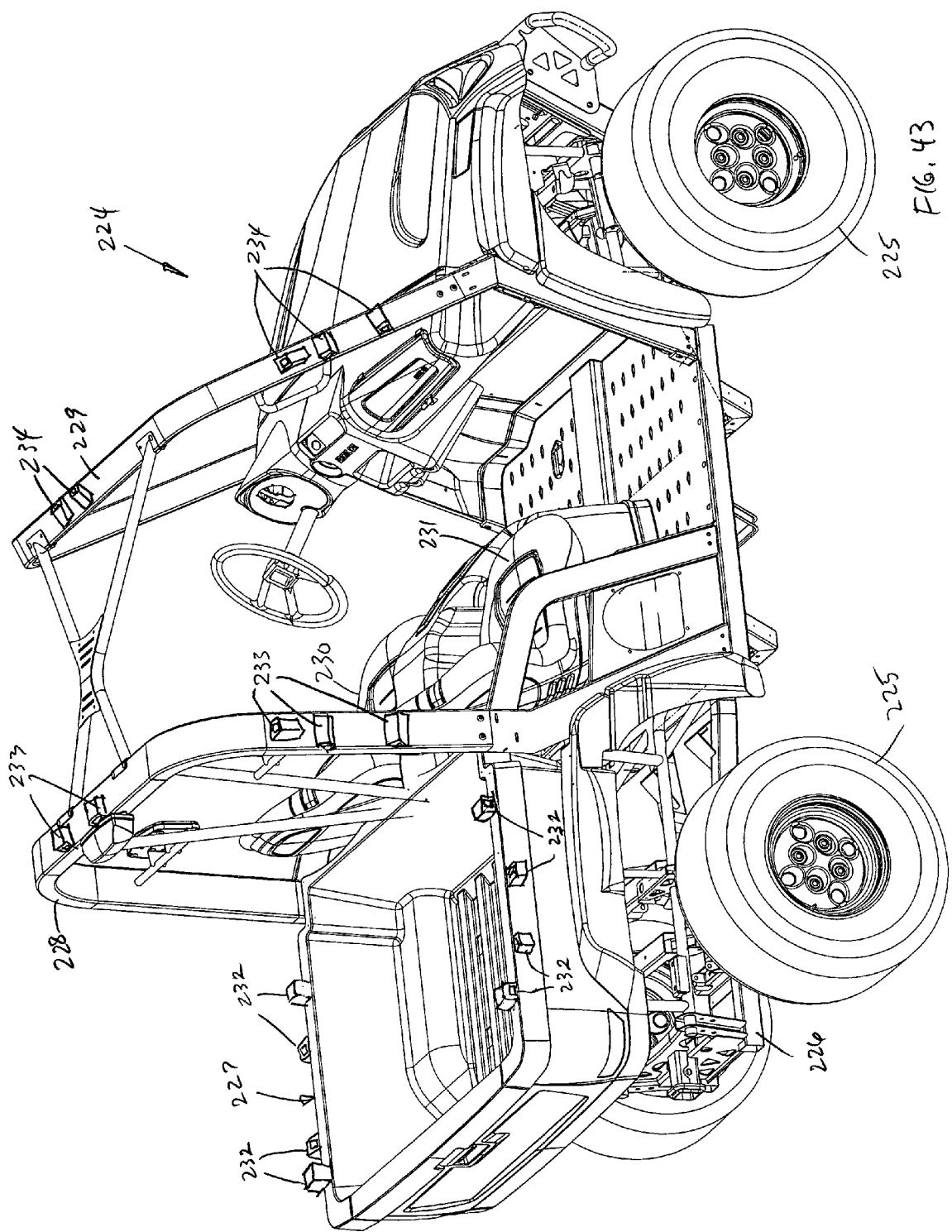
FIG. 43 is a side perspective view of an example side-by-side personal recreation vehicle having a plurality of couplers according to principles of the present disclosure mounted thereon.

FIG. 43 illustrates a personal recreational vehicle configured as a side-by-side seating vehicle 224 (e.g., multi-purpose off-highway utility vehicle). Vehicle 224 includes four wheels 225, a chassis 226 that supports the wheels, a cargo bed 227 coupled to the chassis 226, a hoop 228, a windshield frame 229, and first and second passenger seats 230, 231. The vehicle 224 may include a plurality of bed couplers 232 positioned in vertical and/or horizontal oriented positions around portions of the cargo bed 227. A plurality of hoop couplers 233 oriented in horizontal and vertical positions may be positioned at various locations around the hoop 228. A plurality of windshield couplers 234 may be positioned at various locations around the windshield frame 229. The couplers 232-234 may be positioned or otherwise mounted to provide attachment of a variety of different cargo units and attachment devices such as those described with reference to, for example, FIGS. 5-11 and 19-32C described above. Each of the couplers 232-234 may include a bushing configured in accordance with those principles described with reference to bushing 1400 shown and described above with reference to FIGS. 14A-C.

Figure 44:
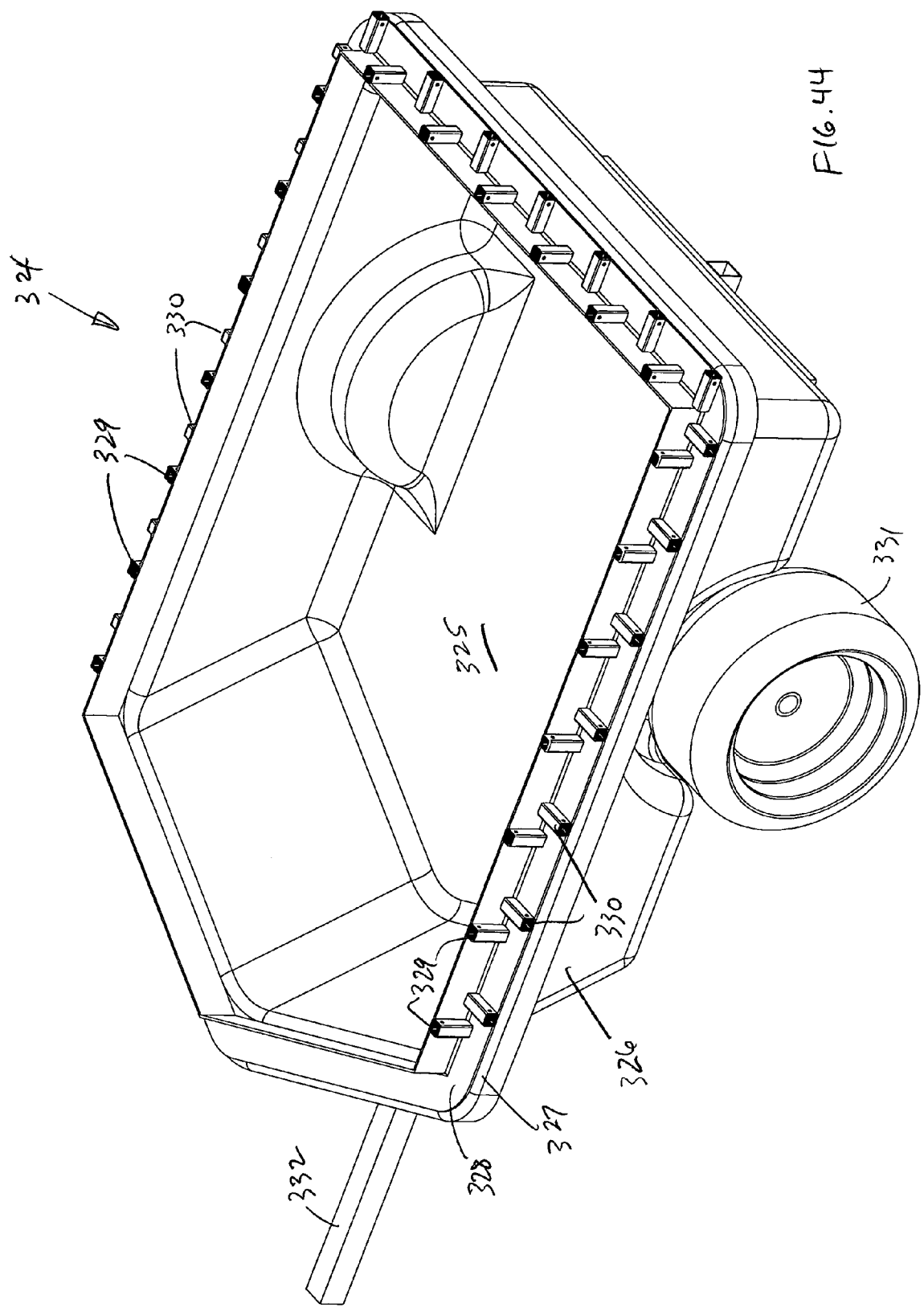
FIG. 44 is a top perspective view of an example trailer having a plurality of couplers according to principles of the present disclosure mounted thereon.

FIG. 44 illustrates a utility trailer 324 having a floor 325, a side wall 326 extending around at least a portion of the periphery of the trailer, a ledge or bumper member 327 extending around the side wall 326, and a mounting surface 328 defined by the ledge 327. A plurality of vertically oriented couplers 329 may be mounted to the side wall 326 or the ledge 327, and a plurality of horizontal couplers 330 may be mounted to the mounting surface 328. Each of the couplers 329, 330 may include a bushing according to principles of the bushing 1400 described with reference to FIGS. 14A-C. The spacing and orientation of the couplers 329, 330 provides mounting of a variety of different cargo units and attachment devices such as those described above with reference to, for example, FIGS. 5-11 and 19-32C.

The trailer 324 typically does not include self-propelling features, but rather include passive wheels 331 and a tongue 332 that provides attachment to a personal recreational vehicle such as the ATV and snowmobile described above.

In some embodiments, the couplers 329, 330 may be positioned at other locations on the trailer 324 such as, for example, along a front surface, along the floor 325, on portions of the tongue 332, or at other locations on the side wall 326 and ledge 327 than those orientations shown in FIG. 44.

Many of those cargo units, rack configurations, attachment devices, and other features described with reference to FIGS. 1-32C may be useful in combination with or in place of certain features of the receiver racks, vehicle and trailer coupling and coupling configurations described with reference to FIGS. 33-44. The examples described herein are exemplary of some applications for the connecting couplers of the present disclosure. Other means of attaching a variety of receiver rack, cargo units, auxiliary seats, and other attachment devices to a personal recreational vehicle or other utilitarian devices used with personal recreational vehicles may fall within the scope and intent of the present disclosure.

It will be clear that the present disclosure includes inventive concepts well adapted to attain the ends and advantages mentioned as well as those inherent therein. While presently preferred embodiments have been described for purposes of this disclosure, various changes and modifications may be made which are well within the scope of the present disclosure. For example, the receiver rack may take on other forms that are capable of mating with couplers attached to cargo units. Other forms of cargo units may be retrofitted with coupling members. Numerous other changes may be made which will readily suggest themselves to those skilled in the art and which are encompassed in the spirit of the disclosure and as defined in the appended claims.

The invention claimed is:

1. A load-carrying apparatus for a straddle-mount personal recreational vehicle configured for carrying a driver and cargo, the vehicle having a front and rear tires suspended from a frame, the frame supporting a driver seat and a rear upper surface, rearward of the driver seat, generally above the rear tires and forming fenders above the tires, the load-carrying structure being configured for alternatively carrying a passenger or extra cargo, the load-carrying apparatus comprising:

a base mounting rack secured above the rear upper surface and extending above the level of the fenders, the base mounting rack having receiver couplers, including a forward receiver coupler positioned adjacent the driver seat and a rearward receiver coupler aft of the forward receiver coupler, said receiver couplers having upwardly oriented openings;

a passenger seat having a coupling member selectively securable downwardly into the openings of the receiver couplers of the base mounting rack for quick-release engagement therewith; and a cargo unit having a coupling member selectively securable downwardly into the openings of the receiver couplers of the base mounting rack for quick-release engagement therewith in place of the passenger seat.

2. The load-carrying apparatus of claim 1, wherein the cargo unit comprises a rack having elongate members and linking members forming a cargo carrying structure.

3. The load-carrying apparatus of claim 1, wherein the cargo unit comprises a storage box forming a cargo bed.

4. The load-carrying apparatus of claim 3, wherein the cargo bed is configured with a pivot mechanism to provide tilting of the cargo bed while the cargo bed maintains positive attachment to the base mounting rack.

5. The load-carrying apparatus of claim 1, wherein the base mounting rack is configured for direct attachment to the vehicle via mounting flanges.

6. The load-carrying apparatus of claim 1, wherein the receiver couplers include a plurality of vertically oriented couplers formed of tubes, the coupling members of the passenger seat and the cargo unit being received into the vertically oriented couplers of the base mounting rack.

7. The load-carrying apparatus of claim 6, wherein at least one of the coupling members includes an attachment flange insertable into one of the receiver couplers, the flange extending at least partially through a front, horizontal side opening in the coupler tube.

8. The load-carrying apparatus of claim 6, further comprising a retainer pin securable between at least one of the coupling members and the receiver couplers.

9. The load-carrying apparatus of claim 1, wherein a mounted position of the passenger seat is adjustable between at least two different positions along a length direction of the base mounting rack.

10. The load-carrying apparatus of claim 1, wherein the base mounting rack includes at least two forward receiver couplers and at least two rearward receiver couplers.

11. The load-carrying apparatus of claim 10, wherein the rearward receiver couplers each include a biased pin for engaging one of the coupling members.

12. A load-carrying apparatus for a straddle-mount personal recreational vehicle configured for carrying a driver and cargo, the vehicle having a front and rear tires suspended from a frame, the frame supporting a driver seat and a rear upper surface, rearward of the driver seat, generally above the rear tires and forming fenders above the tires, the load-carrying structure being configured for alternatively carrying a passenger or extra cargo, the load-carrying apparatus comprising:

- a base mounting rack secured above the rear upper surface and extending above the level of the fenders, the base mounting rack having receiver couplers, including two forward receiver couplers positioned adjacent the rear end of the driver seat and two rearward receiver couplers aft of the forward receiver couplers, said receiver couplers having vertically oriented openings formed from tubes, said forward receiver couplers having frontal openings in a lower portion thereof;
- a passenger seat having two forward coupling members selectively securable downwardly into the openings of the forward receiver couplers of the base mounting rack and two rearward coupling members selectively securable downwardly into the openings of the rearward receiver couplers of the base mounting rack, the forward coupling members having forwardly extending flanges at the lower ends thereof, for quick-release engagement with the frontal openings in the forward receiver couplers; and
- a cargo unit having two forward coupling members selectively securable downwardly into the openings of the forward receiver couplers of the base mounting rack and two rearward coupling members selectively securable downwardly into the openings of the rearward receiver couplers of the base mounting rack, the forward coupling members having forwardly extending flanges at the lower ends thereof, for quick-release engagement with the frontal openings in the forward receiver couplers, the cargo unit being securable on the base mounting rack in place of the passenger seat.

* * * * *